US011855850B2

(12) United States Patent
Gill et al.

(10) Patent No.: US 11,855,850 B2
(45) Date of Patent: Dec. 26, 2023

(54) SYSTEMS AND METHODS FOR NETWORKED MICROSERVICE MODELING AND VISUALIZATION

(71) Applicant: Nutanix, Inc., San Jose, CA (US)

(72) Inventors: Tanveer Singh Gill, San Francisco, CA (US); Harjot Singh Gill, San Francisco, CA (US); Jacques Arnoux, San Francisco, CA (US); Cam Thi-Nguyet Nguyen, San Francisco, CA (US); Saravana Soundararajan, Cupertino, CA (US); Haolin Lu, Ardmore, PA (US); Anh Thi-Nguyet Nguyen, San Francisco, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/963,079

(22) Filed: Apr. 25, 2018

(65) Prior Publication Data

US 2018/0309637 A1    Oct. 25, 2018

Related U.S. Application Data

(60) Provisional application No. 62/489,841, filed on Apr. 25, 2017.

(51) Int. Cl.
*H04L 41/12* (2022.01)
*H04L 67/10* (2022.01)
(Continued)

(52) U.S. Cl.
CPC .......... *H04L 41/12* (2013.01); *H04L 41/0893* (2013.01); *H04L 41/145* (2013.01);
(Continued)

(58) Field of Classification Search
None
See application file for complete search history.

(56) References Cited

U.S. PATENT DOCUMENTS

| 6,654,803 B1 * | 11/2003 | Rochford | H04L 41/22 345/418 |
| 7,480,866 B2 * | 1/2009 | Germain | H04L 41/12 715/734 |

(Continued)

FOREIGN PATENT DOCUMENTS

EP    3104560 A1    12/2016

OTHER PUBLICATIONS

International Search Report and Written Opinion dated Jun. 29, 2018 for corresponding PCT Application No. PCT/US2018/029483.
(Continued)

*Primary Examiner* — Joshua Joo
(74) *Attorney, Agent, or Firm* — Vista IP Law Group, LLP

(57) ABSTRACT

In a distributed cloud environment, a collecting agent deployed external to a kernel of a compute host collects network data packets describing various raw events communicated between compute instances of the environment and metadata associated with the events from various sources. The collecting agent communicates the metadata to a cloud application. The collecting agent also communicates the packets to a stream processor that is decoupled from the collecting agent. The stream processor processes the packets in a stateful manner to generate a set of time series data. The time series data is communicated to the cloud application, where a set of enhanced time series data is generated by merging the time series data with the metadata in a distributed manner. A topology map describing the compute instances of the distributed cloud environment is then gen-
(Continued)

erated based on the set of enhanced time series data. The topology map is then displayed.

24 Claims, 39 Drawing Sheets

(51) Int. Cl.
| | |
|---|---|
| *H04L 41/0893* | (2022.01) |
| *H04L 43/04* | (2022.01) |
| *H04L 41/046* | (2022.01) |
| *H04L 67/75* | (2022.01) |
| *H04L 41/14* | (2022.01) |
| *H04L 43/08* | (2022.01) |
| *H04L 67/133* | (2022.01) |
| *H04L 41/5009* | (2022.01) |

(52) U.S. Cl.
CPC ............. *H04L 43/04* (2013.01); *H04L 67/10* (2013.01); *H04L 67/75* (2022.05); *H04L 41/046* (2013.01); *H04L 41/5009* (2013.01); *H04L 43/08* (2013.01); *H04L 67/133* (2022.05)

(56) References Cited

U.S. PATENT DOCUMENTS

| | | | |
|---|---|---|---|
| 7,668,111 B2 | 2/2010 | Chandrasekaran et al. | |
| 8,031,715 B1* | 10/2011 | Chang | H04L 43/028 710/62 |
| 8,244,853 B1* | 8/2012 | Raanan | H04L 43/18 709/224 |
| 8,533,823 B2 | 9/2013 | Szeto et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,112,715 B2 | 8/2015 | Jain et al. | |
| 9,450,849 B1 | 9/2016 | Goldberg et al. | |
| 9,772,866 B1 | 9/2017 | Aron et al. | |
| 10,212,041 B1* | 2/2019 | Rastogi | H04L 63/205 |
| 10,693,734 B2* | 6/2020 | Rastogi | H04L 63/205 |
| 2002/0013849 A1 | 1/2002 | Schweitzer et al. | |
| 2002/0062359 A1* | 5/2002 | Klopp | H04L 67/36 709/219 |
| 2003/0217162 A1* | 11/2003 | Fu | H04L 67/02 709/229 |
| 2009/0244067 A1 | 10/2009 | Pikovsky et al. | |
| 2012/0275311 A1* | 11/2012 | Ivershen | H04L 41/12 370/241 |
| 2012/0317072 A1* | 12/2012 | Harada | G06Q 10/00 707/603 |
| 2013/0246613 A1* | 9/2013 | Kawaba | G06F 11/079 709/224 |
| 2014/0052841 A1* | 2/2014 | Kanemasa | H04L 67/1002 709/224 |
| 2014/0304407 A1* | 10/2014 | Moon | H04L 43/045 709/224 |
| 2015/0052441 A1* | 2/2015 | Degioanni | G06F 3/0481 715/734 |
| 2015/0156213 A1 | 6/2015 | Baker | |
| 2015/0358391 A1 | 12/2015 | Moon et al. | |
| 2016/0087859 A1* | 3/2016 | Kuan | H04L 41/122 715/736 |
| 2016/0087860 A1* | 3/2016 | Dixon | H04L 45/02 370/252 |
| 2016/0127180 A1* | 5/2016 | Shcherbakov | G06F 3/0482 715/735 |
| 2016/0315821 A1* | 10/2016 | Page | H04L 41/12 |
| 2016/0359955 A1 | 12/2016 | Gill et al. | |
| 2017/0019487 A1 | 1/2017 | Maheshwari et al. | |
| 2017/0024408 A1* | 1/2017 | Foley | G06F 21/55 |
| 2017/0053008 A1 | 2/2017 | Frenkel et al. | |
| 2017/0085447 A1* | 3/2017 | Chen | G06F 16/248 |
| 2017/0093645 A1 | 3/2017 | Zhong et al. | |
| 2017/0329828 A1 | 11/2017 | Gupta et al. | |
| 2018/0109602 A1* | 4/2018 | Doctor | H04L 43/12 |
| 2018/0248771 A1 | 8/2018 | Cote et al. | |
| 2019/0123970 A1* | 4/2019 | Rastogi | H04L 41/12 |
| 2019/0190803 A1* | 6/2019 | Joshi | G06F 9/45558 |
| 2019/0245769 A1* | 8/2019 | Holness | H04L 41/0681 |
| 2020/0250243 A1* | 8/2020 | Agarwal | G06F 16/951 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", 14th USENIX Symposium on Networked Systems Design and Implementation, NSDI '17, (Mar. 27, 2017).
International Search Report and Written Opinion dated Jun. 29, 2018 for corresponding PCT Application No. PCT/US2018/029484.
Non-Final Office Action dated Dec. 2, 2019 for related U.S. Appl. No. 15/963,082.
International Preminary Report dated Nov. 7, 2019 for related PCT Application No. PCT/US18/29483.
International Preminary Report dated Nov. 7, 2019 for related PCT Application No. PCT/US18/29484.
Final Office Action dated May 28, 2020 for related U.S. Appl. No. 15/963,082.
Extended Search Report dated Dec. 4, 2020 for corresponding EP Application No. 18791952.7.
Non-Final Office Action dated Apr. 8, 2020 for related U.S. Appl. No. 15/963,082.
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Notice of Allowance for U.S. Appl. No. 15/963,082 dated Jan. 28, 2022.
Li, Y., et al., "FlowRadar: A Better NetFlow for Data Centers," Proceedings of the 13th USENIX Symposium on Networked Systems Design and Implementation (NSDI '16), Mar. 16-18, 2016.
Lavine, M., "sFlow Version 5," Foundry Networks, dated Jul. 2004.
"Introduction to Netflow," University of Oregon and NSRC, dated Mar. 2017.

(56) References Cited

OTHER PUBLICATIONS

Notice of Allowance for U.S. Appl. No. 15/963,082 dated Sep. 7, 2022.

* cited by examiner

FIG. 2B
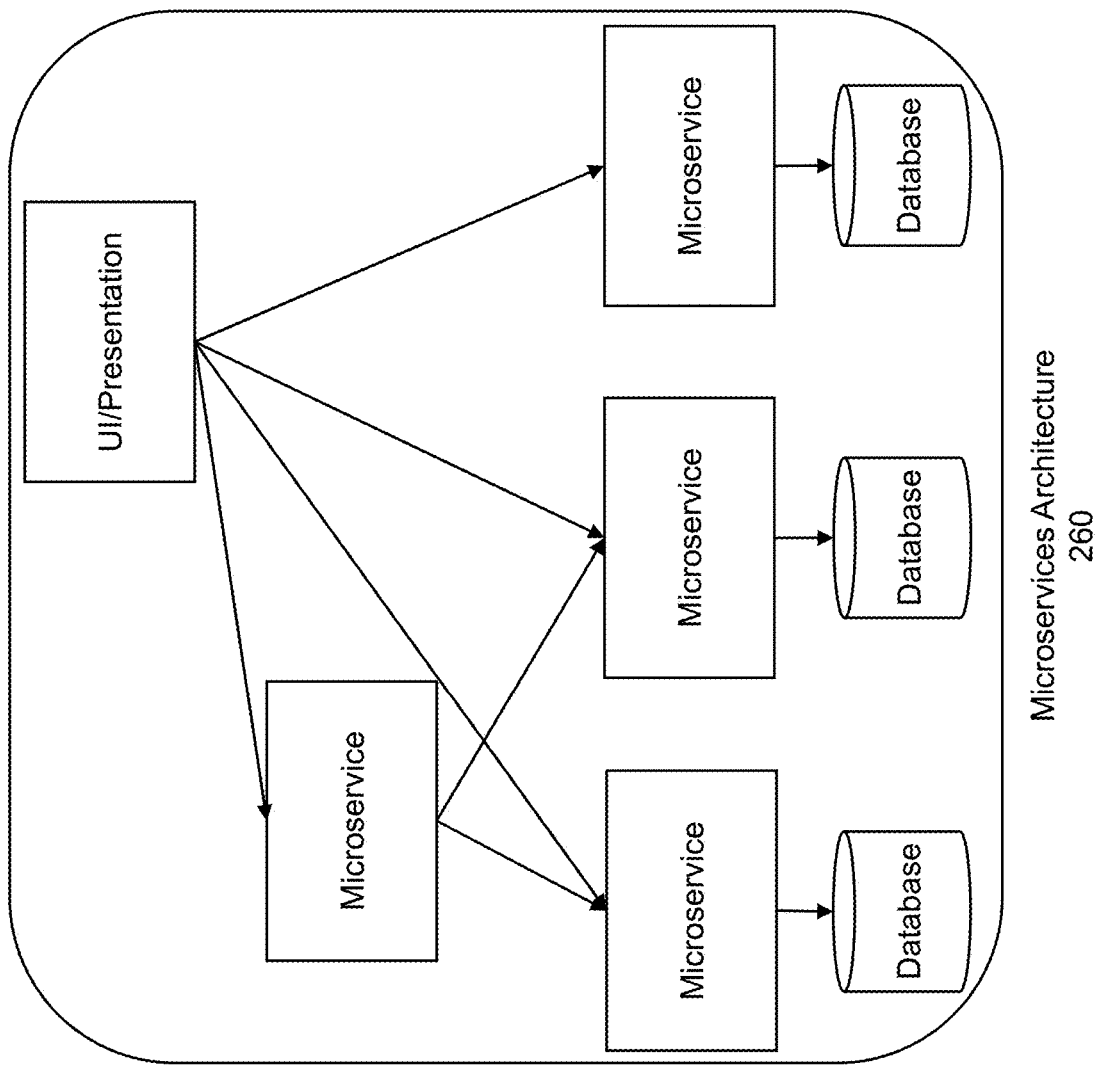
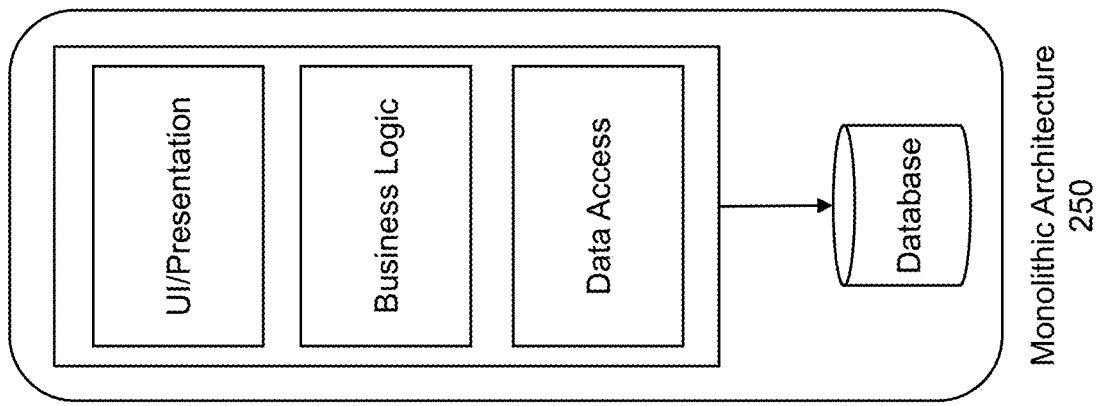

FIG. 2C
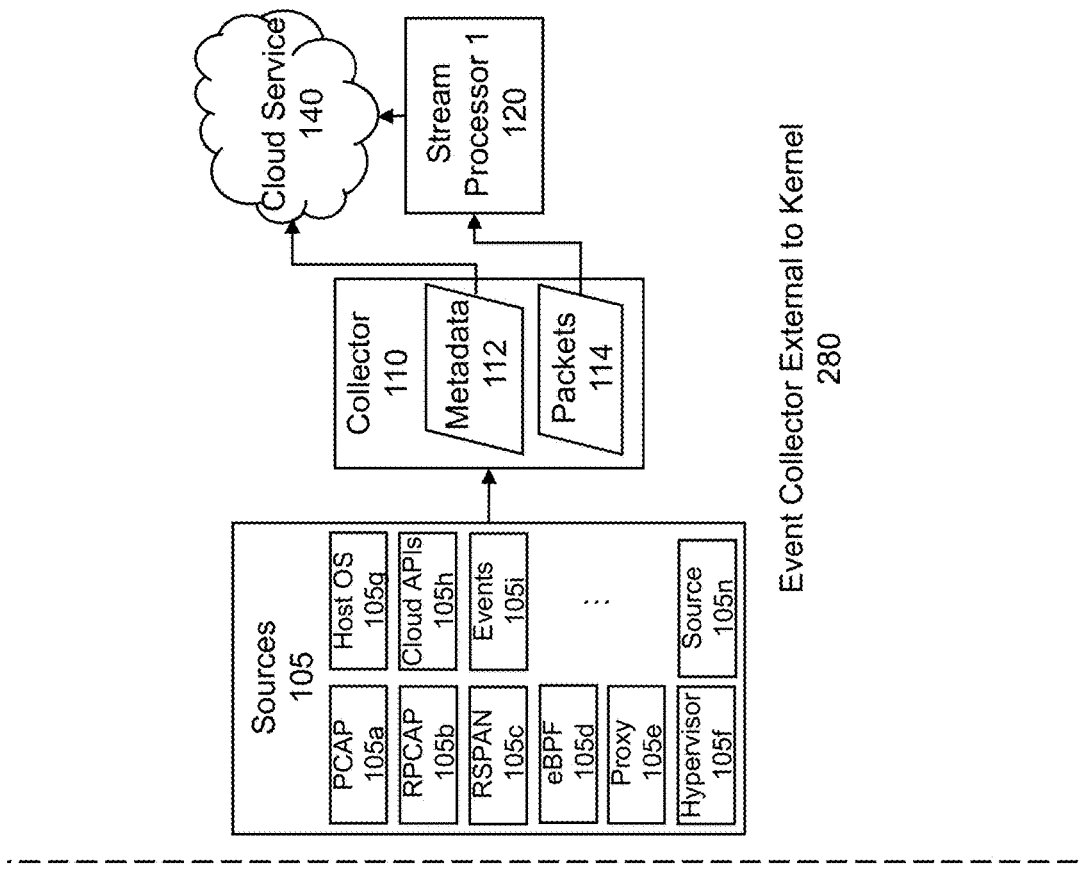
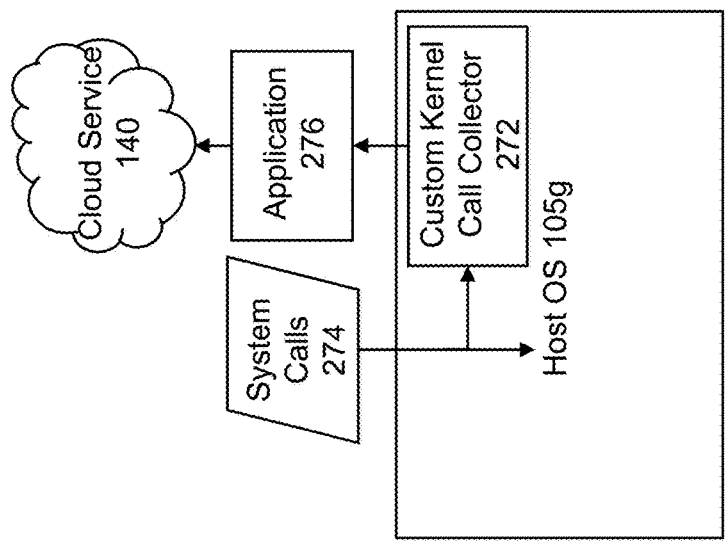

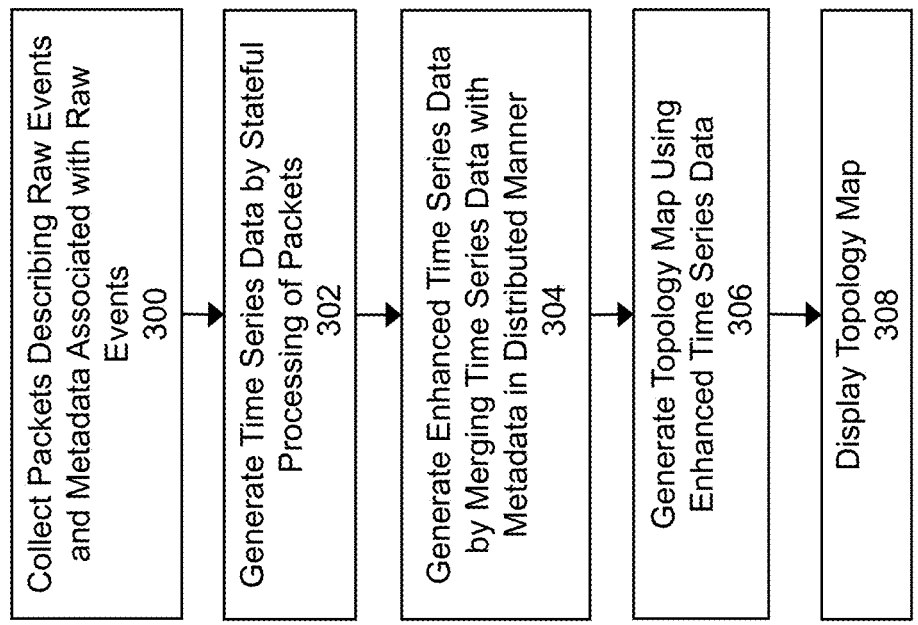

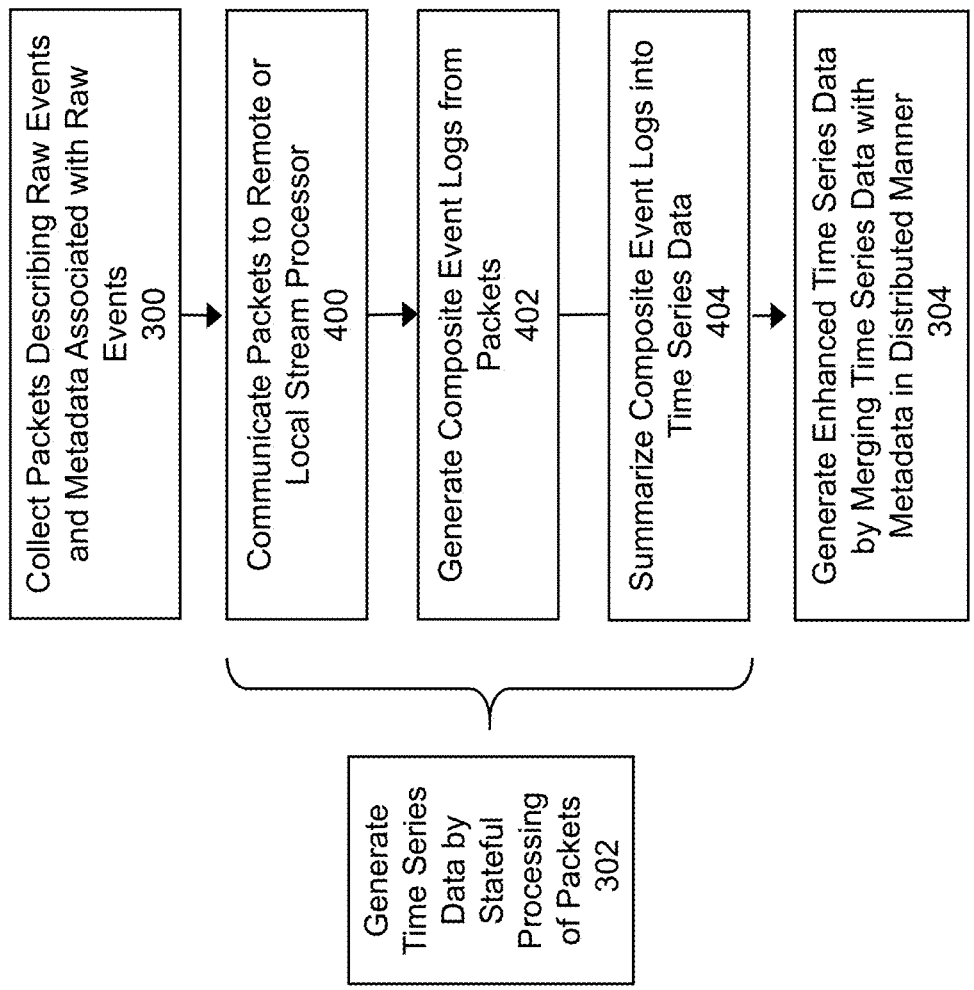

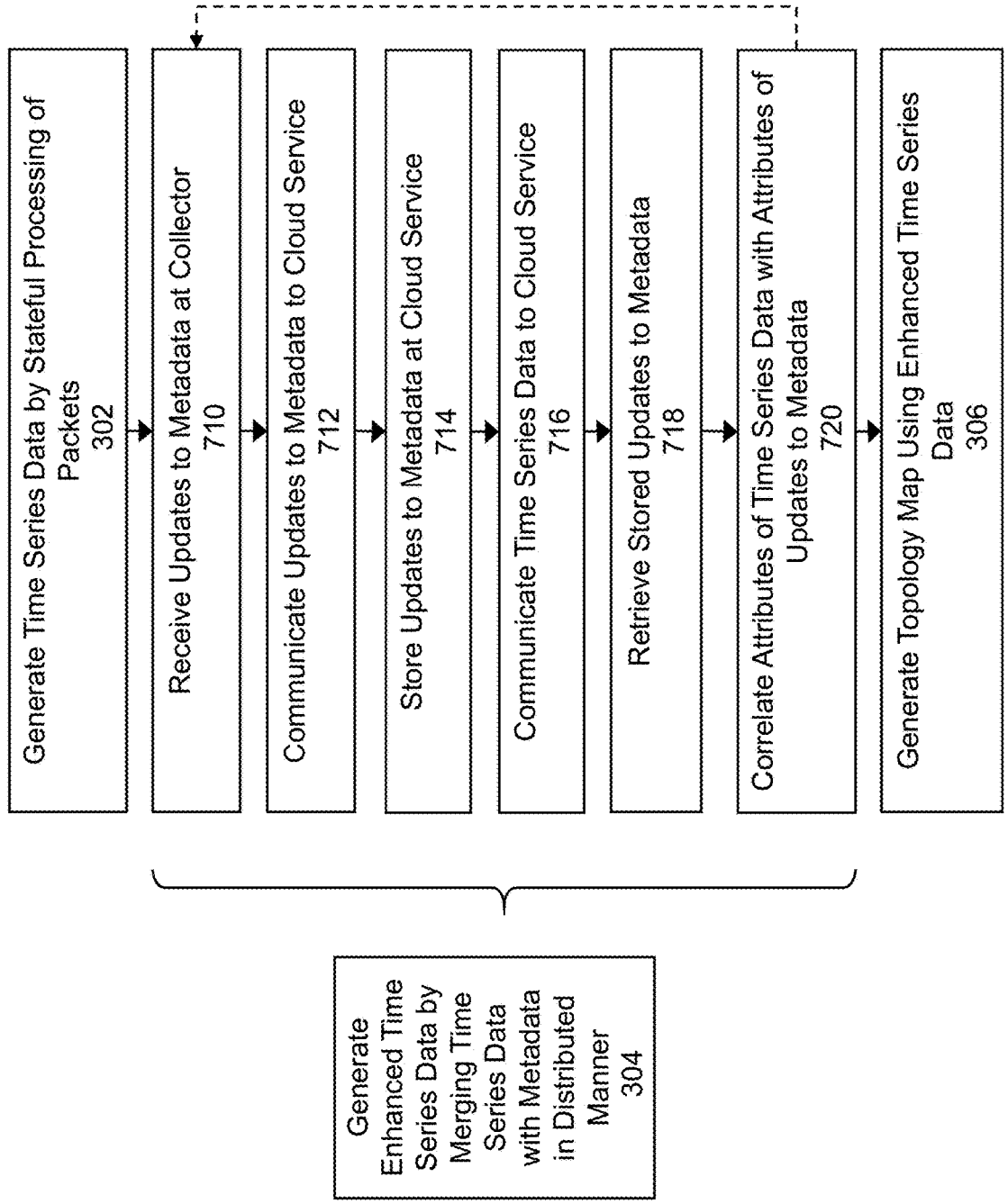

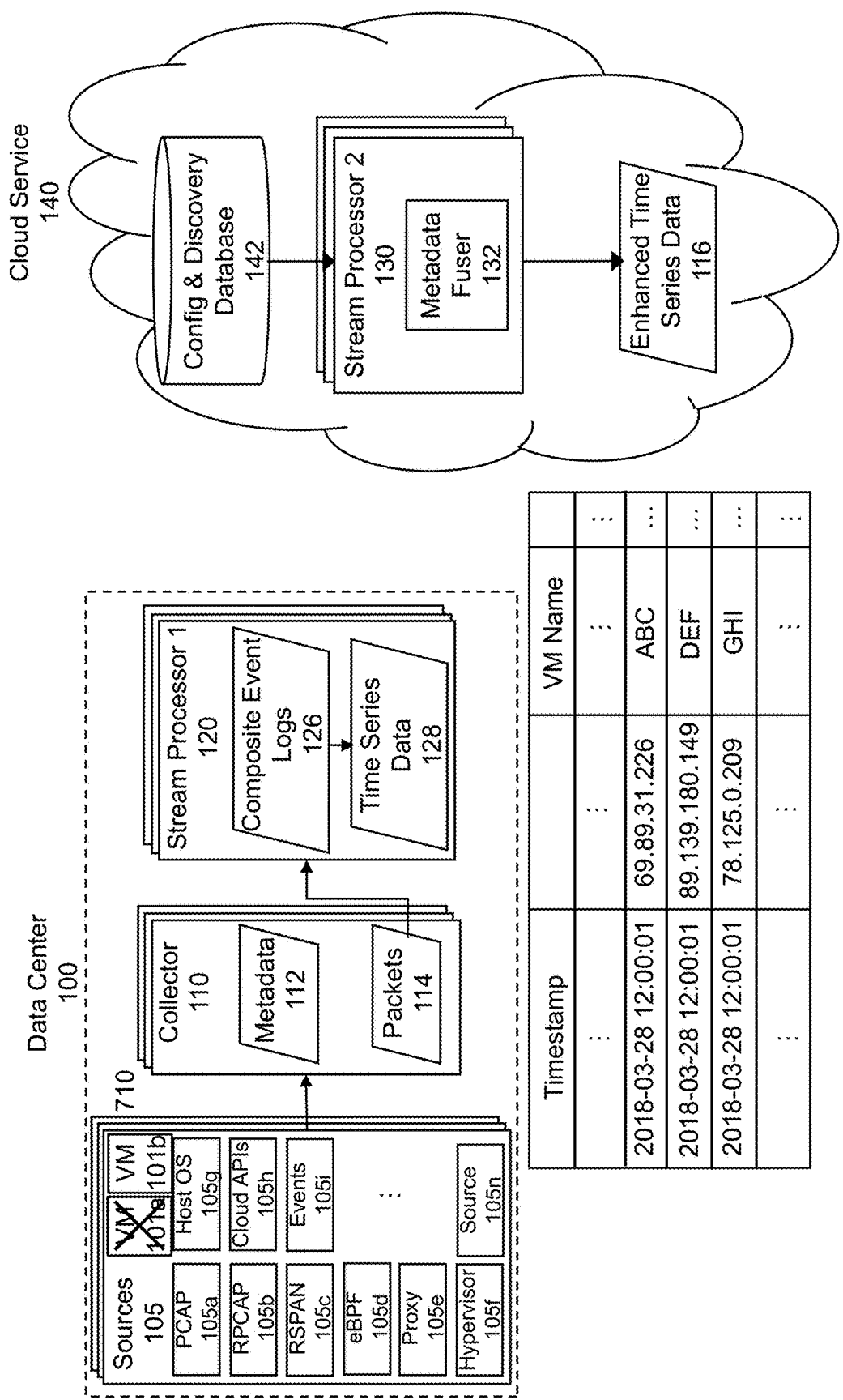

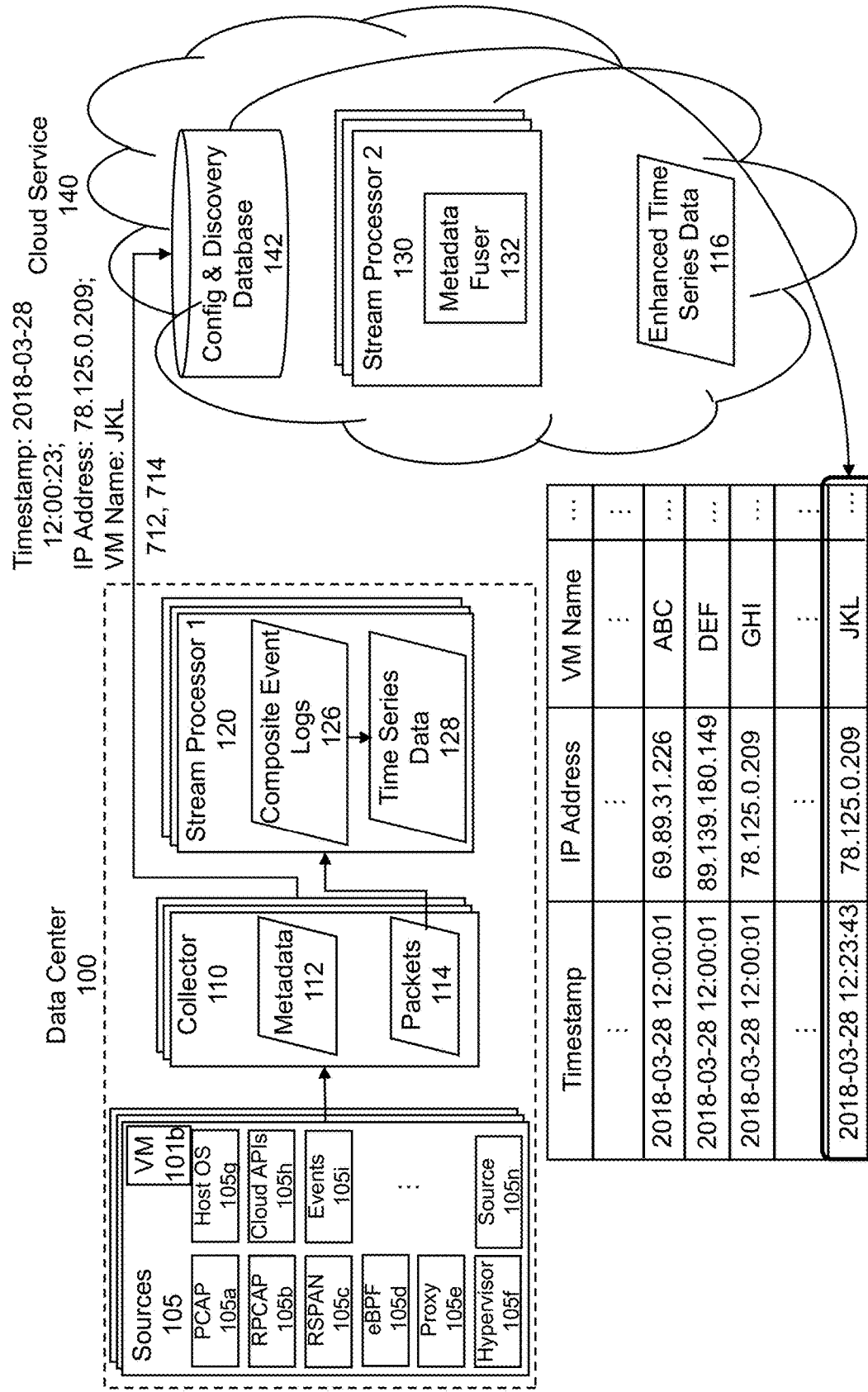

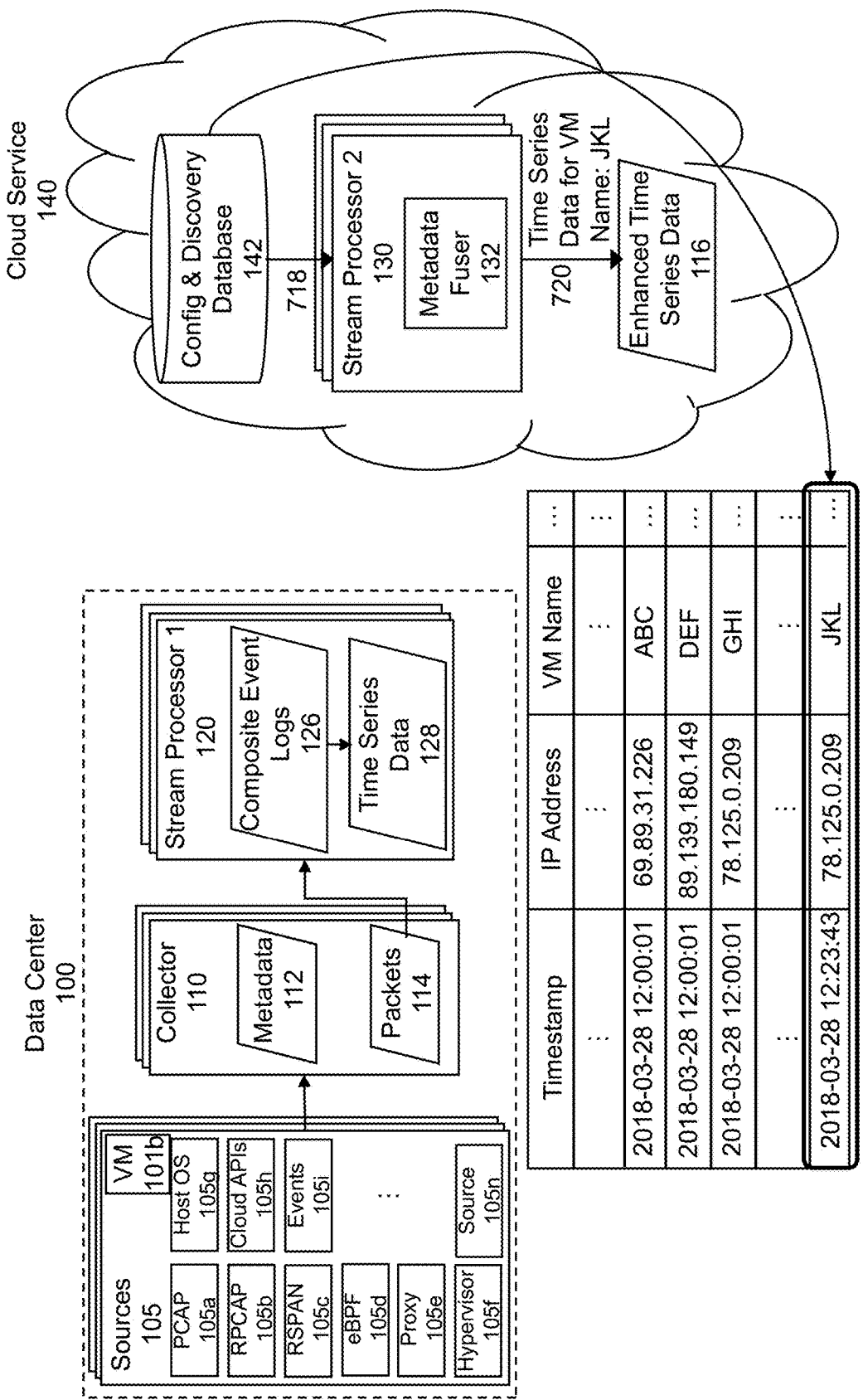

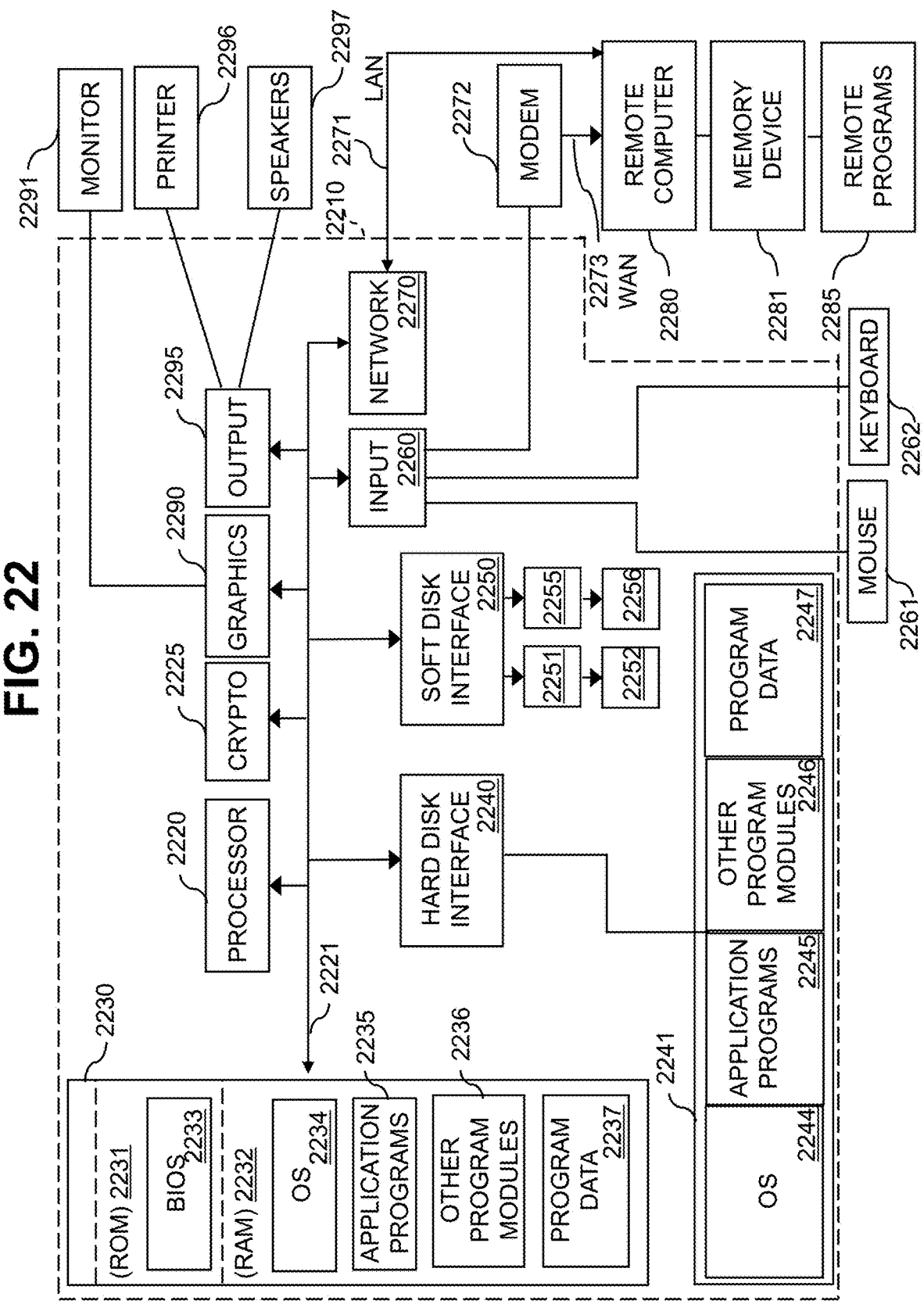

SYSTEMS AND METHODS FOR NETWORKED MICROSERVICE MODELING AND VISUALIZATION

CROSS-REFERENCE TO RELATED APPLICATIONS

The present application claims the benefit of priority to U.S. patent application No. 62/489,841, titled "SYSTEMS AND METHODS FOR NETWORKED MICROSERVICE MODELING AND VISUALIZATION," filed on Apr. 25, 2017, which is hereby incorporated by reference in its entirety. This application is related to U.S. patent application Ser. No. 15/963,082, titled "SYSTEMS AND METHODS FOR NETWORKED MICROSERVICE MODELING," filed concurrently herewith, which is hereby incorporated by reference in its entirety.

FIELD

This disclosure relates to the field of cloud application lifecycle management and, more specifically, to automated systems and methods for modeling and visualization of interactivity among microservices across a network.

BACKGROUND

Cloud applications and software architectures have experienced a shift from traditional monolithic architectures to microservices. Modern cloud applications based on microservices are characterized by multi-level architectures and deployments. Each user request to interact with a business application is realized through complex coordination among many services. A service may be defined as a logical grouping of functionally-equivalent instances within an application.

With a shift from the traditional monolithic architectures to microservices in modern cloud applications, the complexity of monitoring the services in an application has increased manifold. When migrating from traditional architectures to microservices architectures, monolithic applications typically are broken down into hundreds or even thousands of smaller, cohesive, functional microservices. To ensure reliability and performance of API-centric, service-oriented cloud applications, Site Reliability Engineers (SREs) and software DEVelopment and information technology OPerationS (DevOps) teams need to monitor the interactions between various microservices. As a matter of definition, DevOps refers to a set of practices that emphasize the collaboration and communication of both software developers and information technology (IT) professionals while automating the process of software delivery and infrastructure changes.

Application monitoring techniques for cloud applications may be categorized based on two dimensions. Traditional monitoring approaches involve instance-level monitoring (or diagnostic-oriented monitoring) in which logs and metrics from individual instances (e.g., application code, virtual machines, containers) and underlying hardware components are gathered. Service-level monitoring (or objective-oriented monitoring) involves grouping of functionally equivalent instances and tracking the service-level objectives (SLOs). The instance-level and service-level monitoring approaches can further be categorized into white-box or black-box techniques depending on whether they require changes to the application code or not. White-box monitoring approaches require code changes and common white-box techniques include log-based monitoring, Application Performance Management (APM), code instrumentation for collecting custom metrics and distributed tracing techniques. Black-box monitoring approaches do not involve changes to the code and common black-box techniques either leverage operating system-based insights or network communications to gain insights into services and applications.

Traditional application monitoring solutions designed for monolithic software architectures rely on logs or call stacks as a source of truth. In monolithic applications, the monitoring complexity is related to interactions inside the application code. Conversely, in microservices-based applications, this complexity shifts to interactions between services over the network. Consequently, the traditional code-embedded and log-centric monitoring tools are no longer effective for monitoring service-oriented cloud applications. One of the fundamental challenges of monitoring the health and performance of modern cloud applications is that of achieving visibility into all the services, APIs, and databases that make up an application.

Modern applications leverage a lot of external API services such as Google Auth®, Stripe®, and Salesforce®. Oftentimes, such external services can be the root cause of cloud-based application execution issues. Traditional code-embedded and log-based monitoring solutions are of limited use for monitoring external services, as they do not capture any information on external service interactions.

As described above, the breakdown of monolithic applications into hundreds or even thousands of smaller, cohesive, functional microservices shifts the monitoring complexity from interactions inside code to interactions over a network. Function calls within the code in monoliths have been replaced by calls going over the network in microservices. For example, the state of every request must be transferred from one service to another to build a response. The result is an explosion of chatter such as API calls, remote procedure calls (RPCs), database calls, memory caching calls, and the like. Due to this shift in complexity from the code to the interactions over the network, monitoring solutions that rely on logs or code instrumentation have become less effective for microservices-based architecture. The critical information that SREs and DevOps need to monitor is no longer the code inside a microservice, but instead is the interactions between various microservices.

Due to the breakdown of monolithic applications into a large number of functional microservices, the white-box monitoring approaches have become too complex to manage. Since modern applications use a plethora of languages and frameworks, white-box approaches need to continuously evolve to support new programming languages and frameworks.

Additionally, even if traditional application monitoring solutions were capable of monitoring traffic between microservices, traditional mapping products may not support visualization of the traffic. The reason for this is that traditional application monitoring solutions may only support applications that have three layers (e.g., an infrastructure layer, and instances layer, and a services layer) and often require inputs corresponding to the layers (e.g., an application ID, an instance ID, and a service ID,) to be provided before generating maps based on the inputs. However, modern cloud applications based on microservices may include any arbitrary number of user-defined layers that may overlap with each other. For example, layers within a cloud application may include a bare metal hardware layer having a virtualization layer on top; within the virtualization layer, there may be availability zones within a data center and guest virtual machines that are running containers on top of the virtualization layer, etc. Therefore, since traditional mapping products require inputs corresponding to the three layers described above, the maps that they generate are static and are unable to reflect any additional and/or overlapping layers.

Moreover, mapping products must be agile and capable of updating their maps dynamically to reflect changes in network traffic. For example, since virtual machines may come and go, mapping products used to visualize traffic between a virtual machine and other compute instances must be able to dynamically update their maps to indicate if the virtual machine is or is not present. As an additional example, since relationships between compute instances are ephemeral in that the relationships only exist for as long as the compute instances are communicating with each other, mapping products used to visualize these relationships must also reflect changes in these relationships. As noted above, since the maps that traditional mapping products generate are static because they may only support applications having three layers, they may be unable to reflect any changes within additional and/or overlapping layers.

Therefore, there is a need for an improved method, system, and computer program product to implement networked microservice modeling and visualization.

This background information is provided to reveal information believed by the applicant to be of possible relevance to embodiments of the present invention. No admission is necessarily intended, nor should it be construed, that any of the preceding information constitutes prior art against embodiments of the present invention.

SUMMARY

The disclosed embodiments provide an improved approach for networked microservice modeling and visualization in a distributed cloud environment. In particular, the present disclosure describes a system, method, and computer program product that can model and visualize networked microservices in a distributed cloud environment. The distributed cloud environment is characterized by a distributed architecture in which a lightweight collecting agent (a "collector") that is deployed external to a kernel of a compute instance collects network data packets communicated between compute instances of the distributed cloud environment describing various raw events, as well as metadata associated with the raw events. The collector may collect the packets and metadata from various sources (e.g., Packet Capture Protocol (PCAP), Remote Packet Capture Protocol (RPCAP), Remote Switch Port Analyzer (RSPAN), Extended Berkeley Packet Filter (eBPF), a proxy (e.g., SSLsplit), cloud APIs, a host operating system, a hypervisor, events, etc.). The metadata is communicated by the collector to a cloud service while the packets are communicated to a first stream processor that is decoupled from the collector. The first stream processor processes the packets in a stateful manner and generates a set of time series data from the packets. The collector communicates the time series data to the cloud service to which the metadata was communicated, where a set of enhanced time series data is generated by merging the time series data with the metadata in a distributed manner. A topology map describing the compute instances of the distributed cloud environment is generated by a topology module based on the set of enhanced time series data. The topology map is then presented.

The topology module may generate the topology map in response to receiving a set of inputs including a time window. The set of inputs also may include a set of filter parameters and/or a set of group by parameters. Once the topology module has received the set of inputs, the topology module may query the set of enhanced time series data based on the set of inputs and identify a subset of the enhanced time series data corresponding to the time window. The topology module also may filter and or group the subset of the enhanced time series data based on the set of filter parameters and/or the set of group by parameters. Upon receiving a set of query results, the topology module may generate the topology map based on the results, and display the topology map.

In some embodiments, once the topology map has been displayed, a request to view a set of analytics for a node or a link within the topology map may be received. Upon receiving the request, the topology module may query the set of enhanced time series data based at least in part on the request, identify a subset of the enhanced time series data corresponding to the node/link, and receive a set of query results corresponding to the subset of the identified data. The topology module also may identify the subset of the enhanced time series data based on a set of inputs (e.g., a time window, one or more filter parameters and/or one or more group by parameters). The topology module may then generate a user interface including analytics for the node/link and display the user interface.

Further details of aspects, objects and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 2B is a schematic diagram comparing a monolithic architecture to a microservices architecture according to some embodiments of the invention.

FIG. 2C is a schematic diagram comparing a kernel call collector internal to a compute host kernel and an event collector external to a compute host kernel according to some embodiments of the invention.

FIG. 3 illustrates a flowchart for networked microservice modeling and visualization in a distributed cloud environment according to some embodiments of the invention.

FIG. 4 illustrates a flowchart for generating time series data by stateful processing of network data packets according to some embodiments of the invention.

FIG. 7B illustrates an additional flowchart for generating enhanced time series data by merging time series data with metadata in a distributed manner according to some embodiments of the invention.

FIGS. 8A-8G illustrate an example of generating enhanced time series data by merging time series data with metadata according to some embodiments of the invention.

FIG. 22 is a block diagram representation of a machine in the example form of a computer system according to an embodiment of the present invention.

DETAILED DESCRIPTION OF THE EMBODIMENTS OF THE INVENTION

Figure 1:
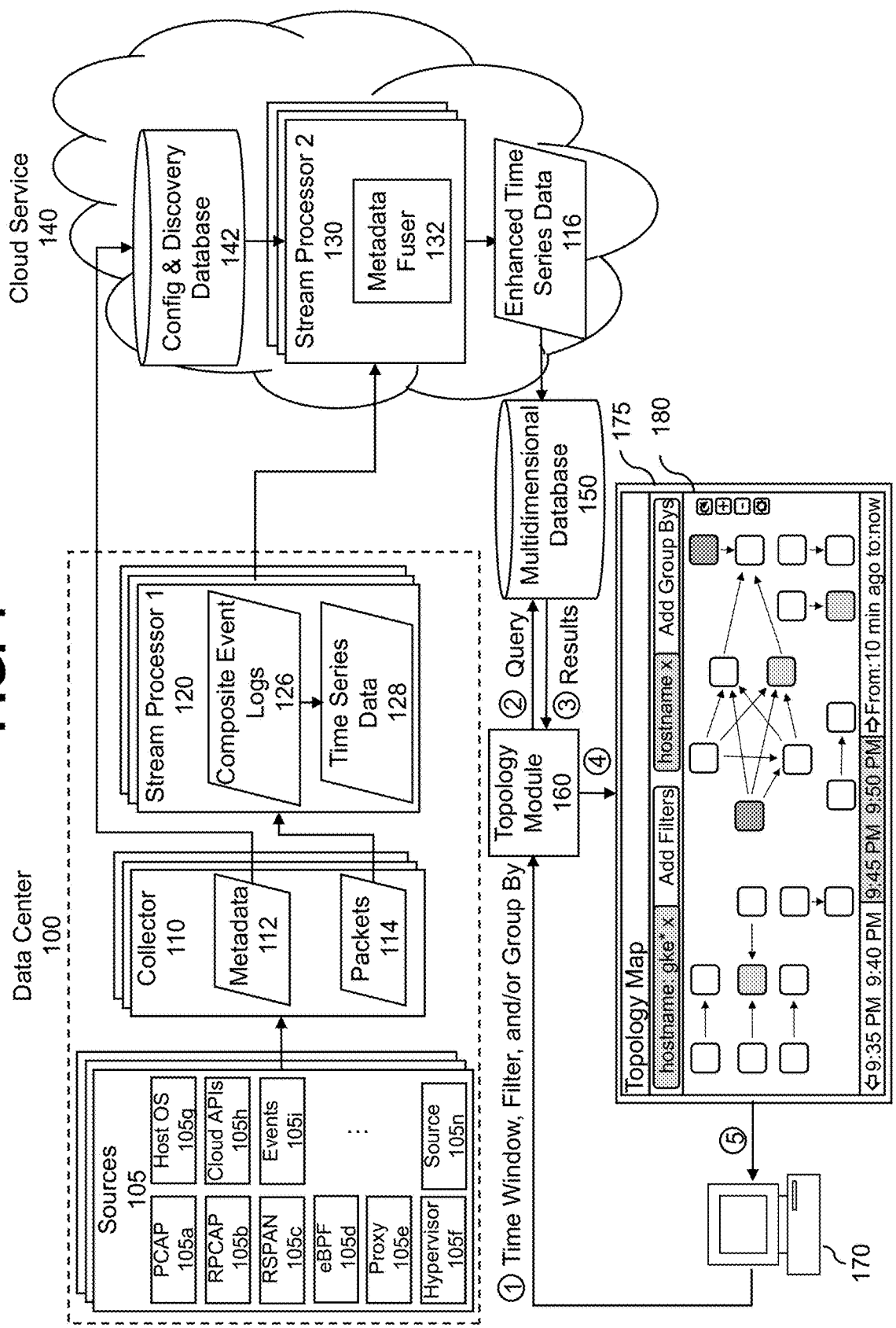
FIG. 1 illustrates a distributed cloud environment in which some embodiments of the invention are implemented.

Embodiments of the present invention will now be described more fully hereinafter with reference to the accompanying drawings, in which preferred embodiments of the invention are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout. Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of embodiments of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of embodiments of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

With the above background information and problems with prior art in mind, certain embodiments of the present invention are related to a method and system for auto-discovering service instances and behavioral resources on services in cloud applications.

As noted above, due to the shift from traditional monolithic architectures to microservices architectures in modern cloud applications, monitoring solutions have shifted their focus from monitoring application code to monitoring network communications among various microservices. However, the shift to microservices from monolithic architectures has resulted in a higher volume of network traffic, making it difficult to process network traffic at low latency. Furthermore, the shift has also resulted in arbitrary numbers of possibly overlapping layers (e.g., multiple overlapping virtualization layers), making it difficult to visualize network traffic.

To address the complexities of monitoring microservices in modern cloud applications, an embodiment of the invention, as shown and described by the various figures and accompanying text, provides a system and associated methods for collecting network interactions in real-time and uses them as the source of truth for application observability and visualization. For example, and without limitation, to capture live service interactions, a system aspect of embodiments of the present invention may comprise data collectors which may be used to capture network interactions (such as API calls, RPC calls, database calls, or interactions with external services or PaaS services) between available services and APIs in real-time. Without instrumenting the application code and by looking at the network as the source of truth, the data collectors may be able to capture the interactions between microservices (such as API calls, RPCs, database calls, and memory caching calls). Another embodiment of the invention provides a system and associated methods for reconstructing application context from raw network packets in real-time.

FIG. 1 illustrates a distributed cloud environment in which some embodiments of the invention are implemented. Although a single data center 100 is illustrated in FIG. 1, the distributed cloud environment may include multiple data centers 100. Each data center 100 may include multiple lightweight data collectors ("collector"110) and multiple compute instances, such as virtual machines or bare metal servers, in which each compute instance is associated with a corresponding collector 110. For example, in a containerized environment, a single collector 110 may collect data packets 114 from multiple containers communicating with an operating system.

In embodiments in which one or more compute instances correspond to virtual machines, a virtual machine or "VM" refers to a specific software-based implementation of a machine in a virtualization environment, in which the hardware resources of a real computer (e.g., CPU, memory, storage, etc.) are virtualized or transformed into the underlying support for a fully functional VM that can run its own operating system and applications on the underlying physical resources, just like a real computer. Virtualization works by inserting a thin layer of software directly on the computer hardware or on a host operating system. This layer of software contains a VM monitor or "hypervisor" that allocates hardware resources dynamically and transparently.

As shown in FIG. 1, one or more collectors 110 are deployed external to the kernel of a compute instance in a data center 100. To capture network interactions, a collector 110 may collect network data packets ("packets" 114) describing raw events (e.g., deployments of containerized web applications) and metadata 112 associated with the raw events from various sources 105 in real-time. Examples of metadata 112 include configuration data, IP addresses, dates/times, locations (e.g., data centers 100), node names/numbers, container names/numbers, team names, service names/IDs, VM hostnames, or any other types of data that may be associated with raw events.

The collectors 110 may employ a variety of interaction capture and tracing methods. In some embodiments, to capture network packets 114 related to API interactions, the collectors 110 may make use of Remote Packet Capture Protocol (RPCAP) forwarders. The RPCAP forwarders may run in user space and may sniff network traffic, make a copy of the packets 114, and send them to a stream processor (e.g., Stream Processor 1 120, described below). The collectors 110 may allow the option to set a Berkeley Packet Filter (BPF), sampling rate, maximum transmission unit (MTU) size, and the interface for packet capture. In various embodiments, to get visibility into HTTP Secure (HTTPS) traffic in a secure manner, the collectors 110 may use SSLsplit which acts as a user-space local proxy in the traffic path. SSLsplit uses IP-Table rules with NAT redirection to enable capture of SSL traffic. The collectors 110 may capture SSL traffic on the client side of the SSL stream (i.e., on the nodes initiating the SSL traffic). To preserve end-to-end encryption, a user-generated certificate may be used to encrypt traffic between the app and the locally-running SSLsplit proxy.

FIG. 1 illustrates examples of various sources 105 from which the collectors 110 may collect packets 114 and/or metadata 112. As shown in this figure, examples of sources 105 include PCAP 105a, RPCAP 105b, RSPAN 105c, eBPF 105d, a proxy 105e (e.g., SSLsplit), a hypervisor 105f, a host operating system 105g, cloud APIs 105h, event-based sources 105i (e.g., operating system events, such as new processes, container events, log events, and system events), and any other suitable sources 105n (e.g., Docker Socket). For example, a collector 110 may collect packets 114 describing captured traffic via PCAP 105a, SSL traffic via SSLsplit, and container events via Docker Socket and metadata 112 including timestamps, IP addresses, and VM names from virtual compute host operating systems 105g.

As the metadata 112 is collected by each collector 110 in real-time, the collector 110 communicates the metadata 112 to a cloud service 140. At the cloud service 140, the metadata 112 may be stored as key-value pairs in a configuration and discovery database 142. For example, if each record stored in the configuration and discovery database 142 has a field called "IP address" corresponding to a key, the content of the field is its value for each particular record (e.g., an IP address of 69.89.31.226). The configuration and discovery database 142 is synchronized to one or more second stream processors (Stream Processor 2 130) in the cloud service 140. The metadata 112 may be retrieved from the configuration and discovery database 142 by a second stream processor 130 and merged with a set of time series data 128, as further described below.

As the packets 114 are collected by each collector 110 in real-time, the collector 110 communicates the packets 114 over a network to one or more first stream processors (Stream Processor 1 120) for stateful processing. Since an interface (i.e., the network) exists between each first stream processor 120 and each collector 110 from which it may receive packets 114, the first stream processors 120 are decoupled from the collectors 110, such that a first stream processor 120 may be local to a collector 110 from which it receives packets 114 or remote from the collector 110 (e.g., in the same or a different data center 100). Because processing is offloaded by the collectors 110 onto external stream processors (i.e., the first stream processors 120, which are outside the critical path), central processing unit (CPU) and memory usage of the capture agents (i.e., the collectors 110) may be negligible, allowing for the processing to be scaled out and performed in a distributed manner.

In some embodiments, the distributed cloud environment and/or one or more data centers 100 within the distributed cloud environment may include multiple first stream processors 120. In such embodiments, each collector 110 may communicate the packets 114 it has collected to a first stream processor 120 to which it is assigned. For example, suppose that a session is established between two containers that are communicating with each other and that a collector 110 that collects packets 114 for this session is assigned to a first stream processor 120. In this example, once the first stream processor 120 begins receiving packets 114 from the collector 110 for this session, all subsequent packets 114 for this session will be sent by the collector 110 to the same first stream processor 120. In some embodiments, each first stream processor 120 may store various types of information identifying each session for which it is receiving packets 114 (e.g., a session ID or other unique identifier associated with each session, information describing types of statements or queries sent during each session, etc.).

Although not depicted in FIG. 1, in embodiments in which the distributed cloud environment and/or one or more data centers 100 within the distributed cloud environment includes multiple first stream processors 120, the distributed cloud environment also may include one or more load balancers (e.g., in the cloud service 140) that may assign collectors 110 to the first stream processors 120. In some embodiments, each collector 110 may be assigned to a first stream processor 120 based on a type of logic. For example, a load balancer may assign collectors 110 to first stream processors 120 using a round-robin algorithm. In some embodiments, each collector 110 also or alternatively may be assigned to a first stream processor 120 based on information maintained by a load balancer describing the locations of the collector 110 and the first stream processor 120. For example, a load balancer may assign a collector 110 to a first stream processor 120 based on a proximity of the collector 110 to the first stream processor 120, such that a first stream processor 120 that is local to the collector 110 is preferred over a first stream processor 120 that is remote from, but located within the same data center 100 as the collector 110, which is preferred over a first stream processor 120 that is in a different data center 100. In some embodiments, collectors 110 also or alternatively may be assigned to first stream processors 120 based on information maintained by the load balancer describing the processing being performed by the first stream processors 120. For example, a collector 110 within a data center 100 may be assigned to a first stream processor 120 to lower the CPU overhead for a local node at which the collector 110 is located. In this example, the collector 110 may perform very light-weight collection of packets 114 and communicate its packets 114 to a remote first stream processor 120 that performs heavy processing.

Each first stream processor 120 processes the packets 114 it receives in a stateful manner to reassemble application protocols (e.g., HTTP, MySQL, GRPC, etc.) and to analyze the transactions that are running. In some embodiments, prior to processing packets 114, a first stream processor 120 may buffer the packets 114 on a session basis to ensure that the packets 114 are processed in a stateful manner (e.g., if the packets 114 are received out of order, as further described below). A first stream processor 120 may generate a set of composite event logs 126 from the packets 114 it receives, in which each entry in the composite event logs 126 describes a transaction. The composite event logs 126 may include various values that describe the transactions (e.g., the duration of a transaction, the number of bytes sent in the transaction, etc.). For example, a first stream processor 120 may process thousands of packets 114 corresponding to a single query received from a collector 110 and generate a transaction log in a set of composite event logs 126 including one or more values describing the query (e.g., the amount of time required for a server to respond to the query, the number of bytes sent in response to the query, etc.). The set of composite event logs 126 may be stored at a first stream processor 120 in an in-memory database. In various embodiments, a first stream processor 120 may extract metadata 112 out of the packets 114 prior to generating the set of composite event logs 126.

Once a first stream processor 120 has generated a set of composite event logs 126, the first stream processor 120 may generate a set of time series data 128 that summarizes the set of composite event logs 126. The set of time series data 128 may describe network traffic, network metrics, or any other suitable streaming data that may be summarized. For example, a first stream processor 120 may generate a set of time series data 128 including multiple data points from a set of composite event logs 126, in which each data point summarizes the set of composite event logs 126 for each second within a span of time described by the set of composite event logs 126. Therefore, the volume of data included in a set of time series data 128 generated by each of the first stream processors 120 is orders of magnitude smaller than the volume of data included in the packets 114 from which the set of time series data 128 was generated. Stateful processing of packets 114 is further described below.

Each of the first stream processors 120 communicates a set of time series data 128 it generates to a cloud service 140 (e.g., over HTTP links) at which a second series of stream processing is performed by a second stream processor 130. As shown in FIG. 1, the cloud service 140 may be scaled out to include multiple second stream processors 130. Although not depicted in FIG. 1, in some embodiments, a second stream processor 130 may receive time series data 128 from multiple first stream processors 120 located in multiple data centers 100. Furthermore, although not illustrated in FIG. 1, in various embodiments, a load balancer (e.g., an NGINX load balancer) in the cloud service 140 may determine which second stream processor 130 to which a particular first stream processor 120 communicates its time series data 128 (e.g., using a round-robin algorithm).

In addition to receiving a set of time series data 128 from one or more first stream processors 120, a second stream processor 130 also may retrieve metadata 112 stored in the configuration and discovery database 142 and enhance the set of time series data 128 with information included in the metadata 112 (e.g., VM hostname, service ID, username, etc.). The second stream processor 130 may enhance the time series data 128 using a metadata fuser 132 that merges the time series data 128 with the metadata 112 to generate a set of enhanced time series data 116. In some embodiments, the metadata fuser 132 may merge the time series data 128 with metadata 112 by correlating a set of attributes of the time series data 128 with a corresponding set of attributes of the metadata 112. For example, for a particular data point within a set of time series data 128 describing various metrics (e.g., latencies), the metadata fuser 132 may identify an IP address corresponding to the data point within a set of time series data 128 and map the IP address to a key-value pair included among the metadata 112 retrieved from the configuration and discovery database 142. In this example, if the IP address is associated with a VM name specified by an additional key-value pair, the metadata fuser 132 may associate the VM name with the data point as well. Thus, the enhanced time series data 116 corresponds to data points of the time series data 128 that have been enhanced with the metadata 112.

Once a set of enhanced time series data 116 has been generated, it may be stored in a multidimensional database 150. The enhanced time series data 116 may be stored in the multidimensional database 150 in a columnar fashion, in which each column corresponds to a feature or attribute of the enhanced time series data 116 (e.g., max values, mean values, standard deviations, etc.) and each row or record corresponds to a data point corresponding to a time interval (e.g., one second) within the enhanced time series data 116. In some embodiments, the multidimensional database 150 may be an Online Analytical Processing (OLAP) database (e.g., Druid) or any other suitable type of database that allows for the enhanced time series data 116 to be queried in real-time or near real-time.

Although illustrated as single databases, the databases (i.e., the configuration and discovery database 142 and/or the multidimensional database 150) may be composed of multiple separate databases. In such embodiments, the databases may be located in different physical locations and some of the databases may be accessible via a remote server. In some embodiments, the databases may include multiple tiers of storage in a storage pool. The storage may be accessible through a network, such as a networked storage (e.g., a SAN, NAS, etc.). The storage pool also may include one or more instances of local storage. Such local storage may include solid state drives (SSDs), hard disk drives (HDDs), and/or other storage devices.

The enhanced time series data 116 stored at the multidimensional database 150 may be queried using a topology module 160, which may receive queries or other types of inputs from one or more user stations 170. A user station 170 comprises any type of computing station that may be used to operate or interface with the topology module 160. Examples of such user stations 170 include, for example, workstations, personal computers, or remote computing terminals. A user station 170 comprises a display device, such as a display monitor, for displaying a user interface 175 to users at the user station 170. A user station 170 also comprises one or more input devices for a user to provide inputs to the topology module 160, such as a mouse or keyboard to manipulate a pointing object in a graphical user interface.

Based on the query results, the topology module 160 may generate a user interface 175 including a topology map 180 describing a topology of various compute instances within the distributed cloud environment. Examples of such compute instances include teams operating within a data center 100, services operating within the distributed cloud environment, containers within a set of data centers 100, pods (i.e., one or more containers located on the same host machine) within a data center 100, VMs operating within a team, etc. The topology map 180 also may describe relationships between the compute instances. For example, a topology map 180 may describe various metrics associated with interactions between compute instances (e.g., throughput, error rates, latency, etc.).

The topology module 160 may generate the topology map 180 based on a set of inputs originating from a user station 170. The set of inputs may specify a time window describing a span of time during which the topology map 180 of one or more compute instances within the distributed cloud environment is to be generated. The set of inputs also may specify a filter parameter that filters the compute instances included in the topology map 180 and/or a group by parameter that groups the compute instances included in the topology map 180. Once generated, the topology module 160 may communicate the user interface 175 including the topology map 180 to a user station 170 from which the set of inputs was received. For example, as shown in step 1 of FIG. 1, the topology module 160 receives a set of inputs including a time window (e.g., a time window spanning from 9:45 PM to the present), a filter parameter (e.g., hostnames beginning with "gke*"), and a group by parameter (e.g., hostname). Then, in steps 2 and 3 respectively, the topology module 160 queries the enhanced time series data 116 stored at the multidimensional database 150 based on the set of inputs and receives a set of results in response. Continuing with this example, the topology module 160 generates a user interface 175 including the topology map 180 in step 4. In this example, each compute instance is represented as a node and links between nodes represent relationships between the compute instances, in which the links may be associated with information describing the relationships between various compute instances (e.g., types of queries being sent from one VM to another, various metrics associated with the traffic between the compute instances, such as latency, error rates, etc.). Finally, in step 5, the user interface 175 including the topology map 180 is displayed at the user station 170 from which the set of inputs were received.

Figure 2A:
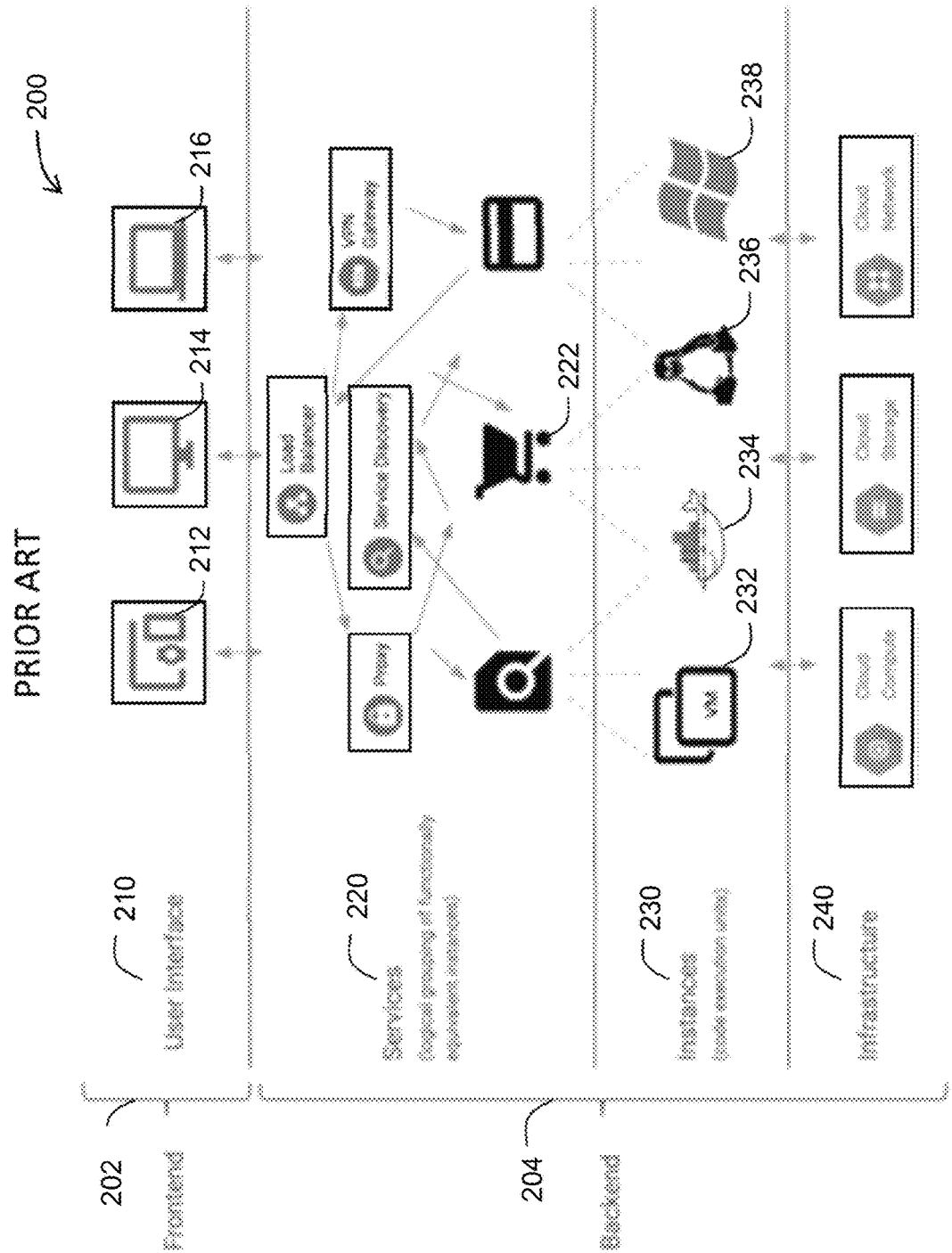
FIG. 2A is a schematic diagram of an exemplary multi-layered architecture of cloud-based microservices as known in the prior art.

FIG. 2A illustrates the multi-level architectures and deployments that characterize modern cloud applications based on microservices. At the top level of the exemplary architecture 200, users interact with a given business application via frontend 202 interfaces 210 such as mobile apps 212, browsers, TV apps 214, and consumer devices 216. User interactions are communicated to the application backend 204 (i.e., server side) via application programming interfaces (APIs). As a matter of definition, an API is a set of routines, protocols, and tools for building software applications. An API specifies how software components interact.

As noted above, each user request to interact with a business application is realized through complex coordination among many services 220. As also noted above, a service may be defined as a logical grouping of functionally-equivalent instances 230 within an application. Hence, services are a critical abstraction level in the application hierarchy. Services may comprise multiple instances 230 of code executing inside VMs 232, containers 234, or bare metal operating systems 238. As further described in FIG. 2A, instances 230 execute on available computing architecture 240, the component(s) of which forms the lowest layer of the multi-level architecture 200.

For example, and without limitation, some number of instances may be collectively configured to provide a Representational State Transfer (REST) service for an item list in a shopping cart 222. As a matter of definition, REST is an architectural style for networked hypermedia applications primarily used to build web services that are organized into resources (each of which comprises a chunk of related information, such as a user profile, a collection of updates, or a global user identifier). Each resource is identified by one or more Uniform Resource Identifiers (URIs). To access the resource, an application may call a Hypertext Transfer Protocol (HTTP) operation on one of the resource's URIs. In the example shown in FIG. 2A, multiple instances 234, 236 may be configured to serve the same REST endpoint (or URI) and, as illustrated, may be grouped to form a "list shopping cart items" service 222.

FIG. 2B is a schematic diagram comparing a monolithic architecture to a microservices architecture according to some embodiments of the invention. Referring first to the monolithic architecture 250, applications having a monolithic architecture 250 are built as a single unit having a set of components. These components include a UI or presentation layer, a business logic layer, a data access layer, and a database (e.g., tables in a relational database management system). The UI/presentation layer handles HTTP requests and responds to the requests (e.g., by populating HTML views sent to a browser). The business logic in the business logic layer of a monolithic application may be executed to retrieve and update data from the database using the database access layer.

Applications having a monolithic architecture 250 have various drawbacks. A major drawback of the monolithic architecture 250 is that monolithic applications are difficult to scale and maintain. For example, since monolithic applications are built as a single unit having components that are designed to work together and which share resources and memory space, it is difficult to isolate individual services, making scaling monolithic applications challenging if different modules have resource requirements that conflict with each other. As an additional example, monolithic applications must be redeployed in their entirety upon each update. As yet another example, bugs in any module within a monolithic application may impact the application's availability.

In contrast, applications having a microservices architecture 260 are split into smaller logically independent microservices that are interconnected. Each microservice has its own business logic layer and database. Therefore, a change made to one microservice does not affect other microservices within a microservices architecture 260. In a microservices architecture 260, microservices may communicate with each other via messaging protocols (e.g., JMS or AMQP) and/or lightweight protocols (e.g., HTTP and REST).

The splitting of microservices applications into smaller services addresses several of the problems posed by monolithic applications. For example, since each microservice in a microservices architecture 260 is deployed independently, each microservice also may be scaled up or down independently of each other. As an additional example, each microservice may be developed discretely and updated/upgraded independently of each other. As yet another example, since microservices are interconnected, but logically independent of each other, dependencies between microservices are minimized, such that a bug in one microservice is unlikely to affect another microservice.

Network-centric approaches to monitoring microservices may involve the use of collecting agents that collect information describing network traffic and additional components that subsequently process the collected information. Examples of such collecting agents are illustrated in FIG. 2C, which is a schematic diagram comparing a kernel call collector internal to a compute host kernel and an event collector external to a compute host kernel according to some embodiments of the invention. Referring first to the kernel call collector internal to a kernel 270, traditional systems attempting to monitor network traffic within a distributed cloud environment may require the use of a custom kernel call collector 272 that resides in the kernel of a host operating system 105g. The custom kernel call collector 272 is a probe developed specifically to interpret system calls 274 received at a host operating system 105g and communicates the system calls 274 to an application 276 running in user space that includes a set of utilities that processes the system calls 274. The application 276 is tightly coupled to the custom kernel call collector 272. Therefore, all processing performed by the application 276 must be performed locally (relative to the host operating system 105g), which may result in high overhead (e.g., memory, bandwidth, etc.). Once processed, information generated by the application 276 that interprets the system calls 274 is communicated to a cloud service 140. In some embodiments, the system in which the kernel call collector internal to the kernel 270 operates may include additional components not depicted in FIG. 2C. For example, the system calls 274 may be buffered (e.g., by a ring buffer) prior to their communication to the application 276 by the custom kernel call collector 272.

In contrast, FIG. 2C also illustrates a schematic diagram of an event collector external to the kernel 280 that may be used in the approach for networked microservice modeling in a distributed cloud environment in the present disclosure. As depicted in this figure, a collector 110 residing outside of the kernel of a host operating system 105g collects packets 114 and metadata 112 from various sources 105. Thus, rather than developing a custom kernel call collector 272 that is tied to one type of technology as in the case of the kernel call collector that is internal to the kernel 270 (e.g., collecting system calls 274 directed to a host operating system 105g), the event collector external to the kernel 280 is able to leverage multiple existing sources 105 of information and collect packets 114 and metadata 112 from them. Additionally, the first stream processor 120 to which the packets 114 are communicated is decoupled from the collector 110, allowing the packets 114 to be processed locally in a data center 100 at which the collector is located 110 or remotely (in the same data center 100 at which the collector 110 is located or in a different data center 100 altogether). This decoupling of the collector 110 from the first stream processor 120 allows processing of the packets 114 to be scaled out across multiple clouds, alleviating the overhead that may be required for the processing. In some embodiments, the system in which the event collector external to the kernel 280 operates may include additional components not depicted in FIG. 2C. For example, the metadata 112 and/or the packets 114 may be buffered (e.g., in a ring buffer) prior to their collection by the collector 110.

FIG. 3 is a flowchart for networked microservice modeling and visualization in a distributed cloud environment according to some embodiments of the invention. Some of the steps illustrated in the flowchart are optional in different embodiments. In some embodiments, the steps may be performed in an order different from that described in FIG. 3.

As shown in FIG. 3, the flowchart begins when a collector 110 in the distributed cloud environment collects packets 114 describing raw events and metadata 112 associated with the raw events (in step 300). As described above in conjunction with FIG. 1, the collector 110 collects packets 114 and metadata 112 from various sources 105 in real-time. The metadata 112 is communicated to the cloud service 140, where it may be stored in the configuration and discovery database 142, while the packets 114 are communicated over a network to a first stream processor 120 that is decoupled from the collector 110. The first stream processor 120 processes the packets 114 in a stateful manner to generate a set of time series data (in step 302). The first stream processor 120 then communicates the set of time series data 128 to a second stream processor 130 within the cloud service 140. The second stream processor 130 merges the time series data 128 with the metadata 112 retrieved from the configuration and discovery database 142 in a distributed manner to generate a set of enhanced time series data 116 (in step 304). The set of enhanced time series data 116 may be stored in a multidimensional database 150 where it may be queried by a topology module 160. Based on the query results, the topology module 160 may generate a user interface 175 including a topology map 180 describing a topology of various compute instances within the distributed cloud environment (in step 306). Finally, the user interface 175 including the topology map 180 may be displayed (in step 308).

FIG. 4 illustrates a flowchart for generating time series data by stateful processing of network data packets according to some embodiments of the invention. Some of the steps illustrated in the flowchart are optional in different embodiments. In some embodiments, the steps may be performed in an order different from that described in FIG. 4.

Figure 5A:
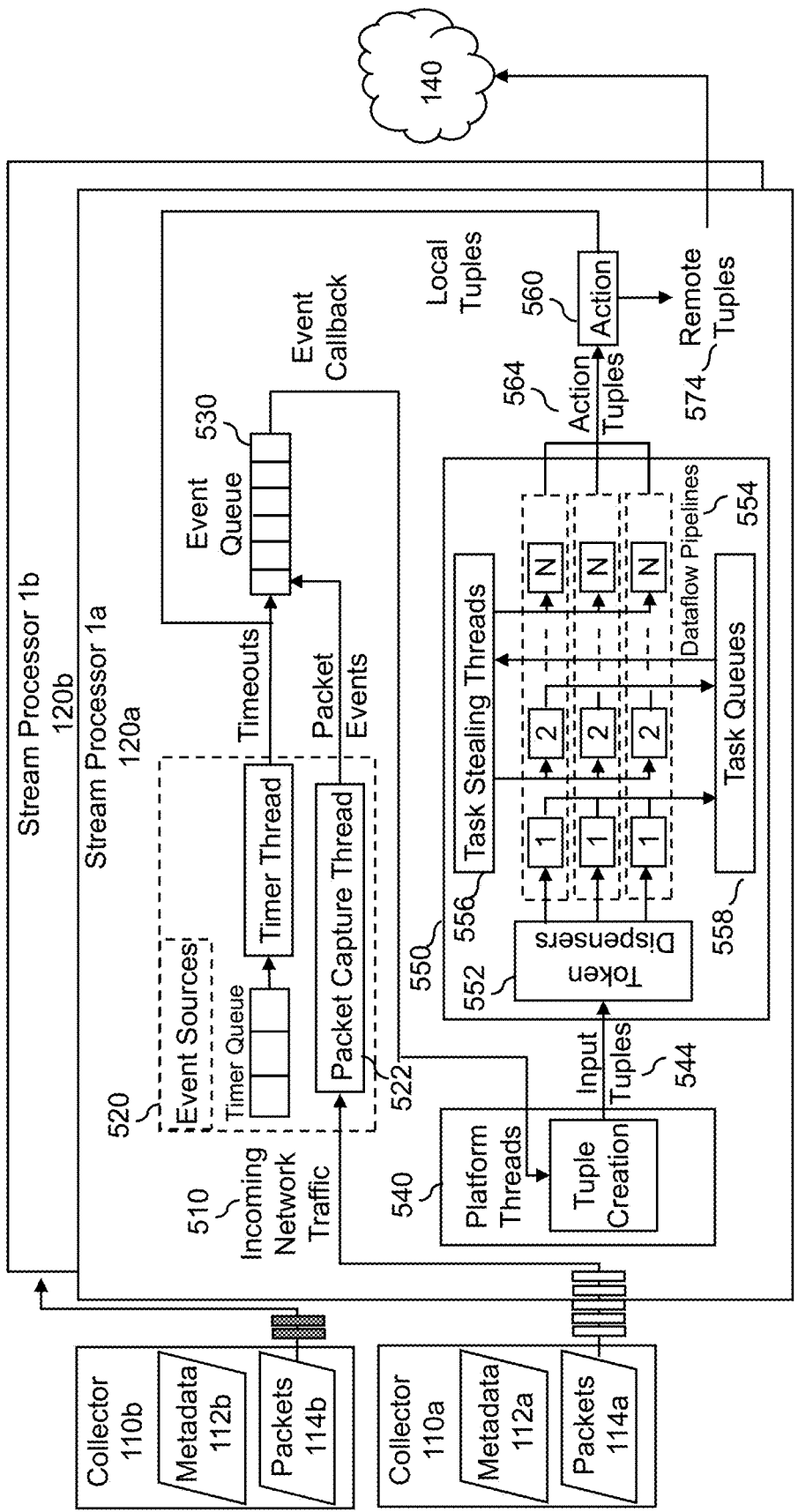
FIGS. 5A-5D are schematic diagrams of exemplary architectures of a first stream processor according to some embodiments of the invention.

As described above, once a collector 110 in the distributed cloud environment has collected packets 114 describing raw events and metadata 112 associated with the raw events (in step 300), the set of time series data may be generated by stateful processing of the packets 114 (in step 302). To process the packets 114 in a stateful manner, the packets 114 are communicated to a remote or local first stream processor 120 (in step 400). As also described above, in some embodiments, a data center 100 may include multiple first stream processors 120, in which each collector 110 communicates the packets 114 it has collected to a first stream processor 120 to which it has been assigned. For example, as shown in FIG. 5A, suppose that collector 110a has been assigned to first stream processor 120a and that collector 110b has been assigned to first stream processor 120b. In this example, once the collectors 110a-b have been assigned to the first stream processors 120a-b (e.g., based on a round-robin algorithm), collector 110a always sends its packets 114a to first stream processor 120a while collector 110b always sends its packets 114b to first stream processor 120b.

Referring back to FIG. 4, the first stream processor 120 may generate composite event logs 126 from the packets 114 (in step 402) and then summarize the composite event logs 126 into a set of time series data 128 (in step 404). Steps 402 and 404 are performed by components of a distributed stream processor (e.g., a first stream processor 120), as illustrated in FIG. 5A. Each of the first stream processors 120 may reconstruct the application context from the raw network packets 114 in real-time. The first stream processor 120 may adopt a component-based dataflow architecture that may allow for rapid assembly of packet-processing functionalities from components into dataflow pipelines 554 that perform tasks such as assembling packets 114 into application-layer content, operations such as aggregating traffic statistics, or deep-packet inspections into specific application traffic.

The first stream processor 120 may make use of dataflow pipelines 554 which may be compactly expressed in a declarative rule-based language. The declarative rule-based language may include constructs for modularization and components, interoperability with legacy code, and runtime support for parallelism. The declarative rule-based language may be used to specify a linear pipeline 554 of components, where each component corresponds to a specific stage in the analysis pipeline 554. To execute these pipelines 554 efficiently, the first stream processor 120 may provide fine-grained parallelism at the level of individual components within the pipelines 554. This parallelism may be achieved through the use of a threading library based on a task-stealing model that may achieve both automatic load-balancing and high throughput processing.

Once the service-level interactions captured by the collectors 110 from the network have been shipped to a first stream processor 120, the first stream processor 120 may follow protocol state machines and may track every service interaction in an in-memory database. This on-the-fly analysis approach advantageously may be more scalable and real-time compared to the 'store-first, analyze later' approach of log file analysis. The first stream processors 120 may be horizontally scalable and may have multi-core capabilities that may allow them to analyze tens of thousands of service interactions per second. This framework-agnostic interaction analysis may allow the system to be a broad coverage solution, as any service that talks over the network may be tracked.

A first stream processor 120 may accept network events 510 as input to each dataflow pipeline 554 that could either be external (e.g., packet capture from the network) or internal (e.g., local periodic events). The events may be queued 530 and scheduled by the platform threads 540, which may generate a continuous stream of tuples 544 from the incoming events 510 and may insert them into the pipelines 554 for execution.

A method aspect of embodiments of the present invention may include a token-based scheduling mechanism used within a first stream processor 120. Each incoming tuple 544 may be assigned a token number by a token dispenser 552 and then may be scheduled for running within the dataflow pipeline 554. Each pipeline 554 may have its own token dispenser 552. At any time, only a pre-specified number of tokens may be allocated for each pipeline 554, hence limiting the number of in-flight tuples in the pipeline 554. Once tuples are assigned a token number, they then may be processed within the dataflow pipeline 554. For example, and without limitation, the first stage in the pipeline 554 is an input component. All components may be executed using a task-stealing framework 556, in which a common pool of general-purpose task-stealing threads 556 capable of performing any tasks may steal tasks from each other during processing to achieve load-balancing. As input tuples 544 traverse each component at every processing stage, output tuples 564 (also called action tuples) may be generated and buffered for processing in the next component. Based on the ordering semantics of each component, each buffered tuple ready for processing may be designated a ready task, and enqueued into task queues 558. Each task queue 558 may be assigned to a task-stealing thread 556 running on a processing core, which may dequeue the task from its assigned task queue 558 for processing. In a multicore system, these threads may run in parallel, hence allowing multiple tuples to be processed in parallel within the pipelines 554. This characteristic may advantageously enable concurrent processing within each component (for different incoming tuples 544), or processing stages within a pipeline 554 to run in parallel. In the event of overload due to high traffic load, packets 114 included in incoming network traffic 510 may be dropped by a packet capture thread 522. However, once a packet 114 is accepted into the event queue 530, the first stream processor 120 may ensure that this packet 114 will be processed. At the final stage of the pipeline 554, output action tuples 564 may be generated and may be advantageously used to perform specific actions 560, including (1) shipping the tuples 574 into another pipeline 554 (at the same or remote node) for further processing, (2) redirecting tuples 574 to a router controller for making traffic management decisions (e.g., rate limit or block a particular flow), (3) materializing into tables as traffic statistics, or (4) raising alarms for the user.

Figure 5B:
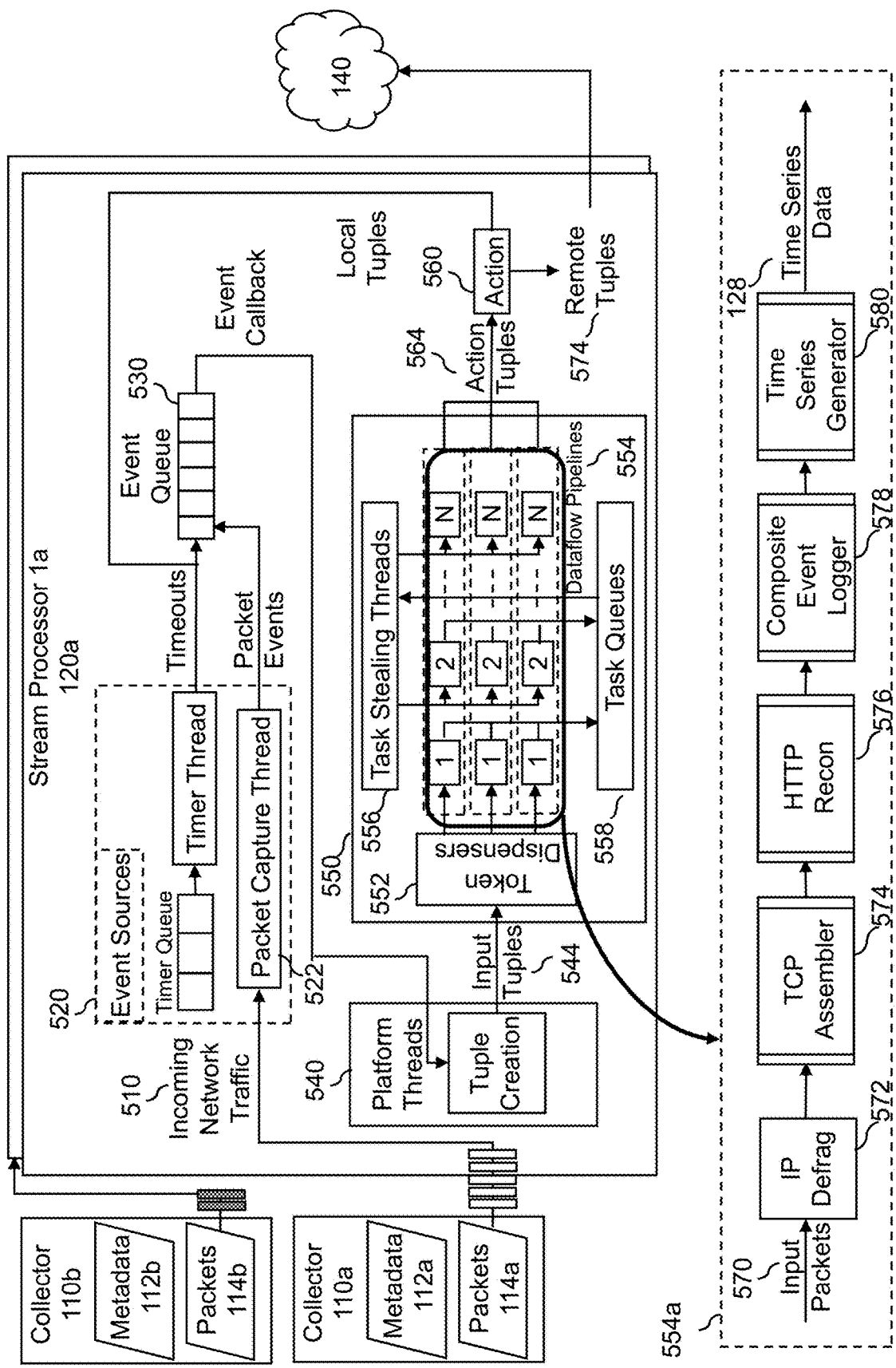

Referring now to FIG. 5B, an exemplary dataflow pipeline 554a that illustrates an execution model of the first stream processor 120 will now be discussed in detail. The reconstruction pipeline 554a within a first stream processor 120 has the following stages: (a) IP Defragmentation 572: IP defragmentation may be done in a stateful manner to accumulate input packets 570; (b) Transmission Control Protocol (TCP) Assembler 574: Following the TCP connection setup/teardowns and TCP sequence numbers, the client and server side of communication may be reconstructed and the network flows may be identified. This may also be done in a stateful manner; (c) HTTP Reconstruction 576: The output of TCP reassembly may be sent to HTTP reconstruction, where the system may analyze the entire HTTP communication and may reconstruct the HTTP request, response, payload, and headers. For HTTP reconstruction, the system may support HTTP pipelining (where a single TCP connection may have multiple HTTP queries); (d) Composite Event Logger 578: The output of HTTP Reconstruction 576 may result in composite event logs 126 from which the first stream processor 120 may extract the metadata 112 (based on regular expressions) and the golden signals of monitoring (latency, traffic, and errors). For each interaction detected, composite event logs 126 may be created in an in-memory database (in step 402); and (e) Time Series Generator 580: Finally, every second, these metrics may be rolled-up into the time series data 128 (in step 404). The time series data 128 may then be ingested by a downstream multidimensional database 150 (e.g., an OLAP database), which may be optimized for time series data 128.

Figure 5C:
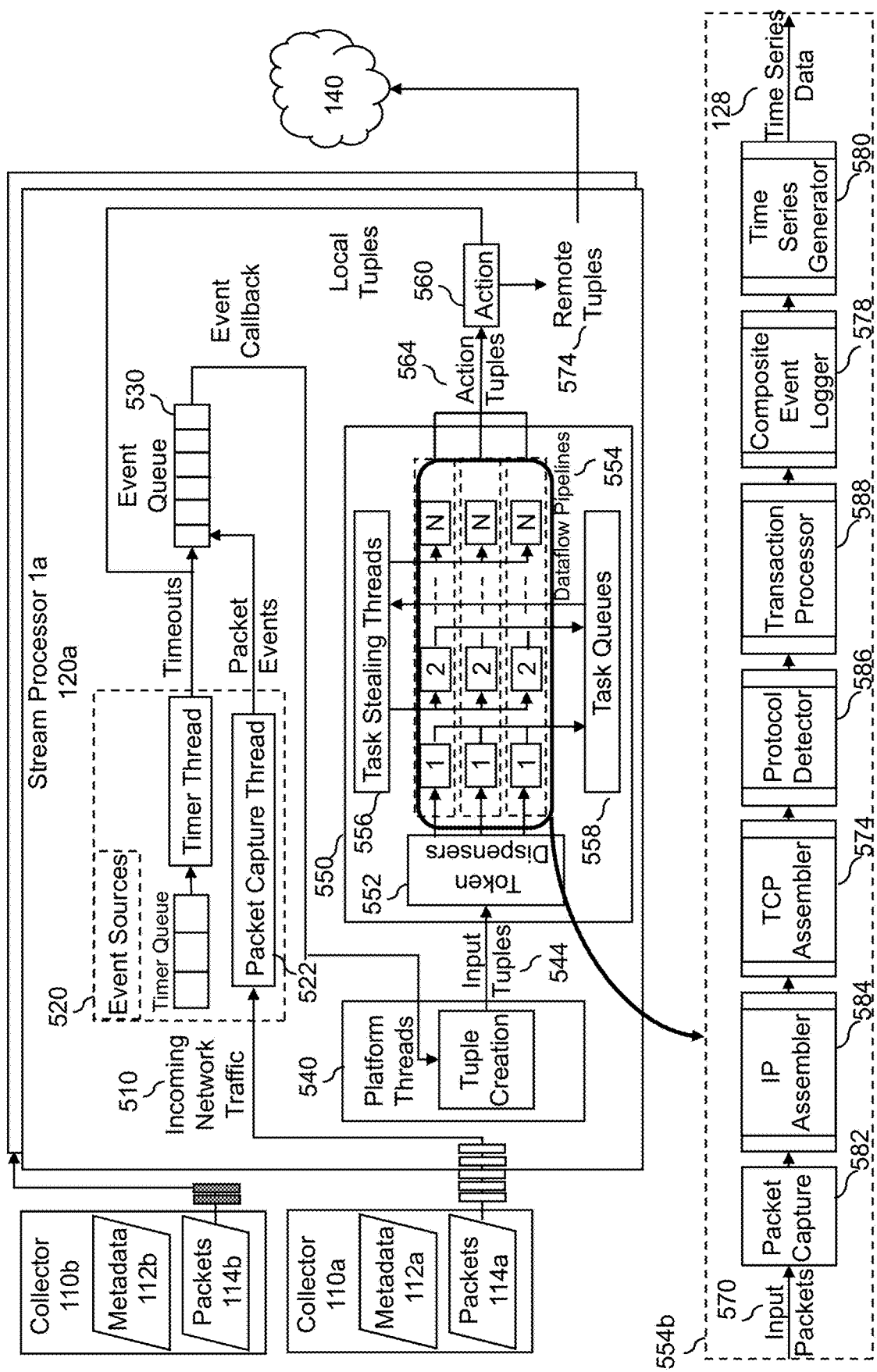

Referring now to FIG. 5C, an additional exemplary dataflow pipeline 554b that illustrates an execution model of the first stream processor 120 will now be discussed in detail. The transaction analysis pipeline 554b within a first stream processor 120 has the following stages: (a) Packet Capture 582: A stream of input packets 570 may be received and captured using this component of the dataflow pipeline 554b; (b) Internet Protocol (IP) Assembler 584: In the event that incoming IP packets are fragmented, the packets may be assembled in a stateful manner. This is accomplished by storing previous packet fragments in-memory until they are assembled; (c) Transmission Control Protocol (TCP) Assembler 574: As described above, following the TCP connection setup/teardowns and TCP sequence numbers, the client and server side of communication may be reconstructed and the network flows may be identified. This may also be done in a stateful manner; (d) Protocol Detector 586: The output of TCP Assembler 574 may be sent to a Protocol Detector 586, which monitors the dataflow and detects the application layer protocol of the dataflow. This too may be done in a stateful and context-ordered manner based on a context key (e.g., a flow ID), as described below; (e) Transaction Processor 588: Once a protocol has been detected, the detected protocol segments are sent to the Transaction Processor 588 which identifies individual transactions in a stateful and context-ordered manner. For example, the Transaction Processor 588 may identify individual HTTP transactions and MySQL transactions based on a flow identifier and a context key; (f) Composite Event Logger 578: The output of the Transaction Processor 588 may result in composite event logs 126 from which the first stream processor 120 may extract the metadata 112 (based on regular expressions) and the golden signals of monitoring (latency, traffic, and errors). For each interaction detected, composite event logs 126 may be created in an in-memory database (in step 402); and (g) Time Series Generator 580: Finally, as described above, every second, these metrics may be rolled-up into the time series data 128 (in step 404). The time series data 128 may then be ingested by a downstream multidimensional database 150 (e.g., an OLAP database), which may be optimized for time series data 128.

Although not depicted in FIGS. 5B and 5C, in some embodiments, the dataflow pipelines 554 also may include different and/or additional components that would allow a first stream processor 120 to process various types of streaming data (e.g., video streams and VoIP calls) and to track key performance indicators (KPIs) (e.g., frame rate, jitter, etc.). For example, to process video data, a dataflow pipeline 554 may include an IP Assembler 584 (described above), a TCP Assembler 574 (described above), an HTTP Assembler, a frame reader, a frame decoder, and a frame visualizer/analyzer. In this example, the HTTP Assembler may track HTTP conversations and detect a type of encapsulated application payload while the frame reader may, for raw media streams detected in the application payload, identify and decode a media container type and discover constituent media streams in a single container. Continuing with this example, the frame reader also may identify frame boundaries in the bit stream and forward compressed frames to the frame decoder. In the above example, the frame decoder may decode media frames using the type of media codec identified by the frame reader and the frame visualizer/analyzer may decode the quality of the decoded frame and/or visualize the decoded media frame. As an additional example, to process VoIP calls, a dataflow pipeline 554 may include a Packet Capture component 582 (described above), an IP Assembler 584 (described above), a Protocol Detector 586 (described above), a Session Initiation Protocol (SIP) parser, and an SIP transaction processor. In this example, the SIP parser may parse the header of each SIP call to extract various types of information (e.g., a call ID), which is used by the SIP transaction processor (a stateful component) to track the state of an SIP call.

Furthermore, although not depicted in FIGS. 5B and 5C, in some embodiments, the dataflow pipelines 554 also may include different and/or additional components that would allow various types of events, conditions, etc. to be detected by a first stream processor 120. For example, to detect SMTP spam, a dataflow pipeline 554 may include a Packet Capture component 582 (described above), an IP Assembler 584 (described above), a TCP Assembler 574 (described above), a Protocol Detector 586 (described above), an SMTP processor, and classifier (e.g., a Naive Bayes text classifier). In this example, the SMTP processor may track the state machine of an active SMTP session and assemble a complete email message in a stateful manner (e.g., based on a flow ID and a context key). Continuing with this example, the classifier may classify emails into spam or regular emails (e.g., using a Naive Bayes classifier) by tokenizing each incoming text document into individual words and tagging each word with a number indicating a probability that the word is a keyword for spam data. In the above example, the classifier than classifies emails based on a final value for all the input word probabilities for an email. As an additional example, to detect a denial of service (DoS) attack, a dataflow pipeline 554 may include a Packet Capture component 582 (described above), an IP Assembler 584 (described above), a TCP Assembler 574 (described above), a feature extractor, and a classifier (e.g., a Support Vector Machine (SVM) classifier). In this example, the feature extractor extracts various features of each assembled TCP flow and maintains features that are useful for classifying TCP flows as malicious or normal (e.g., connection duration, bytes/packets 114 transferred, number of connections to the same port number or IP address within the most recent minute, etc.). Continuing with this example, the classifier may classify potentially malicious flows that exhibit DoS behavior (e.g., using an SVM classifier trained using existing traces, some of which have been tagged as malicious).

Figure 5D:
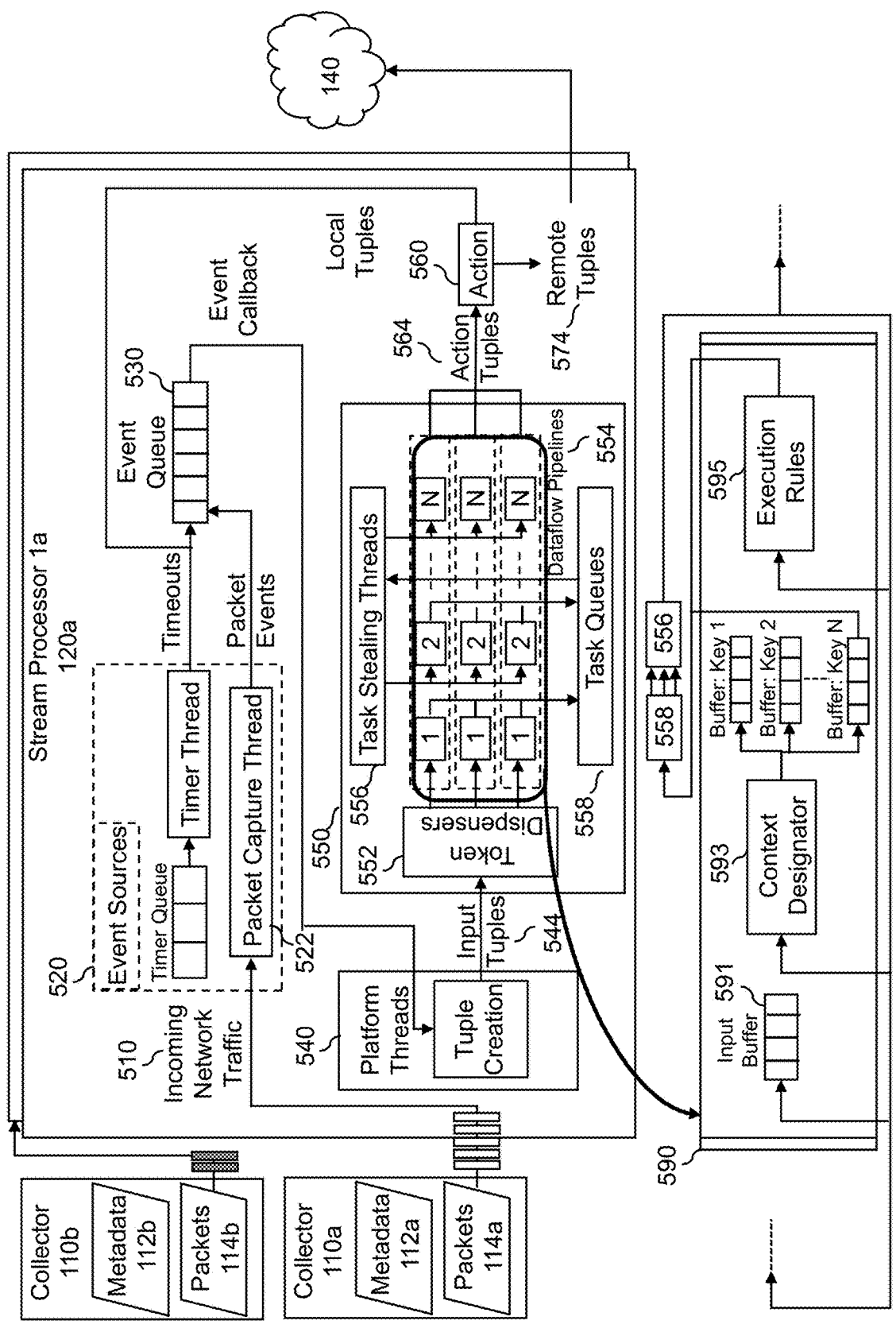

As shown in FIG. 5D, in some embodiments, to process packets 114 in a stateful manner, a parallel context-ordered component 590 that controls parallel processing within the pipelines 554 may be included in a first stream processor 120. In such embodiments, all tuples within this component 590 are processed in an order that is partially ordered based on one or more context keys that may be specified by a user (e.g., using the declarative rule-based language noted above) when defining components of the first stream processor 120. To process event tuples in a First in, First Out (FIFO) order based on their token numbers, the context-ordered component 590 includes an input buffer 591. Tuples from the input buffer 591 are divided into sub-buffers that each correspond to a context key (Key 1, Key 2, . . . , Key N). The context-ordered component 590 also may include a context designator 593 that ensures that ordering within each sub-buffer is correct by classifying incoming tuples based on their context keys and inserting the tuples into their respective sub-buffers. In some embodiments, tuples may have multiple context keys. In such embodiments, these tuples may be placed in multiple buffers and dequeued for processing upon reaching the front of all buffers. When ready for processing, a tuple is inserted into the task queues 558 and its corresponding execution rules 595 become eligible for execution by a task stealing thread 556. Furthermore, in some embodiments, to ensure that tuples corresponding to the same context key are processed in order based on their token numbers, only the topmost outgoing tuple in each sub-buffer may be inserted into the task queues 558. In such embodiments, once this tuple is executed, the next tuple from the same sub-buffer is then inserted into the task queues 558 for execution.

Figure 6A:
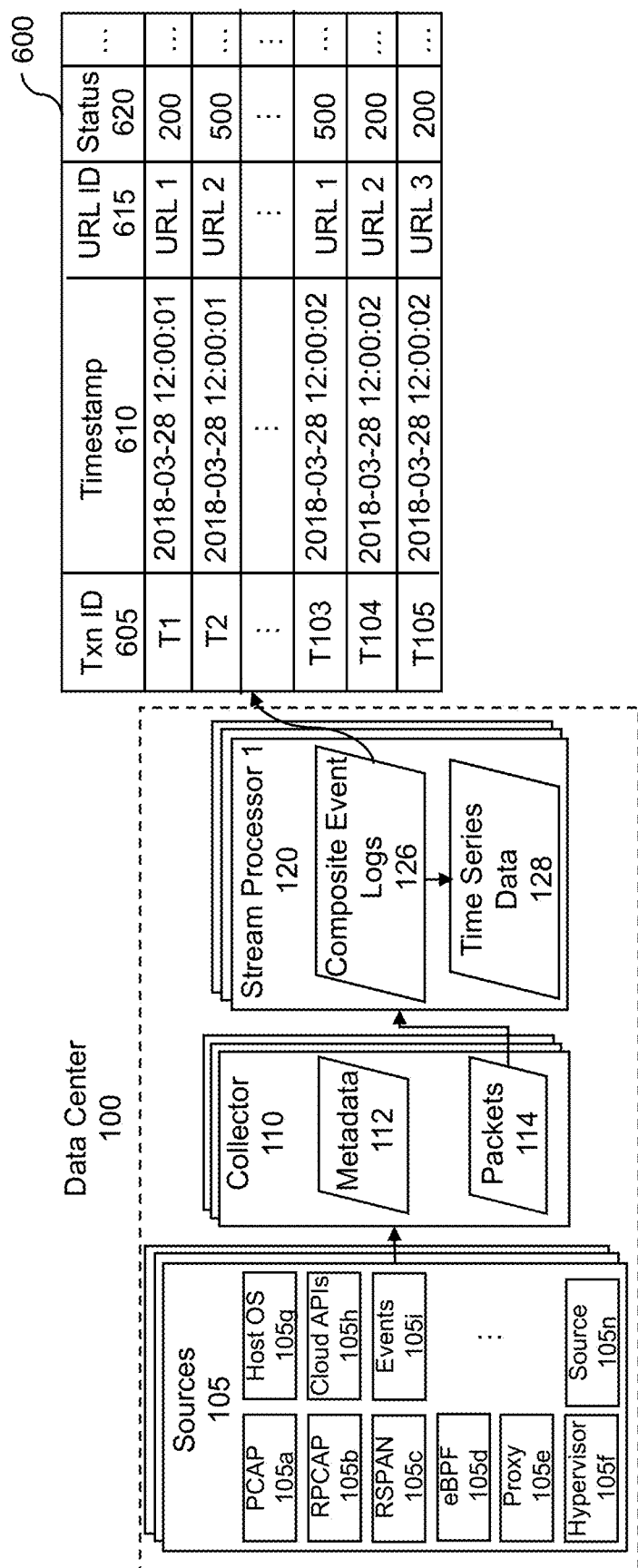
FIGS. 6A-6B illustrate an example of summarizing composite event logs into time series data according to some embodiments of the invention.
Figure 6B:
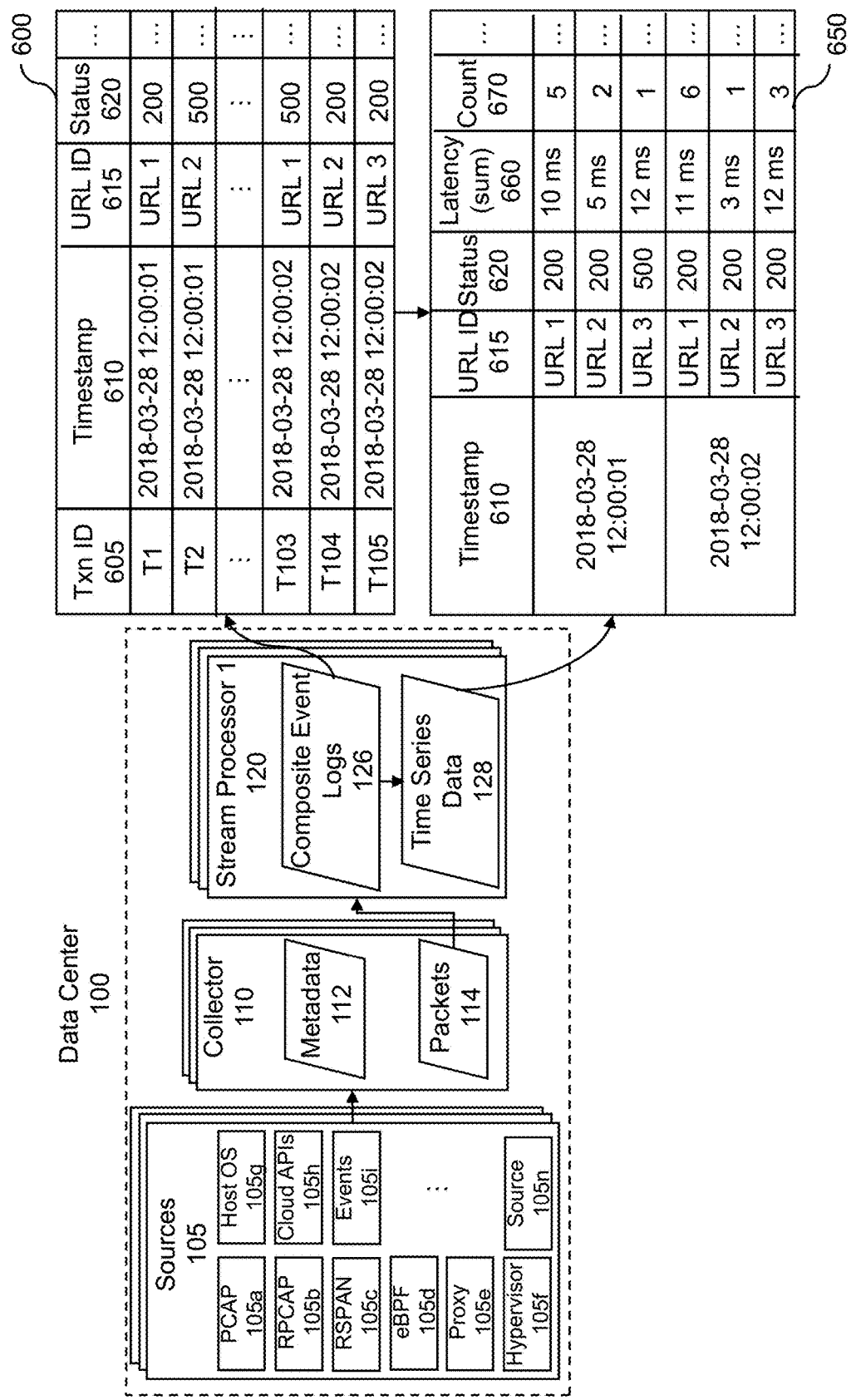

FIGS. 6A-6B illustrate an example of summarizing composite event logs into time series data according to some embodiments of the invention. As described above, the composite event logs 126 may be generated by a first stream processor 120 via stateful processing of the packets 114, in which each log entry corresponds to a transaction (e.g., a query). For example, a first stream processor 120 may reassemble packets 114 describing raw events in a stateful manner to create each entry in a set of composite event logs 126. As shown in FIG. 6A, the composite event logs 126 may be stored in a table 600 (e.g., in an in-memory database) in which each row or record in the table 600 corresponds to a transaction identified by a transaction ID 605 (T1, T2, . . . T103, T104, and T105).

The composite event logs 126 may include attributes of each transaction. For example, suppose that two services communicate with each other 100,000 times per second (i.e., 100,000 API calls are being made per second). In this example, for each of those 100,000 calls, a composite event log 126 is generated in memory, in which each log identifies a corresponding transaction, the type of request that was made, the time at which it was made, an IP address and a name of a VM from which each request was made, etc. As shown in the example of FIG. 6A, attributes that may be associated with transactions may correspond to columns in a table 600 such as a timestamp 610, a URL identifier 615 associated with an HTTP request, a status code 620 associated with the request, in which 200 indicates an HTTP status that is OK and 500 indicates a server error, etc., and values of the attributes for each transaction may be stored in a respective field. Although not illustrated in FIG. 6A, additional attributes that may be associated with transactions may include a network identifier, a URI path, a server identifier, a client identifier, a server port identifier, a request method, a status code message, a network tag, a transaction tag, one or more statistics counters, a latency sum, a maximum and/or minimum latency value, a sum of bytes/packets 114 sent from a server, a maximum and/or minimum number of bytes sent to/received by a client or server, etc.

Once a set of composite event logs 126 have been generated by a first stream processor 120, the first stream processor 120 may generate a set of time-series data 128 from the set of composite event logs 126. In some embodiments, a set of time series data 128 corresponds to a set of data points for equally-spaced time intervals within a time span covered by a set of composite event logs 126. For example, if a set of composite event logs 126 describes transactions occurring over a time span of one minute, each data point within a set of time series data 128 generated from the set of composite event logs 126 may correspond to a one-second interval within the one-minute time span. Therefore, in contrast to a set of composite event logs 126, which are associated with times that are not regularly spaced, a set of time series data 128 is spaced at regular intervals.

A first stream processor 120 may generate a set of time series data 128 from a set of composite event logs 126 by summarizing the set of composite event logs 126 at regularly-spaced time intervals within a time span covered by the set of composite event logs 126. In some embodiments, a data point within a set of time series data 128 may summarize a set of composite event logs 126 for a respective time interval as one or more counts, standard deviations, maximum and minimum values, etc. For example, if the same query is executed multiple times and the same result is obtained, execution of the queries is summarized into a single data point associated with a count of five. In this example, if two different results were obtained for the queries, two different data points are generated, each of which is associated with a count indicating a number of times that a respective result was obtained. Examples of types of information that may be summarized by the time series data 128 include counts (e.g., of transactions), a duration of the transactions, the number of bytes sent on each transaction, or any other suitable types of information that would allow data describing microservices in a distributed cloud environment to be sliced and diced in arbitrary ways once it is stored in the multidimensional database 150 and queried.

As shown in FIG. 6B, the time series data 128 may be stored in a table 650 (e.g., in an in-memory database), in which each row or record in the table 650 corresponds to a time interval of multiple equally spaced time intervals (e.g., one second) identified by a timestamp 610. Furthermore, each column within the table 650 may correspond to an attribute of the composite event logs 126 that has been summarized, such that each field within a column includes a value of the respective attribute for a particular time interval. As shown in FIG. 6B, examples of attributes that may be associated with each time interval in a set of time series data 128 include a URL identifier 615 associated with an HTTP request, a status code 620, a sum of latencies 660 for HTTP requests to each URL in milliseconds, a count 670 of HTTP requests made to each URL, or any other suitable types of information associated with a time interval in the time series data 128. Although not illustrated in FIG. 6B, similar to transactions, additional attributes that may be associated with a time interval may include a network identifier, a server identifier, a client identifier, a server port identifier, a request method, a status code message, a network tag, a transaction tag, one or more statistics counters, a latency sum, a maximum and/or minimum latency value, a sum of bytes/packets 114 sent from a server, a maximum and/or minimum number of bytes sent to/received by a client or server, etc.

While at the input of the first stream processors 120, the complexity may be O(Number of measurements or data points collected), and while at the output of the first stream processors 120, this complexity may be reduced to O(Number of monitoring dimensions), as the first stream processors 120 may produce per-second rolled-up time series of metrics. These results including, for example, and without limitation, per-second rolled-up time series data 128 and composite event logs 126, may be routed to a wide variety of downstream consumers. By decoupling collection from stream processing, the system may be able to advantageously track short-lived instances in highly chaotic environments as these instances export packets 114 and network interactions data in real-time rather than exporting aggregated metrics. Therefore, the chaos is "absorbed" in the stream processing layer. Furthermore, since the volume of data included in a set of time series data 128 generated by each of the first stream processors 120 is orders of magnitude smaller than the volume of data included in the packets 114 from which the set of time series data 128 was generated, the described approach for networked microservice modeling in a distributed cloud environment may be scalable across multiple clouds.

Figure 7A:
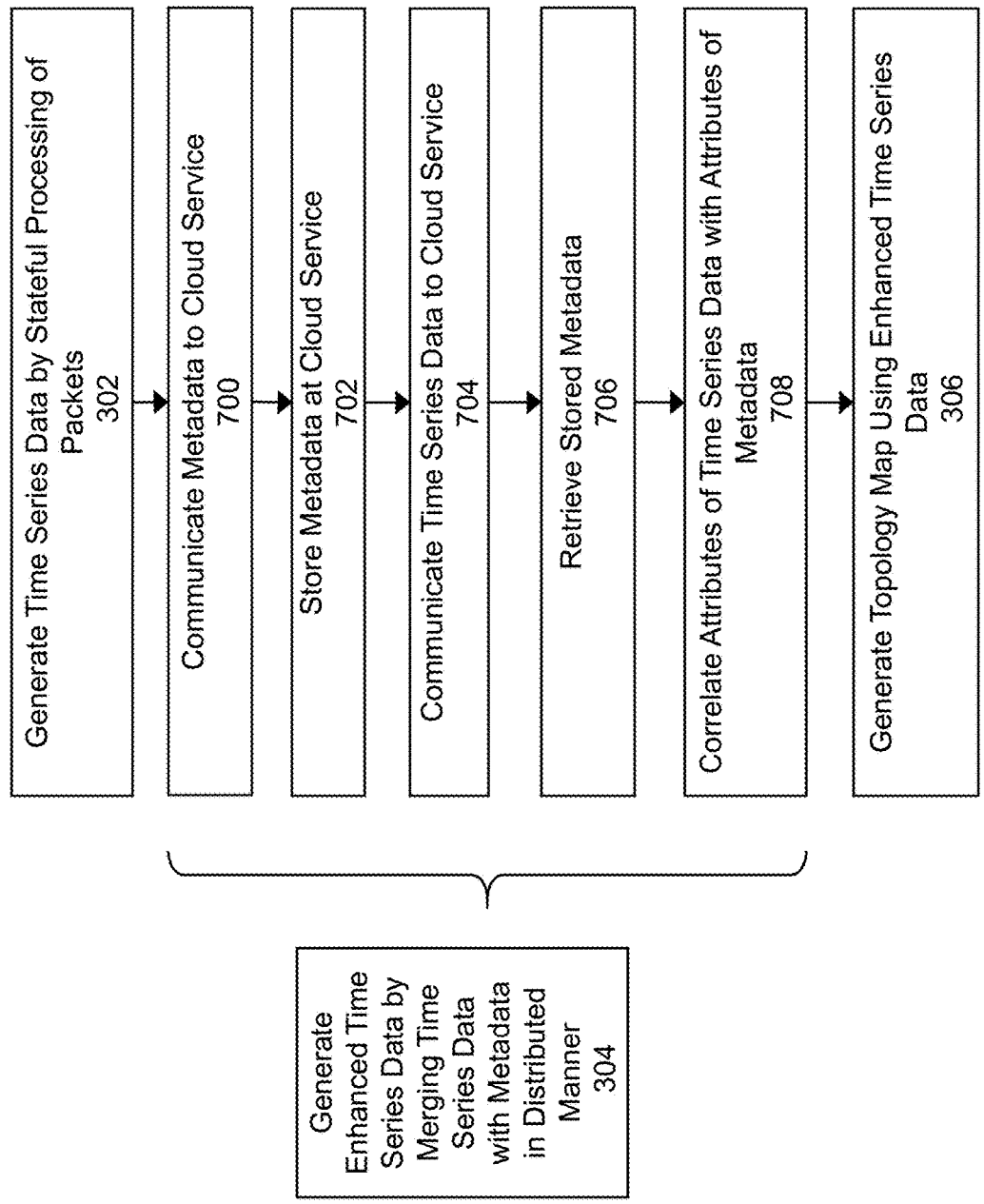
FIG. 7A illustrates a flowchart for generating enhanced time series data by merging time series data with metadata in a distributed manner according to some embodiments of the invention.

FIG. 7A illustrates a flowchart for generating enhanced time series data by merging time series data with metadata in a distributed manner according to some embodiments of the invention. Some of the steps illustrated in the flowchart are optional in different embodiments. In some embodiments, the steps may be performed in an order different from that described in FIG. 7A.

Figure 8A:
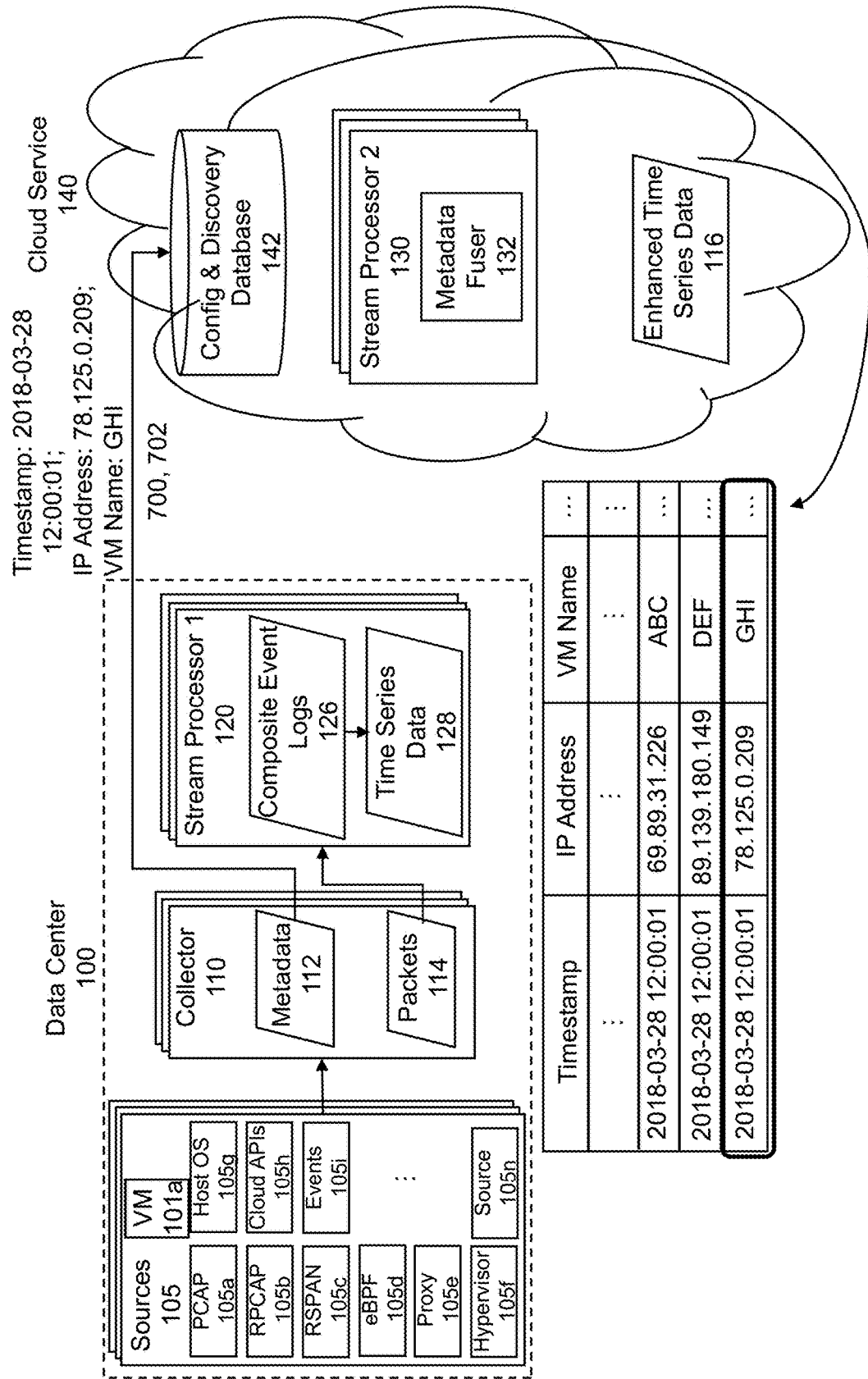

As described above, once a set of time series data 128 has been generated by stateful processing of packets 114 by a first stream processor 120 (in step 302), a set of enhanced time series data 116 may be generated by merging the time series data 128 with metadata 112 in a distributed manner (in step 304). As also described above, metadata 112 collected by each collector 110 within a data center 100 is communicated to the cloud service 140 (in step 700), where it may be stored (in step 702) as key-value pairs in the configuration and discovery database 142 for later retrieval and merging. For example, as shown in the example of FIG. 8A, metadata 112 communicated to the cloud service 140 associated with a raw event for VM 101a may include a timestamp of 2018-03-28 12:00:01, an IP address of 78.125.0.209, and a VM name of GHI (in step 700). As also shown in FIG. 8A, the metadata 112 may be stored in a table in the configuration and discovery database 142 at the cloud service 140 (in step 702).

Figure 8B:
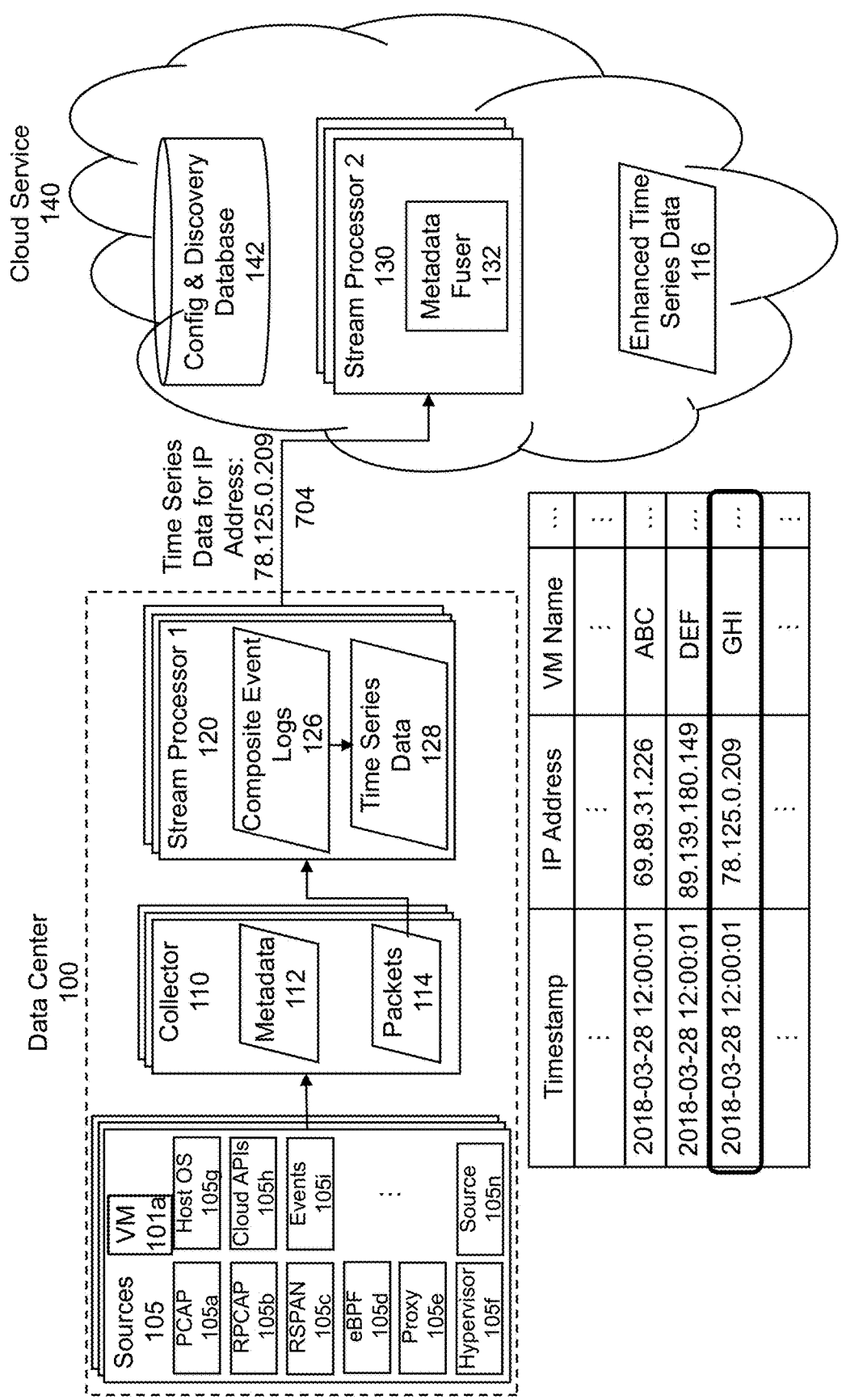
Figure 8C:
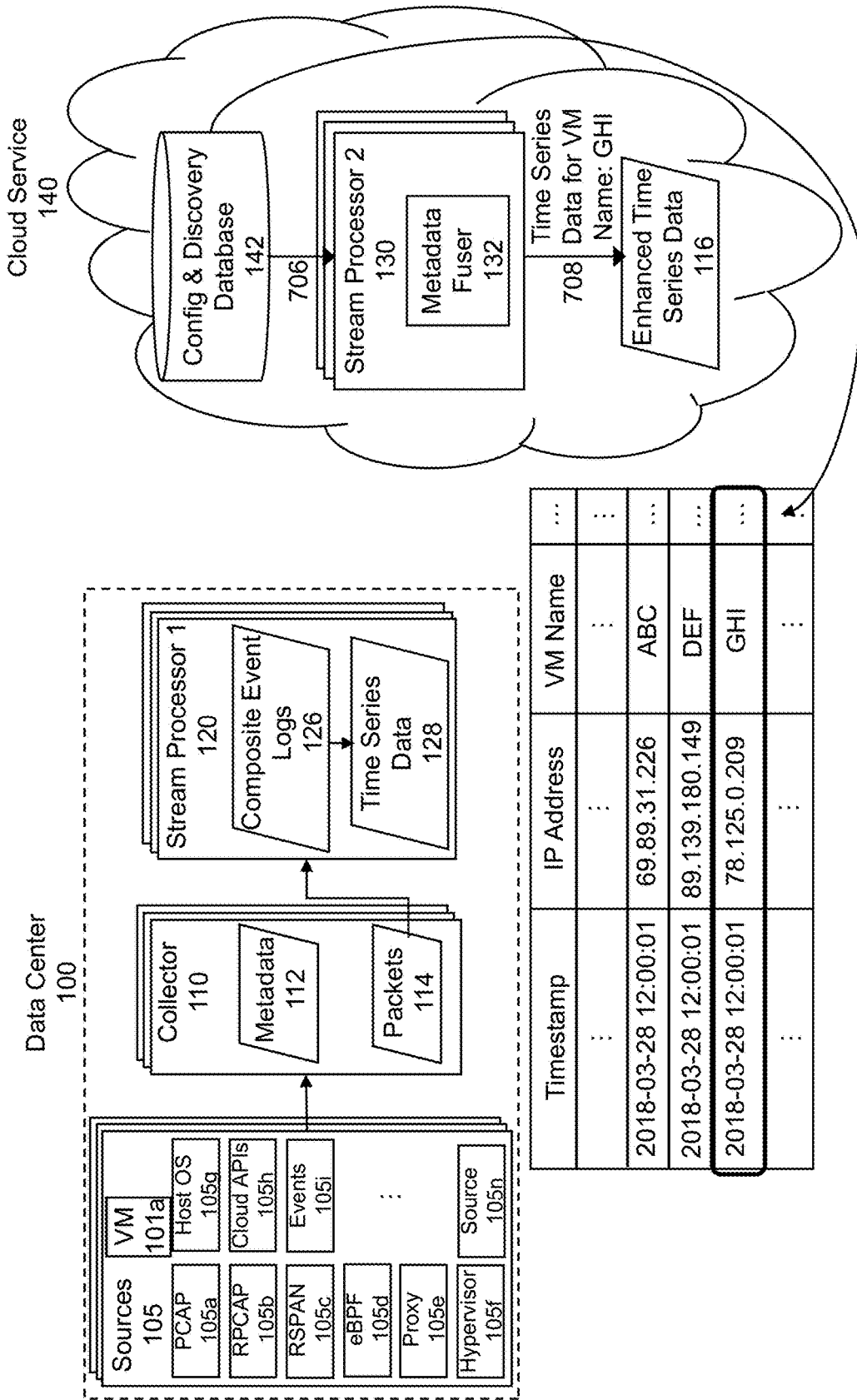

Referring again to FIG. 7A, a set of time series data 128 may be communicated to the cloud service 140 (in step 704), at which metadata 112 stored in the configuration and discovery database 142 is retrieved (in step 706) and attributes of the time series data 128 are correlated with corresponding attributes of the metadata 112 (in step 708). As described above, the set of time series data 128 may be communicated to a second stream processor 130 within the cloud service 140. For example, as shown in FIG. 8B, which continues the example discussed above with respect to FIG. 8A, the first stream processor 120 communicates time series data 128 associated with an IP address (78.125.0.209) to a second stream processor 130 (in step 704). Then, as shown in FIG. 8C, which continues the example discussed above with respect to FIGS. 8A-8B, the second stream processor 130 retrieves metadata 112 stored in the configuration and discovery database 142 (in step 706) and correlates the IP address associated with the time series data 128 received from the first stream processor 120 with the matching IP address associated with the metadata 112 using the metadata fuser 132 (in step 708). As a result of the correlation, the time series data 128 associated with IP address 78.125.0.209 is associated with the VM name GHI and is included among the enhanced time series data 116. The merging of the set of time series data 128 with the metadata 112 occurs in near real-time as the time series data 128 and metadata 112 are communicated to the cloud service 140. As described above, the enhanced time series data 116 may then be stored in the multidimensional database 150 where it may be queried by the topology module 160 that may generate a topology map 180 based on the query results (in step 306 of FIG. 7A).

FIG. 7B illustrates an additional flowchart for generating enhanced time series data by merging time series data with metadata in a distributed manner according to some embodiments of the invention. Some of the steps illustrated in the flowchart are optional in different embodiments. In some embodiments, the steps may be performed in an order different from that described in FIG. 7B. Furthermore, in some embodiments, one or more of the steps illustrated in the flowchart may be performed in conjunction with one or more of the steps described in FIG. 7A.

In some embodiments, after the time series data 128 has been generated by stateful processing of the packets 114 by the first stream processor 120 (in step 302), the enhanced time series data 116 may be generated by merging the time series data 128 with the metadata 112 (in step 304) based on updates to the metadata 112. In such embodiments, updates to the metadata 112 are received at a collector 110 (in step 710). In some embodiments, the update to the metadata 112 is received at the collector 110 in response to a triggering event received from a source 105 (e.g., information received from a host operating system 105g indicating that a change has occurred). For example, as shown in FIG. 8D, which continues the example discussed above with respect to FIGS. 8A-8C, VM 101a that was associated with IP address 78.125.0.209 and VM name GHI may no longer be supported by host operating system 105g; instead, a new VM (VM 101b) may be supported by host operating system 105g. In this example, this change may serve as a triggering event that results in an update to the metadata 112 to be communicated to the collector 110 (in step 710).

Figure 8F:
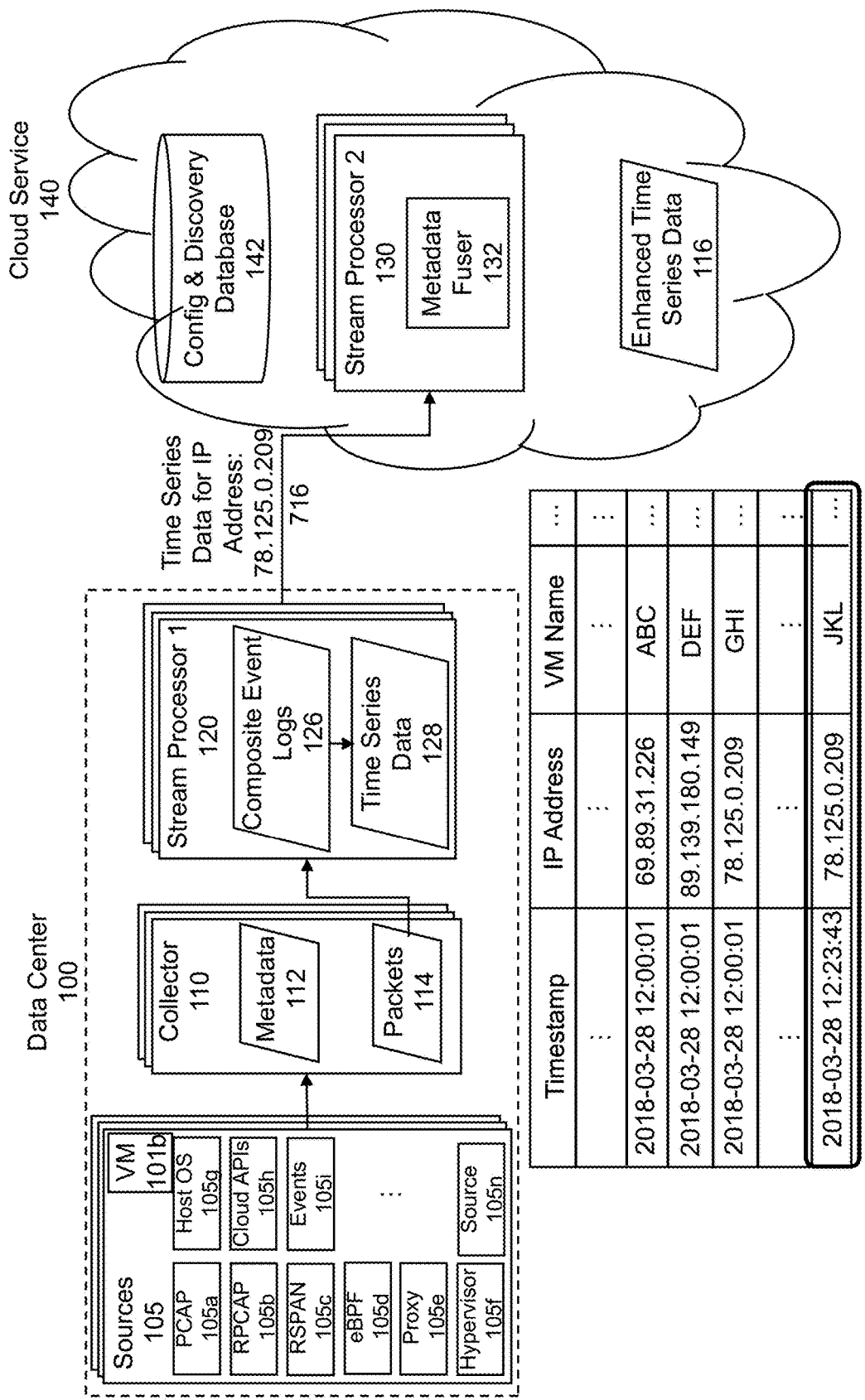

Referring again to FIG. 7B, once received at the collector 110, updates to the metadata 112 are communicated to the cloud service 140 (in step 712), where they may be stored (in step 714). For example, as shown in FIG. 8E, which continues the example discussed above with respect to FIGS. 8A-8D, updates to the metadata 112 communicated to the cloud service 140 associated with an event associated with VM 101b may include a timestamp of 2018-03-28 12:00:23, an IP address of 78.125.0.209, and a VM name of JKL (in step 712). As also shown in FIG. 8E, the update to the metadata 112 may be stored in a table in the configuration and discovery database 142 at the cloud service 140 (in step 714). Referring back to FIG. 7B, similar to step 704 of FIG. 7A, a set of time series data 128 may be communicated to the cloud service 140 (in step 716). For example, as shown in FIG. 8F, which continues the example discussed above with respect to FIGS. 8A-8E, the first stream processor 120 communicates time series data 128 associated with an IP address (78.125.0.209) to the second stream processor 130 (in step 716).

Referring back to FIG. 7B, one or more second stream processors 130 at the cloud service 140 may then retrieve the updates to the metadata 112 stored at the configuration and discovery database 142 (in step 718). In some embodiments, the second stream processor(s) 130 may retrieve this information by continuously pulling information from the configuration and discovery database 142. In other embodiments, the storage of the updates to the metadata 112 at the configuration and discovery database 142 serves as a triggering event that triggers the configuration and discovery database 142 to notify one or more of the second stream processors 130 that the metadata 112 has been updated. In such embodiments, the second stream processor(s) 130 may then access the configuration and discovery database 142 and retrieve the updates. Once the updates to the metadata 112 are retrieved by a second stream processor 130, the second stream processor 130 may correlate attributes of the time series data 128 with corresponding attributes of the updates to the metadata 112 (in step 720). For example, as shown in FIG. 8G, which continues the example discussed above with respect to FIGS. 8A-8F, the second stream processor 130 retrieves updates to the metadata 112 from the configuration and discovery database 142 (in step 718) and correlates the IP address associated with the time series data 128 received from the first stream processor 120 (i.e., 78.125.0.209) with the matching IP address associated with the updates to the metadata 112 using the metadata fuser 132 (in step 720). As a result of the correlation, the time series data 128 associated with IP address 78.125.0.209 is now associated with the VM name JKL and is included among the enhanced time series data 116. Therefore, the enhanced time series data 116 accounts for changes in high-churn environments (e.g., those in which containers and VMs frequently come and go) by incorporating updates to the metadata 112.

Referring once more to FIG. 7B, as described above, the enhanced time series data 116 may then be stored in the multidimensional database 150 where it may be queried by a topology module 160 that may generate a topology map 180 based on the query results (in step 306). Furthermore, one or more of the steps of FIG. 7B may be repeated (e.g., in response to receiving additional updates to the metadata 112 at the collector 110 (in step 710)).

Figure 9:
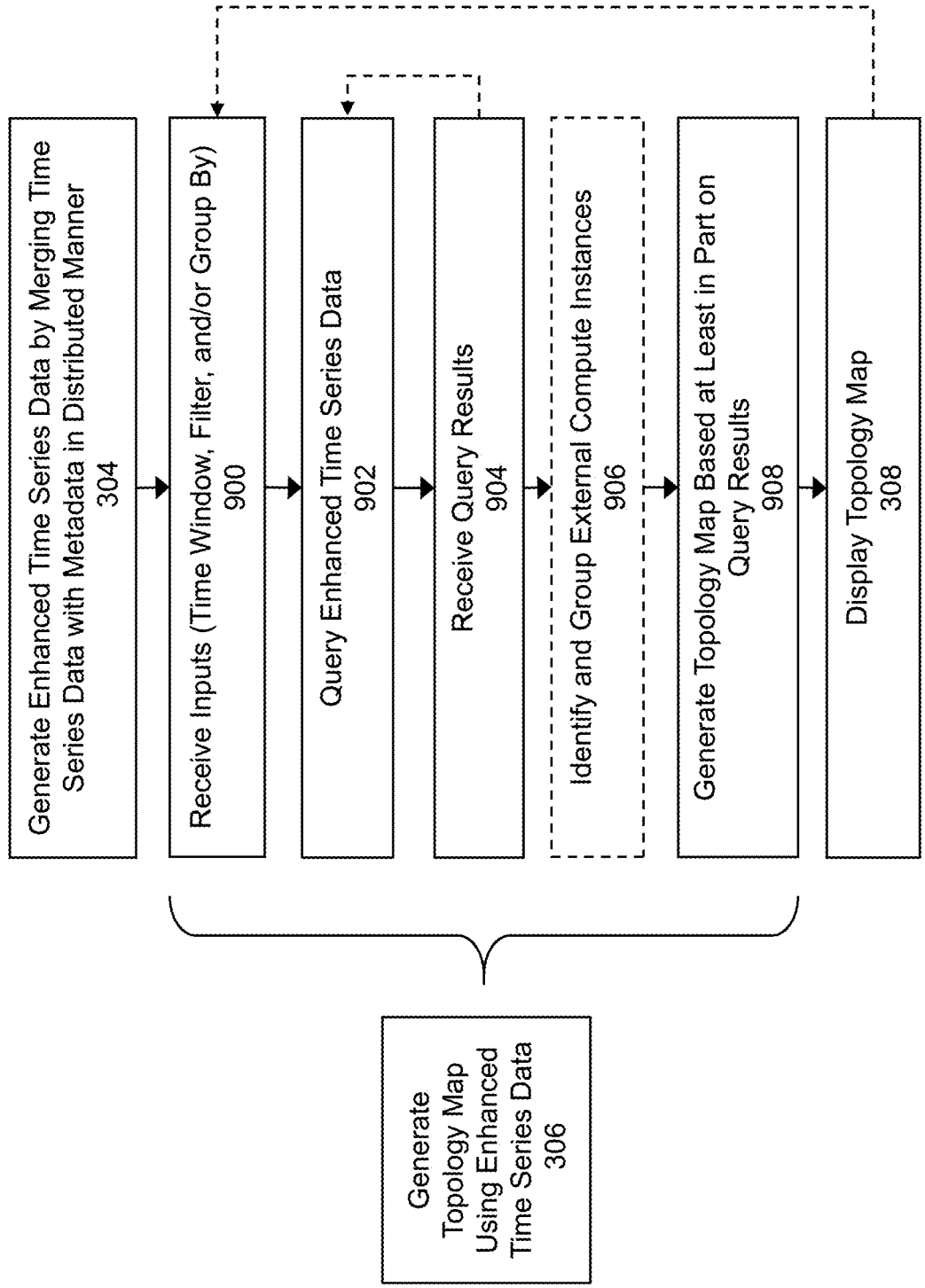
FIG. 9 illustrates a flowchart for generating a topology map using enhanced time series data according to some embodiments of the invention.

FIG. 9 illustrates a flowchart for generating a topology map using enhanced time series data according to some embodiments of the invention. Some of the steps illustrated in the flowchart are optional in different embodiments. In some embodiments, the steps may be performed in an order different from that described in FIG. 9.

As described above, once a set of enhanced time series data 116 has been generated by merging the time series data 128 with metadata 112 in a distributed manner (in step 304), a topology map 180 may be generated using the set of enhanced time series data 116 (in step 306). As also described above, the topology map 180 may be generated by the topology module 160, which queries the enhanced time series data 116 stored in the multidimensional database 150 and generates a user interface 175 including the topology map 180 based on the query results. The topology module 160 may generate the topology map 180 in response to receiving a set of inputs from a user station 170 (in step 900). The set of inputs includes a time window describing a span of time during which the topology map 180 is to be generated. For example, a time window may describe a start time and an end time, in which the end time corresponds to a current time. As an additional example, a time window may describe a start time and a number of minutes after the start time or an end time and a number of minutes before the end time.

In some embodiments, the set of inputs also may include a set of filter parameters and/or a set of group by parameters. A set of filter parameters may identify a set of attributes by which compute instances of the distributed cloud environment may be filtered while a set of group by parameters may identify a set of attributes by which compute instances of the distributed cloud environment may be grouped in the topology map 180. A set of filter parameters and/or group by parameters allow different layers of network traffic to be visualized via the topology map 180. For example, based on a set of filter parameters, the topology map 180 may include different compute instances within one or more data centers 100 or within a single data center 100, in which the compute instances may be grouped by hostname, service, etc.

Attributes by which compute instances of the distributed cloud environment may be filtered and/or grouped may correspond to any arbitrary key-value pairs (e.g., IP addresses, hostnames, etc.) that may be associated with compute instances that have been stored in the configuration and discovery database 142 and merged into the enhanced time series data 116. In some embodiments, the attributes may correspond to tags (e.g., user-defined tags, such as a team name associated with a group of VMs in a data center 100 or hostnames, pod names, service names, VM names, etc. or portions thereof). Furthermore, in some embodiments, the attributes may overlap with each other. For example, compute instances of the distributed cloud environment may belong to the same data center 100, but belong to different environments (e.g., development and production).

Once the topology module 160 has received the set of inputs from the user station 170, the topology module 160 may query the enhanced time series data 116 stored in the multidimensional database 150 (in step 902) based on the set of inputs. The topology module 160 may then receive the query results (in step 904) and generate a user interface 175 including the topology map 180 based at least in part on the query results (in step 908). The topology map 180 may represent one or more compute instances of the distributed cloud environment (e.g., a collection of VMs in a team) as a node, while relationships between compute instances may be represented as links or edges, as further described below. Finally, the user interface 175 including the topology map 180 may then be displayed (in step 308).

One or more of the steps of FIG. 9 may be repeated. In some embodiments, one or more of steps 900 through 908 and step 308 may be repeated in response to receiving an additional set of inputs at the topology module 160. For example, upon receiving a new set of inputs at the topology module 160 (in step 900), the topology module 160 may query the enhanced time series data 116 based on the new set of inputs (in step 902), receive the query results (in step 904), generate a user interface 175 including the topology map 180 based at least in part on the query results (in step 908), and display the user interface 175 (in step 308). In various embodiments, steps 902 and 904 may be repeated based on an algorithm. In such embodiments, the queries may occur in parallel for various resource types (e.g., protocols such as HTTP, HTTP 2, DNS, MySQL, Memcached, Redis, infrastructure, health, etc.) and the query results received may be combined (e.g., using unique keys and metric combination criteria) and the topology map 180 is then generated based on the combined results.

In some embodiments, compute instances of the distributed cloud environment may include external compute instances (e.g., remote or external clients and servers that do not include collectors 110 and which use external API services such as Google Auth®, Stripe®, and Salesforce®). In such embodiments, the external compute instances may be identified and grouped based on their behavior (in step 906). For example, based on similar types of database queries, similar types of URLs being accessed, etc., external compute instances may be grouped logically. As an additional example, external web servers running similar applications (e.g., a checkout application or a login application) may be grouped together. Behavior-based grouping of external compute instances is further described by an example algorithm which will now be discussed.

To illustrate an example of an algorithm that may be used to generate the topology map 180, the topology module 160 may construct a dynamic map of internal servers and clients (i.e., server and client instances that have collectors 110 installed), establish links from external clients to internal server nodes, and establish links from external servers to internal client nodes. The dynamic map of internal servers and clients may be constructed based on a set of results obtained by querying the enhanced time series data 116 using criteria that groups compute instances of the distributed cloud environment based on user-specified group by tags for servers and clients and tags obtained from user-specified filters for servers and clients and by filtering for servers and clients that are not remote and which are associated with user-specified filters. In this example, the topology module 160 may then establish links from external clients to internal servers by querying the enhanced time series data 116 using criteria that groups compute instances of the distributed cloud environment based on user-specified group by tags for servers and tags obtained from user-specified filters for servers and by filtering for server instances that are not remote and which are associated with user-specified filters and for client instances that are remote. Similarly, in this example, the topology module 160 may then establish links from external servers to internal clients by querying the enhanced time series data 116 using criteria that groups compute instances of the distributed cloud environment based on user-specified group by tags for clients and tags obtained from user-specified filters for clients and by filtering for server instances that are remote and for client instances that are not remote and which are associated with user-specified filters.

Continuing with the example of the algorithm, the topology module 160 may then update statistics for internal servers and clients with statistics for internal clients and servers that have been filtered out. The topology module 160 may update statistics for internal servers with statistics that belong to communication with internal clients that have been filtered out by querying the enhanced time series data 116 using criteria that groups compute instances of the distributed cloud environment based on user-specified group by tags for servers and tags obtained from user-specified filters for servers and by filtering for tags obtained from user-specified filters for servers and for client instances that do not have user-specified group by tags and are not remote. Similarly, the topology module 160 may then update statistics for internal clients with statistics that belong to communication with internal servers that have been filtered out by querying the enhanced time series data 116 using criteria that groups compute instances of the distributed cloud environment based on user-specified group by tags for clients and tags obtained from user-specified filters for clients and by filtering for tags obtained from user-specified filters for clients and for server instances that do not have user-specified group by tags and are not remote.

Continuing with the example of the algorithm, the topology module 160 may then automatically group remote server instances by determining a minimum set of resources (e.g., http.uri, mysql.query, memcached.command, etc.) that covers the entire set of server instances. For example, for HTTP, topology module 160 may query the enhanced time series data 116 to identify the top URIs based on requests/second, identify the instances covering those URIs and group them, giving a priority order to attribute a unique resource to a node. In this example, if a server is associated with both a MySQL and an HTTP resource, the topology module 160 gives priority to MySQL and attributes the server instance to a MySQL server. The topology module 160 then identifies internal server/client instances (e.g., pods, hosts, containers, etc.) not communicating with other compute instances of the distributed cloud environment and estimates the number of these instances by querying the enhanced time series data 116 for infrastructure metrics that are external to protocol reconstruction. The topology module 160 may query the enhanced time series data 116 to identify events indicating the health of the distributed cloud environment (e.g., critical events, warnings, lack of data, etc.) and overlays these events onto nodes within the topology map 180 if a group by filter for an alert matches the group by filter for the topology map 180.

Figure 10A:
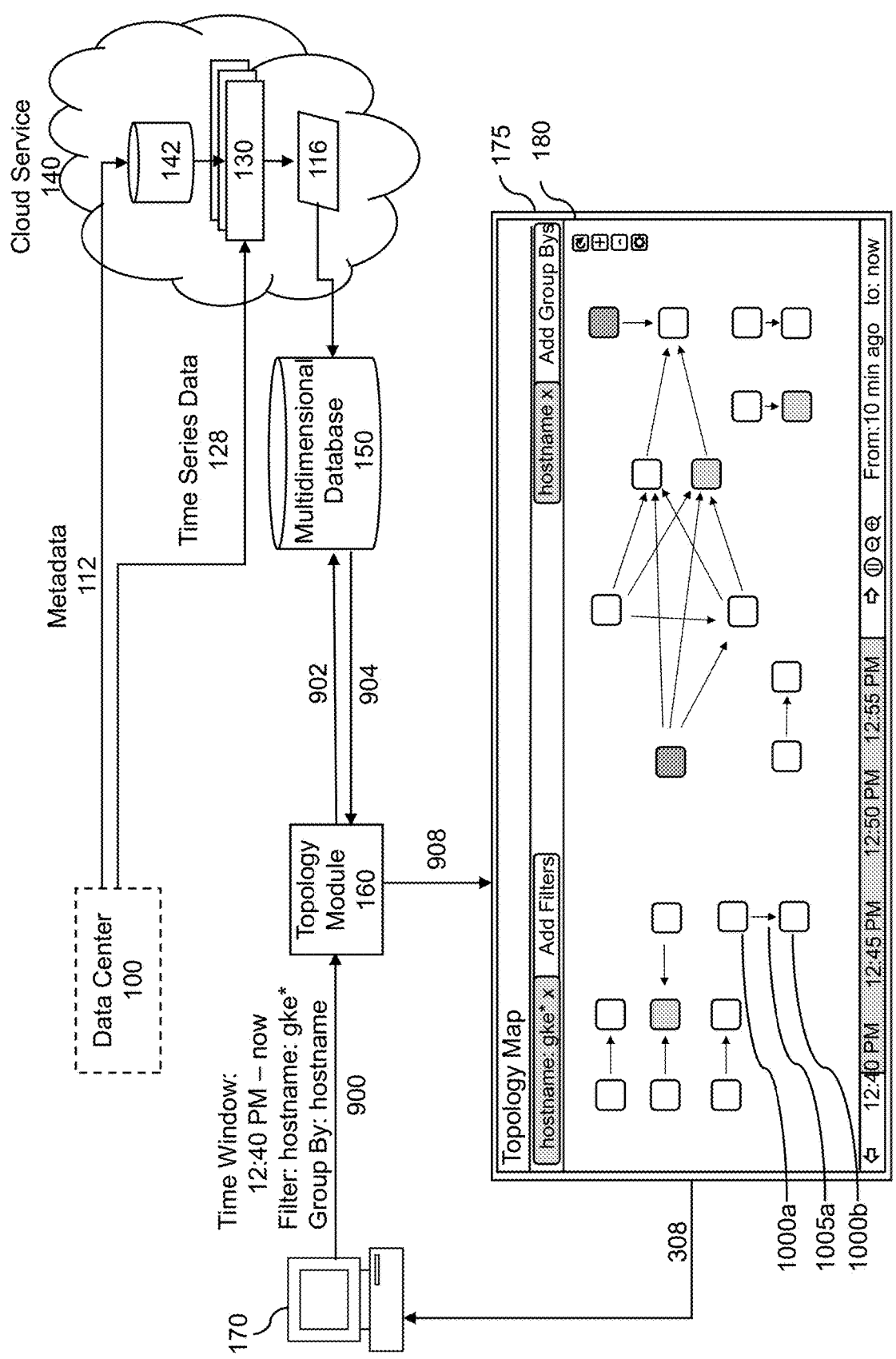
FIGS. 10A-10B illustrate an example of generating a topology map using enhanced time series data and displaying the topology map according to some embodiments of the invention.

FIG. 10A illustrates an example of a topology map 180 generated by the topology module 160 upon receiving a set of inputs including a time window (12:40 PM—now), a filter parameter (hostname: gke*), and a group by parameter (hostname) (in step 900). As shown in this example, once the topology module 160 queries the enhanced time series data 116 stored in the multidimensional database 150 based on the set of inputs (in step 902), receives a set of query results (in step 904), and generates a topology map 180 based on the query results (in step 908), the topology map 180 is then displayed at the user station 170 (in step 308). Here, the topology map 180 shows compute instances of the distributed cloud environment for the time window (12:40 PM—now), in which the compute instances have been filtered by their hostname (hostname: gke*) and grouped by their hostname.

As described above, one or more compute instances of the distributed cloud environment may be represented as a node, while relationships between compute instances may be represented as links or edges. For example, as shown in FIG. 10A, two hosts are represented as nodes 1000a, 1000b and a link 1005a indicates a relationship between the nodes 1000a-b. As shown in the example of FIG. 10A, in some embodiments, links/edges may be represented as arrows. In such embodiments, the direction of the arrow may indicate a direction of a communication between compute instances of the distributed cloud environment represented by the nodes. In the example of FIG. 10A, the direction of the arrow corresponding to link 1005a indicates that node 1000a may be making calls or querying node 1000b. Thus, the topology map 180 detects the nodes and links between the nodes automatically based on the set of inputs and the enhanced time series data 116.

Figure 10B:
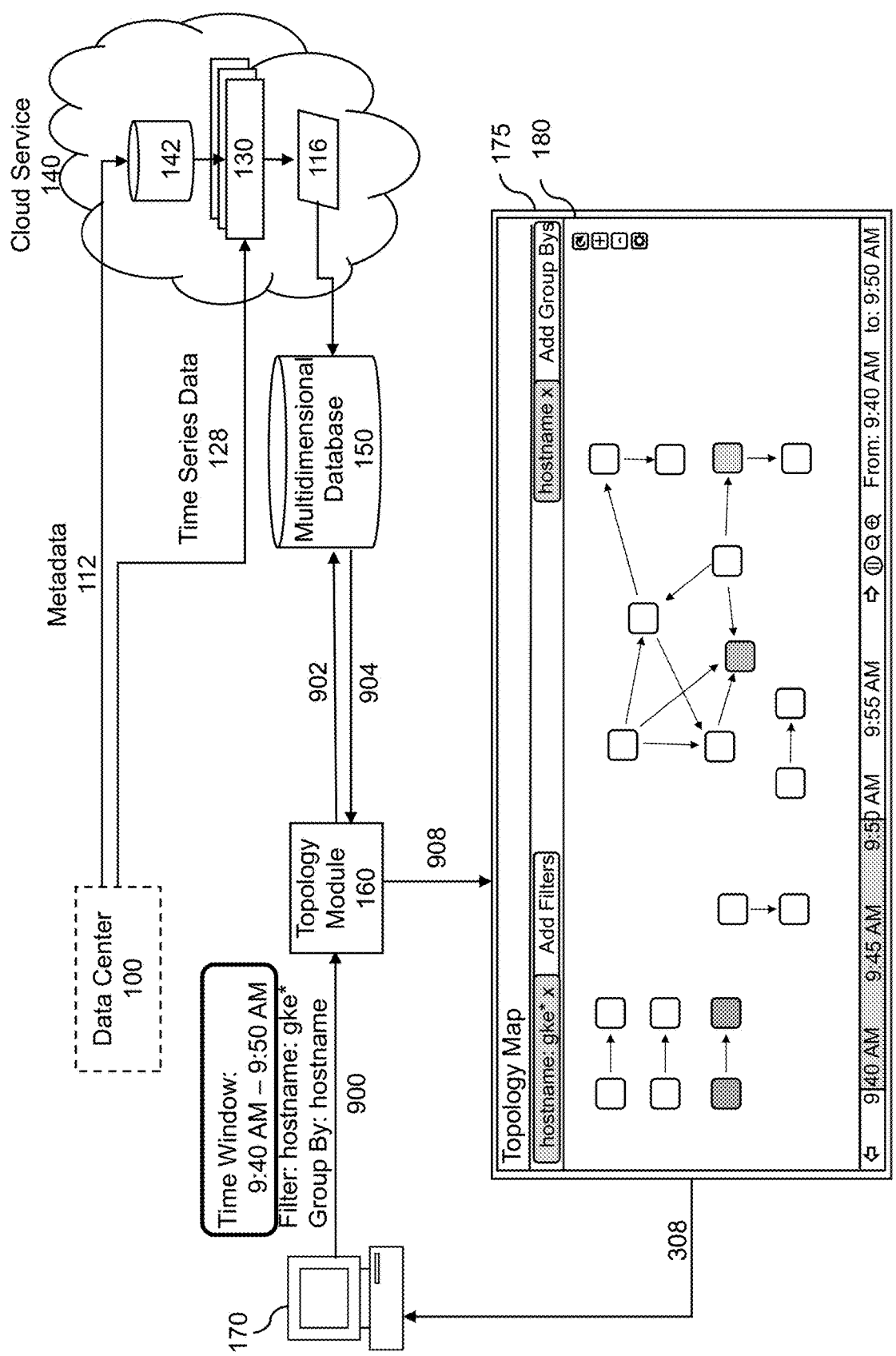

As described above, in some embodiments, one or more of the steps of FIG. 9 may be repeated (e.g., in response to receiving an additional set of inputs at the topology module 160 (in step 900)). For example, in response to receiving a new set of inputs including a different time window (e.g., a time window that has been expanded, contracted, or shifted) at the topology module 160, steps 902, 904, 906, 908, and 308 may be repeated to dynamically update the topology map 180. For example, as illustrated in FIG. 10B, which continues the example discussed above with respect to FIG. 10A, a new set of inputs subsequently is received at the topology module 160, causing step 900 to be repeated. In this example, the new set of inputs includes a new time window (9:40 AM-9:50 AM), while the filter parameter and group by parameter remain unchanged. Continuing with this example, steps 902, 904, 908, and 308 are also repeated based on the new set of inputs and the topology map 180 generated by the topology module 160 shows compute instances of the distributed cloud environment for the new time window (9:40 AM-9:50 AM), in which the compute instances remain filtered by their hostname (hostname: gke*) and grouped by their hostname.

Figure 11:
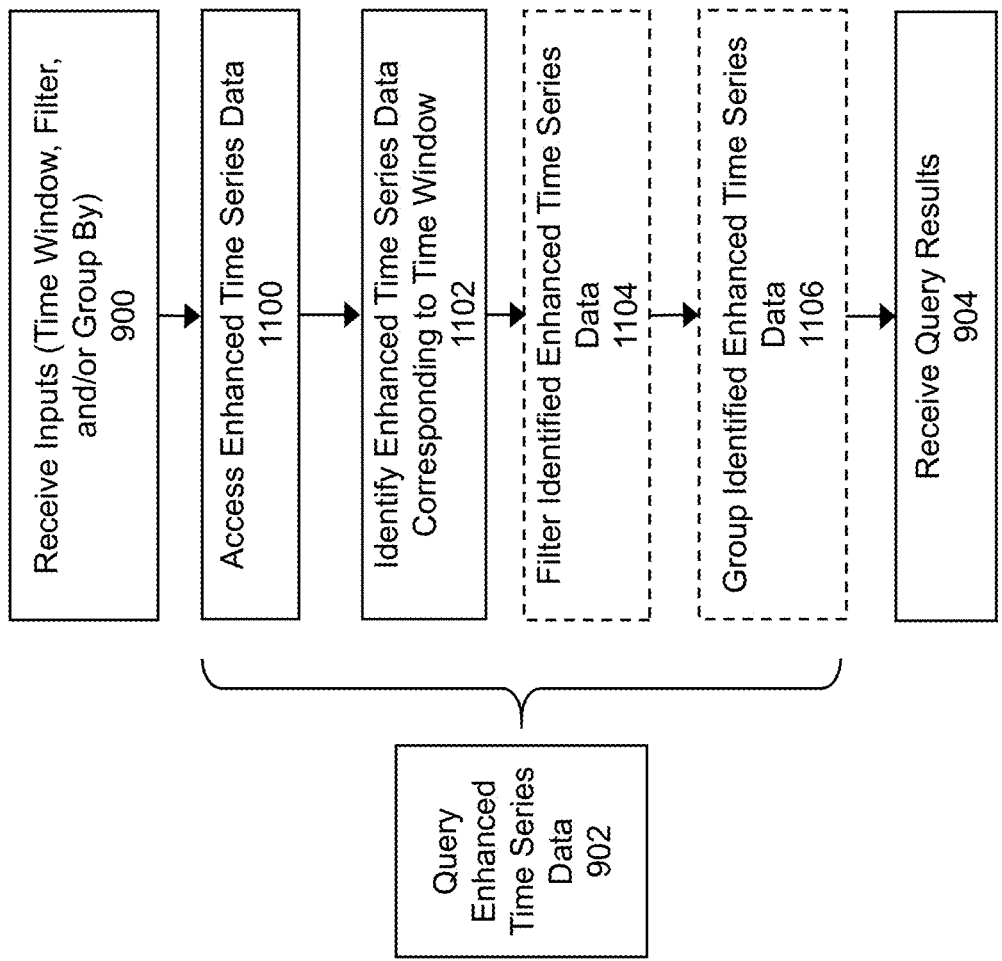
FIG. 11 illustrates a flowchart for querying enhanced time series data based on a set of inputs according to some embodiments of the invention.

FIG. 11 illustrates a flowchart for querying enhanced time series data based on a set of inputs according to some embodiments of the invention. Some of the steps illustrated in the flowchart are optional in different embodiments. In some embodiments, the steps may be performed in an order different from that described in FIG. 11.

As described above, once the topology module 160 has received the set of inputs from the user station 170, the topology module 160 may query the enhanced time series data 116 stored in the multidimensional database 150 (in step 902). To query the enhanced time series data 116, the topology module 160 may access the enhanced time series data 116 (e.g., by accessing the multidimensional database 150) (in step 1100) and identify a subset of the enhanced time series data 116 corresponding to the time window specified in the set of inputs (in step 1102). For example, if a time window specified in a set of inputs includes a start time of 10:00 AM on Mar. 28, 2018 and an end time corresponding to a current time, the topology module 160 may access the multidimensional database 150 and identify data points corresponding to each second between 10:00 AM on Mar. 28, 2018 and the current time. In embodiments in which the set of inputs does not include any filter or group by parameters, the subset of the enhanced time series data 116 identified by the topology module 160 may correspond to the query results that are received by the topology module 160 (in step 904).

In embodiments in which the set of inputs received by the topology module 160 include one or more filter and/or group by parameters, once the topology module 160 has identified a subset of the enhanced time series data 116 corresponding to the time window specified in the set of inputs, the topology module 160 may filter and/or group the subset of the enhanced time series data 116. The topology module 160 may filter the subset of the enhanced time series data 116 based on a set of attributes of compute instances of the distributed cloud environment specified in one or more filter parameters (in step 1104). Similarly, the topology module 160 also or alternatively may group the subset of the enhanced time series data 116 based on a set of attributes of compute instances of the distributed cloud environment specified in one or more group by parameters (in step 1106). In embodiments in which the topology module 160 filters and/or groups the subset of the enhanced time series data 116, the filtered and/or grouped enhanced time series data 116 may correspond to the query results that are received by the topology module 160 (in step 904).

Figure 12:
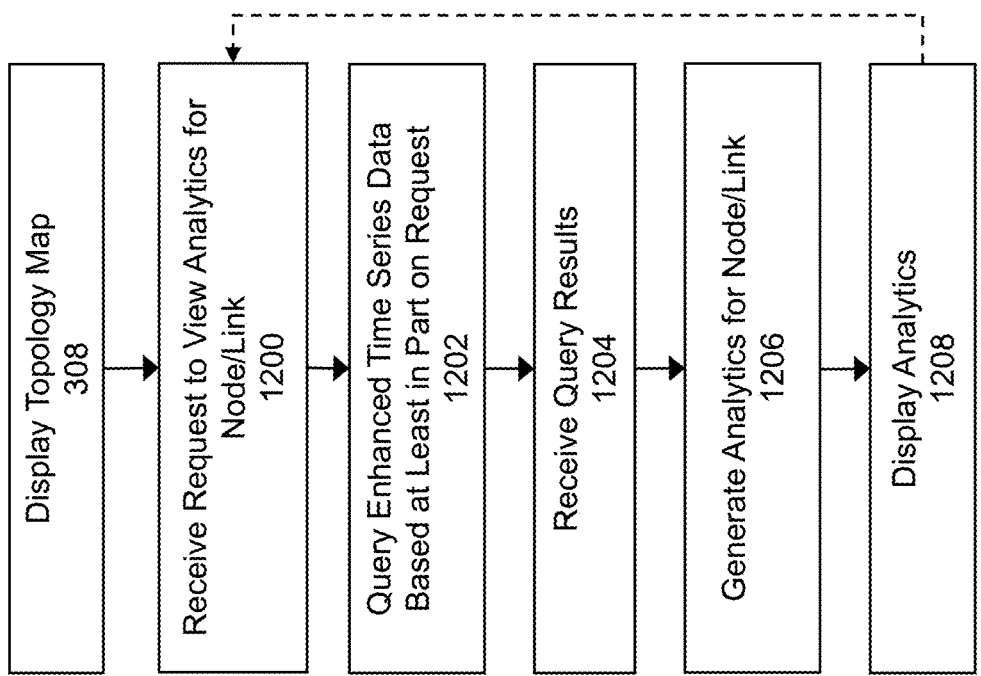
FIG. 12 illustrates a flowchart for displaying analytics for a node or a link of a topology map according to some embodiments of the invention.

FIG. 12 illustrates a flowchart for displaying analytics for a node or a link of a topology map according to some embodiments of the invention. Some of the steps illustrated in the flowchart are optional in different embodiments. In some embodiments, the steps may be performed in an order different from that described in FIG. 12.

Once a topology map 180 has been displayed (in step 308), a request to view a set of analytics for a node or a link within the topology map 180 may be received at the topology module 160 (in step 1200). Upon receiving the request, the topology module 160 may query the enhanced time series data 116 based at least in part on the request (e.g., by accessing the multidimensional database 150 and identifying a subset of the enhanced time series data 116 corresponding to the node/link) (in step 1202) and receive a set of query results corresponding to the subset of identified enhanced time series data 116 (in step 1204). In some embodiments, the topology module 160 also may identify the subset of the enhanced time series data 116 based on a set of inputs (e.g., a time window, one or more filter parameters and/or one or more group by parameters) used to generate the topology map 180. Then, the topology module 160 may generate a user interface 175 including analytics for the node/link (in step 1206) and display the user interface 175 including the analytics (in step 1208). In some embodiments, one or more of the steps of FIG. 12 may be repeated (e.g., in response to receiving an additional request to view analytics for a node/link at the topology module 160 (in step 1200)).

Figure 13A:
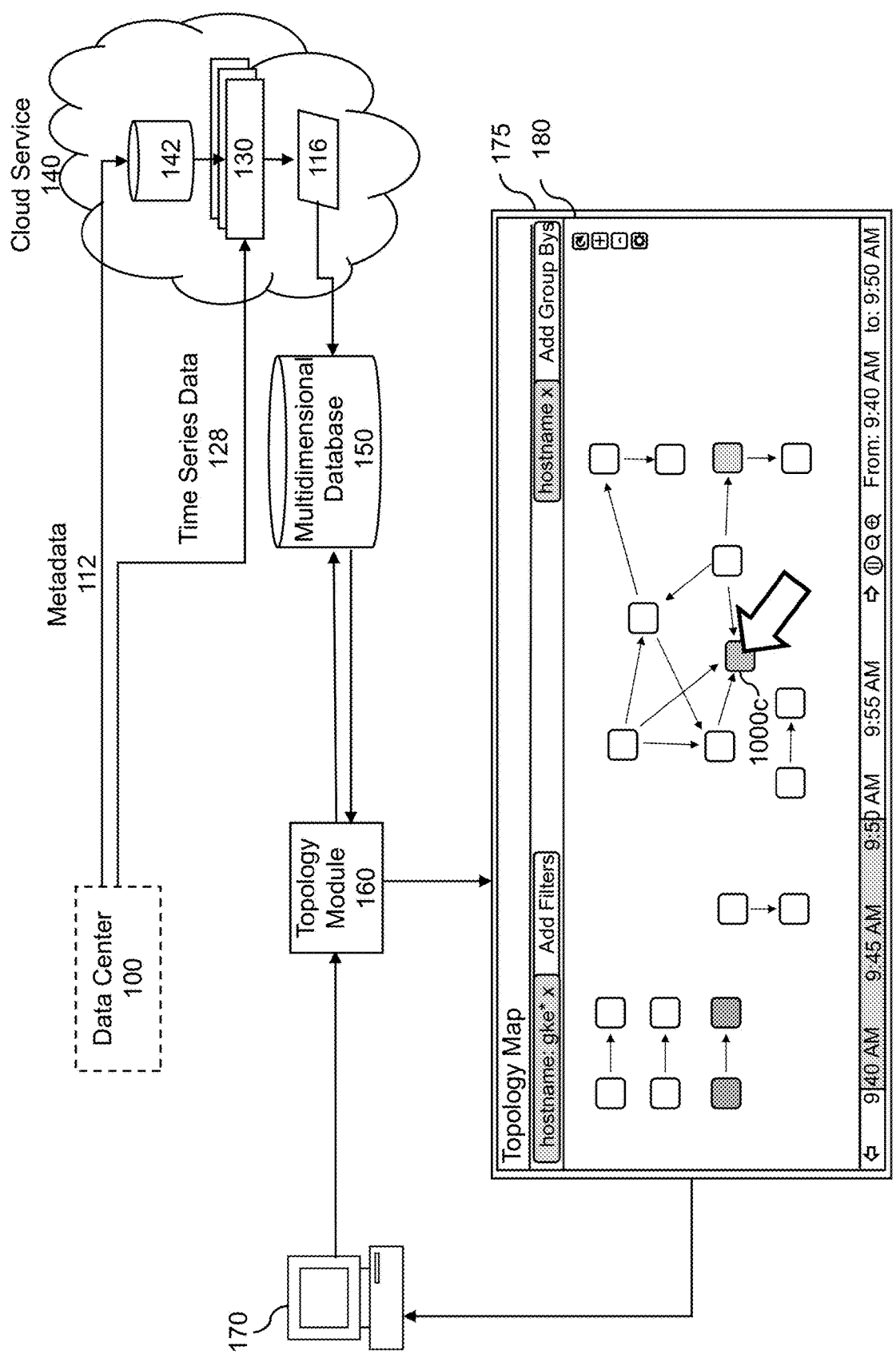
FIGS. 13A-13D illustrate examples of displaying analytics for a node or a link of a topology map according to some embodiments of the invention.
Figure 13B:
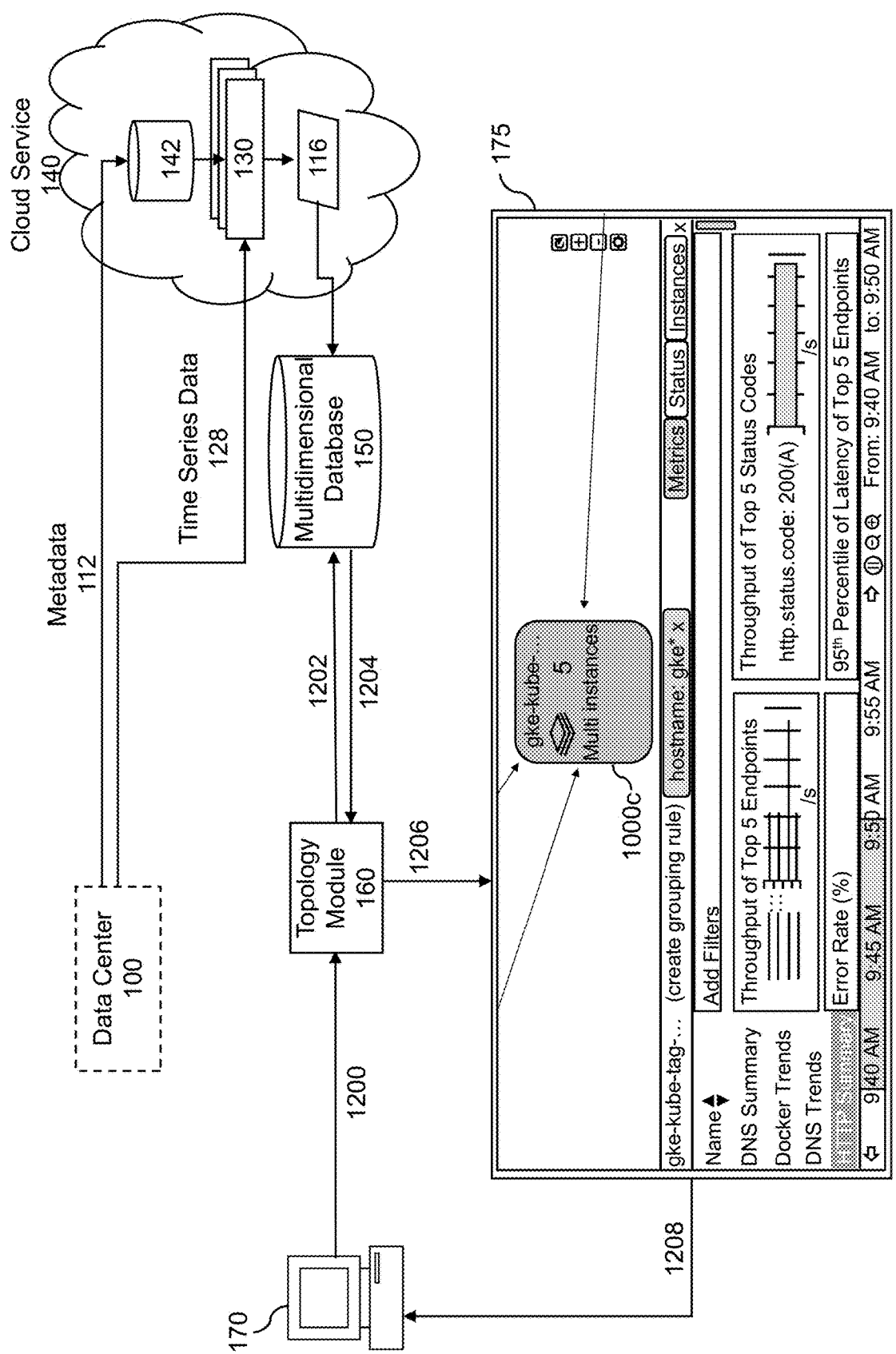

FIGS. 13A and 13B illustrate an example of displaying analytics for a node of a topology map 180. Referring first to FIG. 13A, a request to view analytics for node 1000c may be received at a user station 170. Then, as shown in FIG. 13B, which continues the example discussed above with respect to FIG. 13A, the request may be received at the topology module 160 (in step 1200), which queries the enhanced time series data 116 for analytics for node 1000c (in step 1202), receives a set of query results (in step 1204), generates a user interface 175 including analytics for node 1000c (in step 1206), and displays the user interface 175 at the user station 170 (in step 1208).

As shown in FIG. 13B, the user interface 175 generated by the topology module 160 may include a graphical representation of the selected node 1000c, links to the selected node 1000c, and various analytics for the selected node 1000c (e.g., throughput, status code, error rate, latency, etc.). The user interface 175 also may indicate an application running on the selected node 1000c (e.g., MySQL), a hostname associated with the selected node 1000c, a number of instances associated with the selected node 1000c, as well as information indicating services making calls or querying the selected node 1000c (e.g., based on links to the selected node 1000c). Furthermore, in some embodiments, the analytics may be filtered and/or sorted and the time window may be changed (e.g., by expanding, contracting, or shifting it). For example, as shown in the example of FIG. 13B, the analytics may include throughput of the top 5 status codes. In such embodiments, a request to filter and/or sort the analytics and/or change the time window may correspond to a new request to view analytics for the selected node 1000c received at the topology module 160 (in step 1200), resulting in steps 1202 through 1208 being repeated so that the analytics may be updated and displayed.

Figure 13C:
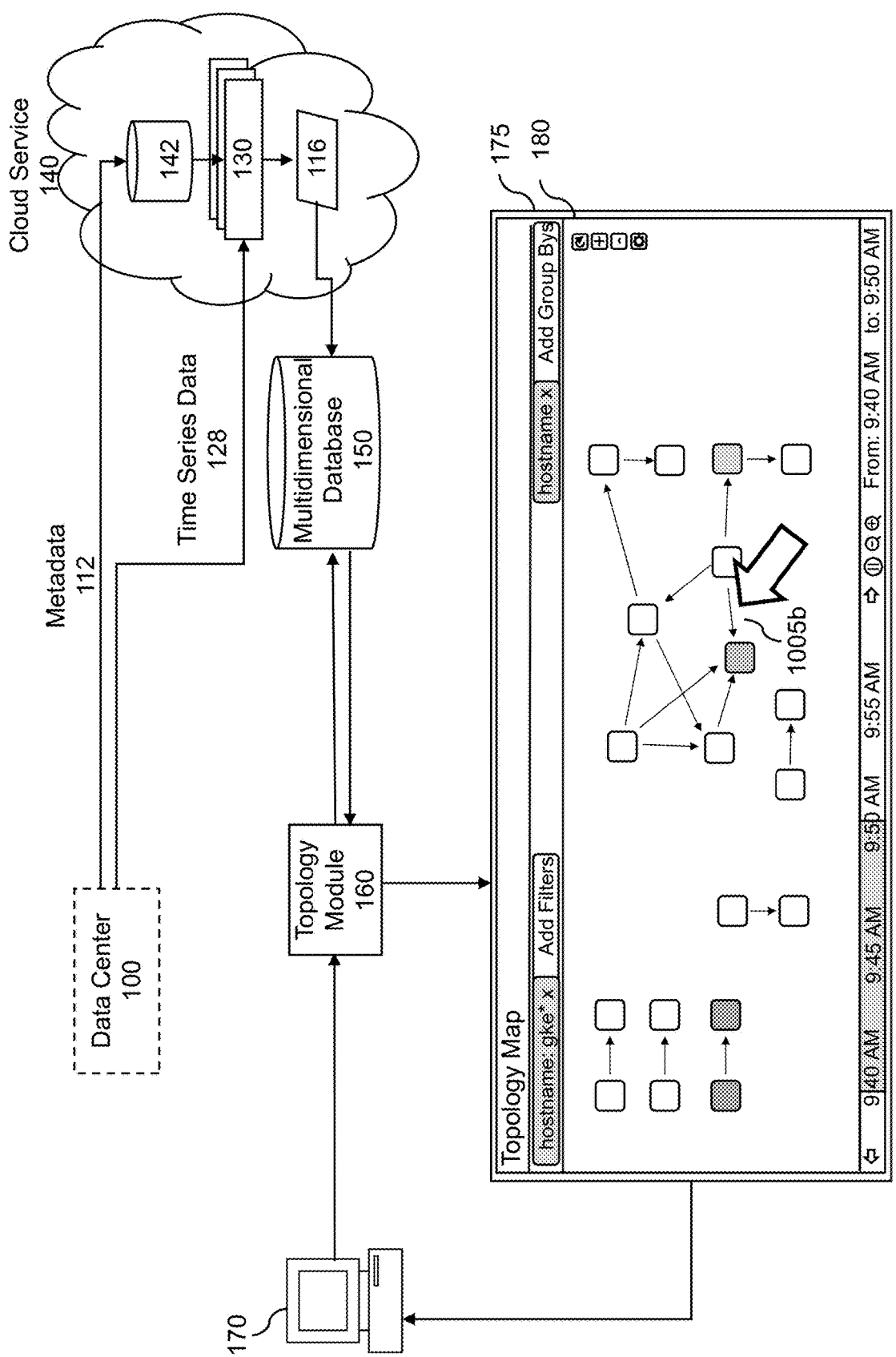
Figure 13D:
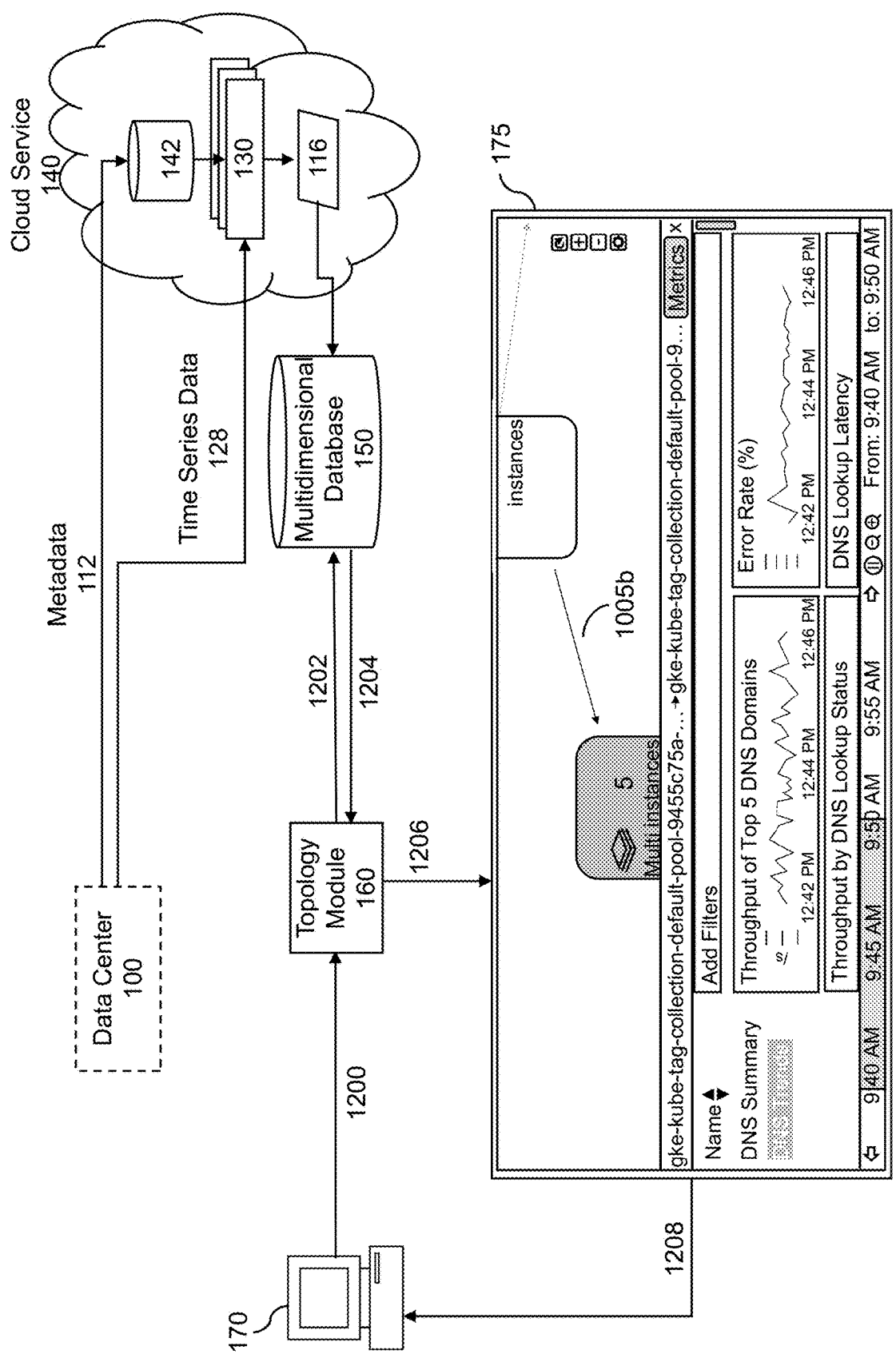

FIGS. 13C and 13D illustrate an example of displaying analytics for a link of a topology map 180. Referring first to FIG. 13C, a request to view analytics for link 1005b may be received at a user station 170. Then, as shown in FIG. 13D, which continues the example discussed above with respect to FIG. 13C, the request may be received at the topology module 160 (in step 1200), which queries the enhanced time series data 116 for analytics for link 1005b (in step 1202), receives a set of query results (in step 1204), generates a user interface 175 including analytics for link 1005b (in step 1206), and displays the user interface 175 to the user station 170 (in step 1208).

As shown in FIG. 13D, the user interface 175 generated by the topology module 160 may include a graphical representation of the selected link 1005b, nodes that the selected link 1005b connect, and various analytics for the selected link 1005b (e.g., throughput, error rate, etc.). Similar to the analytics for nodes, in some embodiments, the analytics for links may be filtered and/or sorted. For example, as shown in the example of FIG. 13D, the analytics may include throughput of the top 5 DNS Domains. As described above, in such embodiments, a request to filter and/or sort the analytics and/or change the time window may correspond to a new request to view analytics for the selected link 1005b received at the topology module 160 (in step 1200), resulting in steps 1202 through 1208 being repeated so that the analytics may be updated and displayed.

With the above background information and problems with prior art in mind, certain embodiments of the present invention are related to a method and system for visual DevOps using real-time topology maps and real-time visualizations of various metrics for the logical service components in cloud applications.

For example, and without limitation, an embodiment of the invention, as shown and described by the various figures and accompanying text, provides a system and associated methods for Visual DevOps using a real-time topology map of logical service components as the foundation for building a converged SRE platform.

Figure 14:
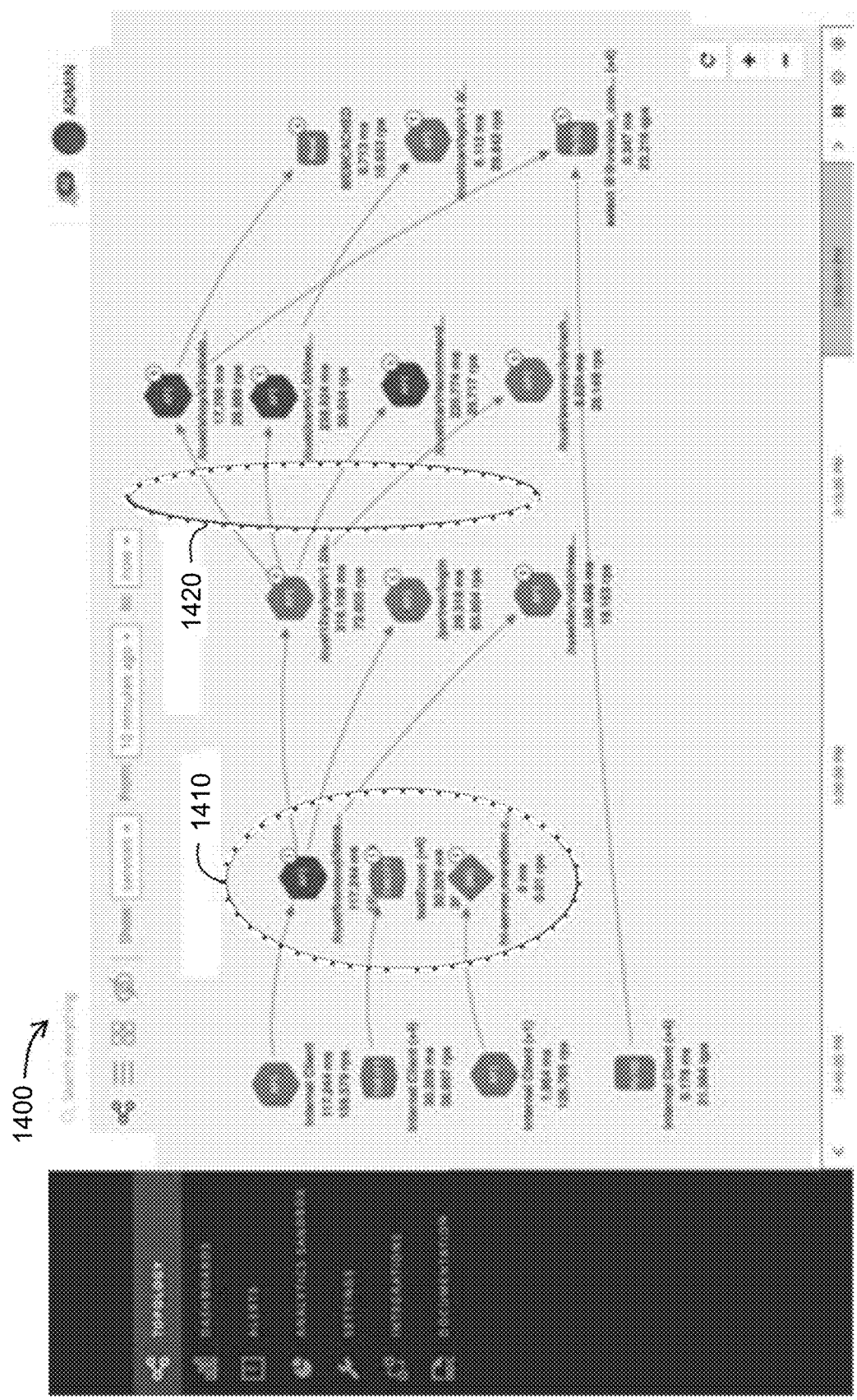
FIG. 14 is an exemplary graphical display of a services-interaction topology map according to an embodiment of the present invention.

Referring now to FIG. 14, a method aspect of embodiments of the present invention is described in more detail. A real-time topology map 1400 of logical service components in a cloud application may be constructed by capturing and analyzing network interactions (such as API calls, RPC calls, database calls, or interactions with an external service or a PaaS service) between the services and APIs in real-time. The services within the topology map 1400 may include a logical grouping of functionally equivalent instances. For example, and without limitation, multiple instances may provide a REST service for the item list in a shopping cart. As described above, because all these instances are serving the same REST endpoint (or URI), they may be grouped to form a "list shopping cart items" service. Services may be realized by multiple instances of code running inside VMs, containers, or bare metal operating systems.

For example, and without limitation, the real-time topology map 1400 may provide universal observability into all the services making up an application, including both the internal and external API services. Services may be represented as vertices 1410 (or nodes) in the topology map and the interactions between the services may be represented as the edges 1420 (or arrows) connecting the vertices. Services may be of various types (for example, and without limitation, HTTP REST web service, MySQL database service, Memcached service, and DNS service).

Figure 15:
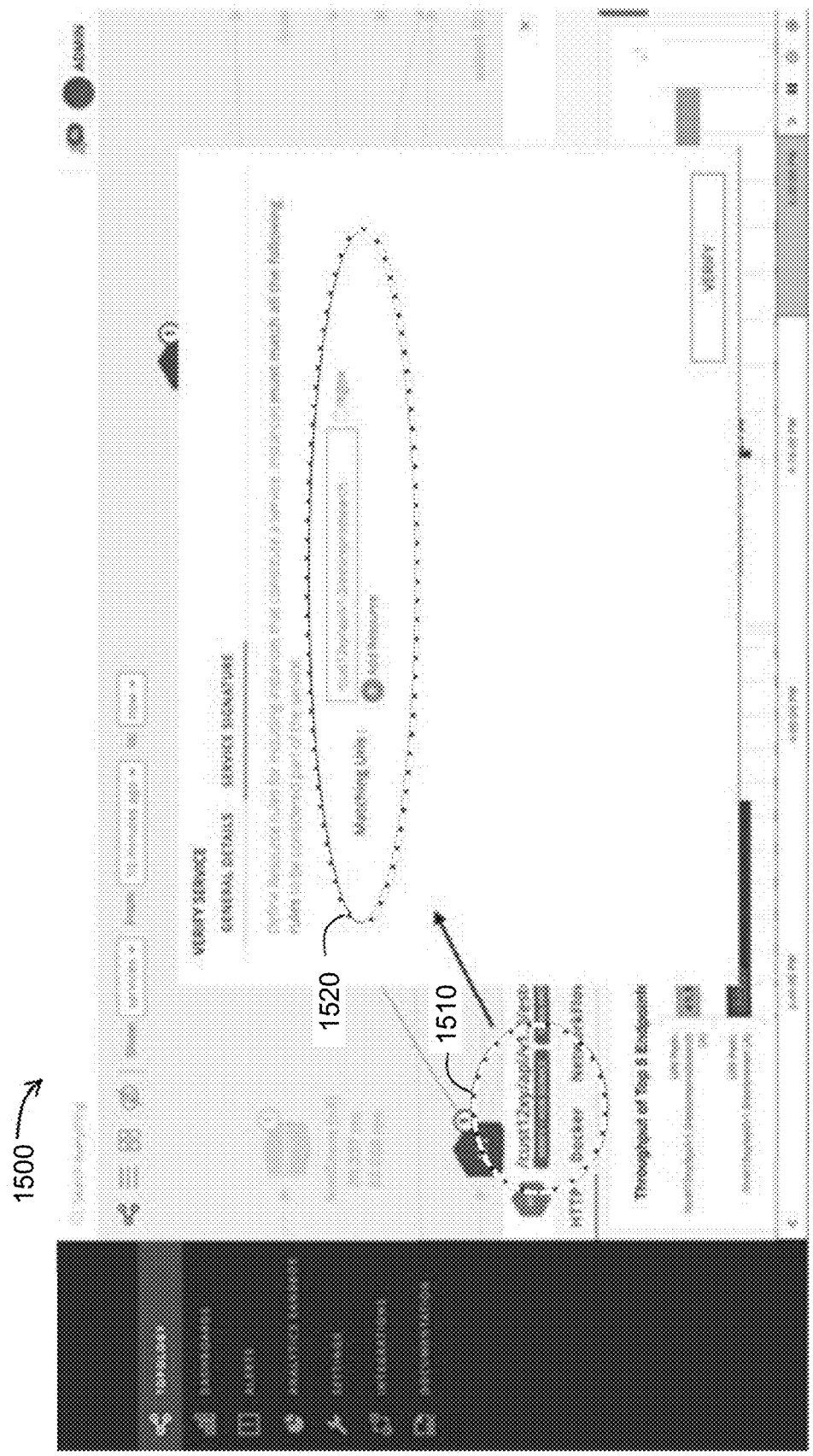
FIG. 15 is an exemplary graphical display for customizing service grouping criteria according to an embodiment of the present invention.

Referring to FIG. 15, a method aspect of embodiments of the present invention for customizing the grouping criteria for a service is described in more detail. The topology map may be created by automatically grouping instances into services. Embodiments of the system in the present invention may advantageously leverage multiple dimensions such as protocol type, resource type, and custom tags, to group instances into services. As a matter of definition, the grouping criteria is called service signature. In some embodiments, the service signature may be edited within a user interface. For example, a user interface may provide one or more options to edit the service signature, such that the service signature may be edited by clicking on the service node, selecting the "VERIFY/HIDE SERVICE" option 1510, and then selecting the "SERVICE SIGNATURE" 1520.

Figure 16:
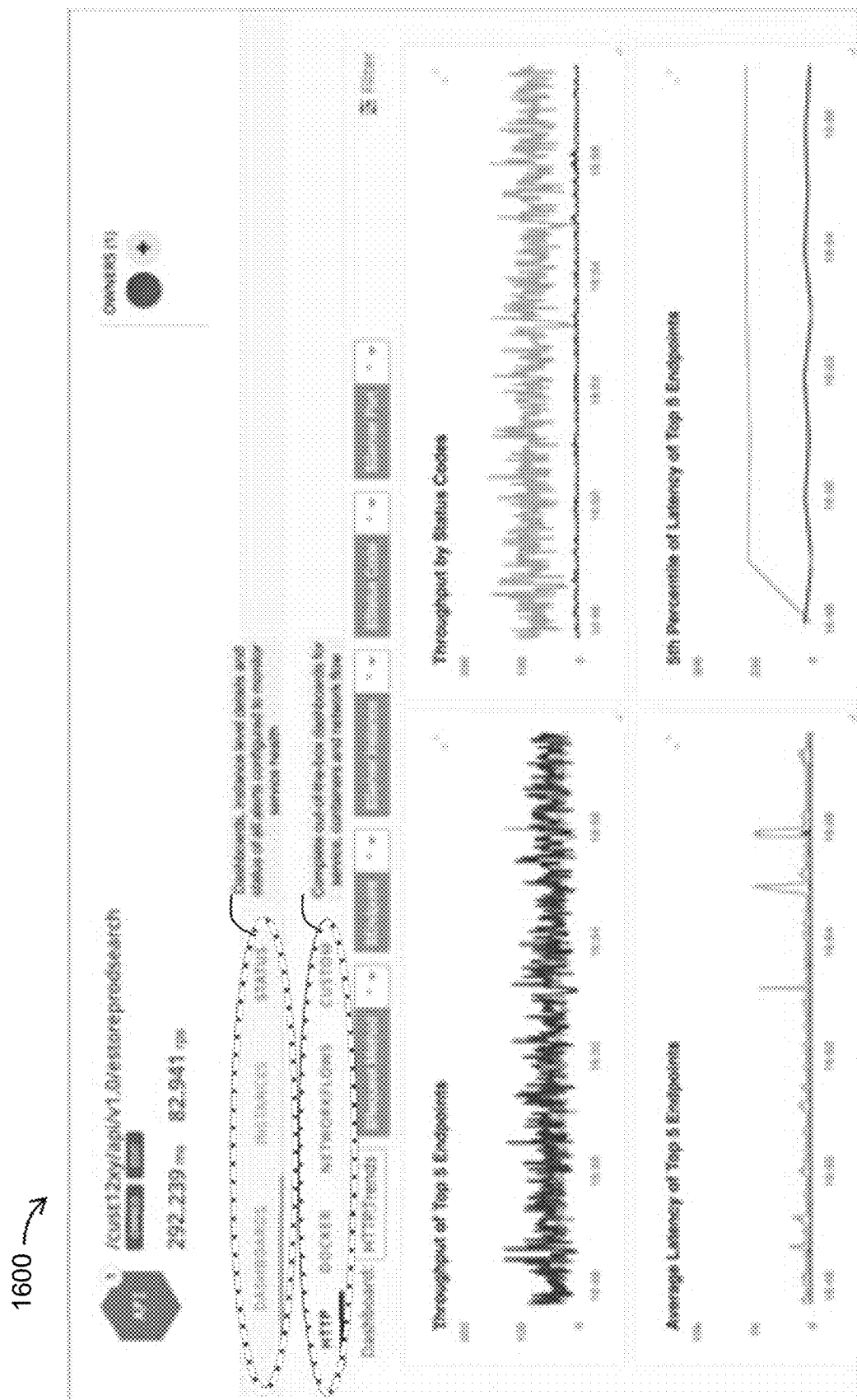
FIG. 16 is an exemplary graphical display for service operation profile viewing according to an embodiment of the present invention.

Referring to FIG. 16, a method aspect of embodiments of the present invention for viewing the service profile is described in more detail. Service profile may provide out-of-the-box dashboards and insights into the instances grouped under the service. In some embodiments, the dashboards may include the following: (a) Service-level insights such as service specific key golden signals (e.g., HTTP Throughput or MySQL Query Latency); (b) Container-level insights such as CPU, memory, and/or disk I/O used by containers; and (c) Network-level insights for TCP retransmissions, round trip times (RTT), and packet drops.

Figure 17:
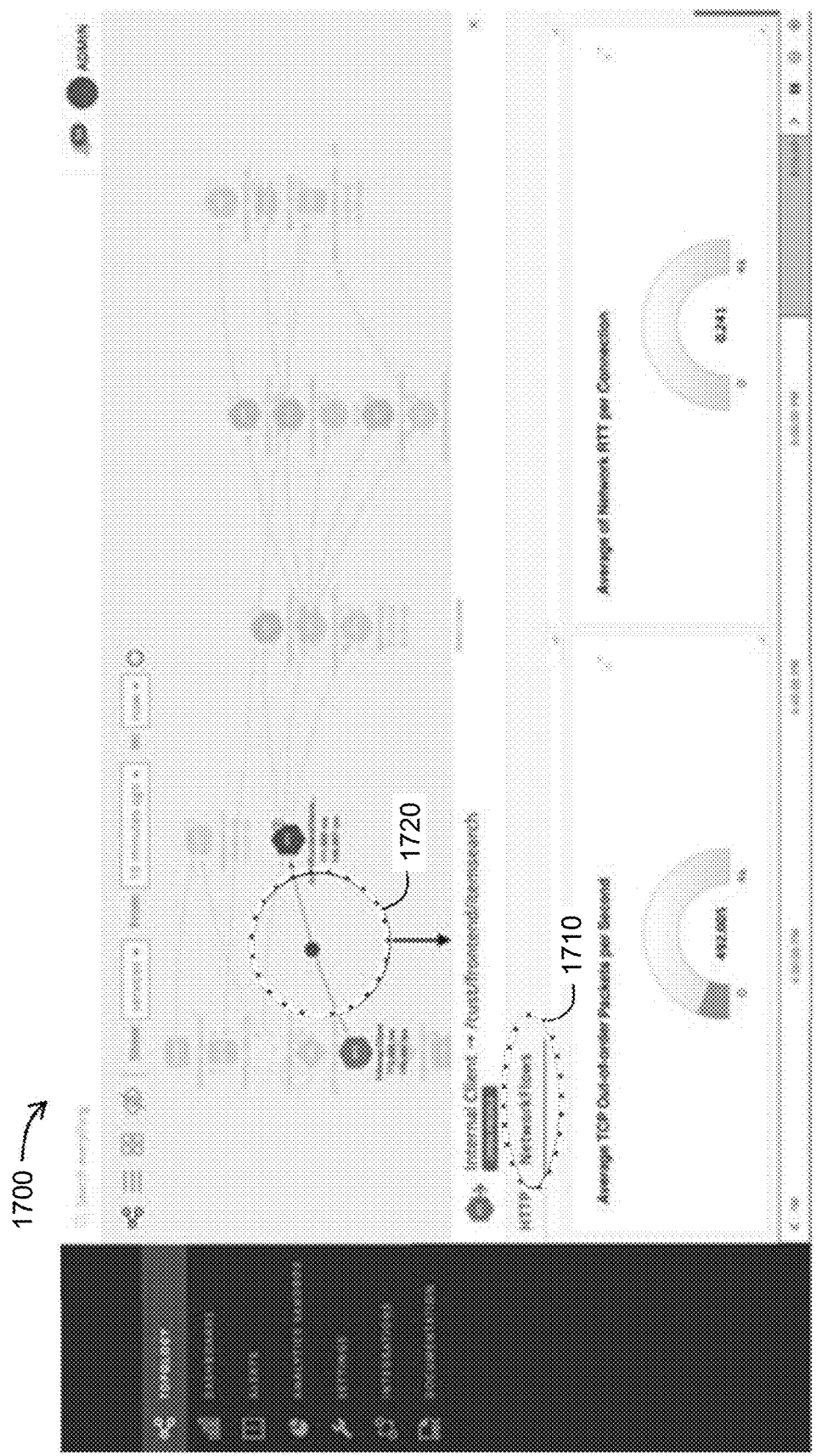
FIG. 17 is an exemplary graphical display for service interaction profile viewing according to an embodiment of the present invention.

Referring to FIG. 17, a method aspect of embodiments of the present invention for viewing a service interaction profile is described in more detail. A service interaction profile may be viewed by clicking on the edges 1720 in a topology map. A service interaction profile may provide insights on the network interactions among services. This may include valuable metrics such as TCP retransmission, out-of-order packets, and round trip time (RTT).

Another embodiment of the invention provides a system and associated methods for flexible and dynamic filtering, grouping, and sub-grouping of topology maps based on infrastructure tags and behavioral resources.

Figure 18:
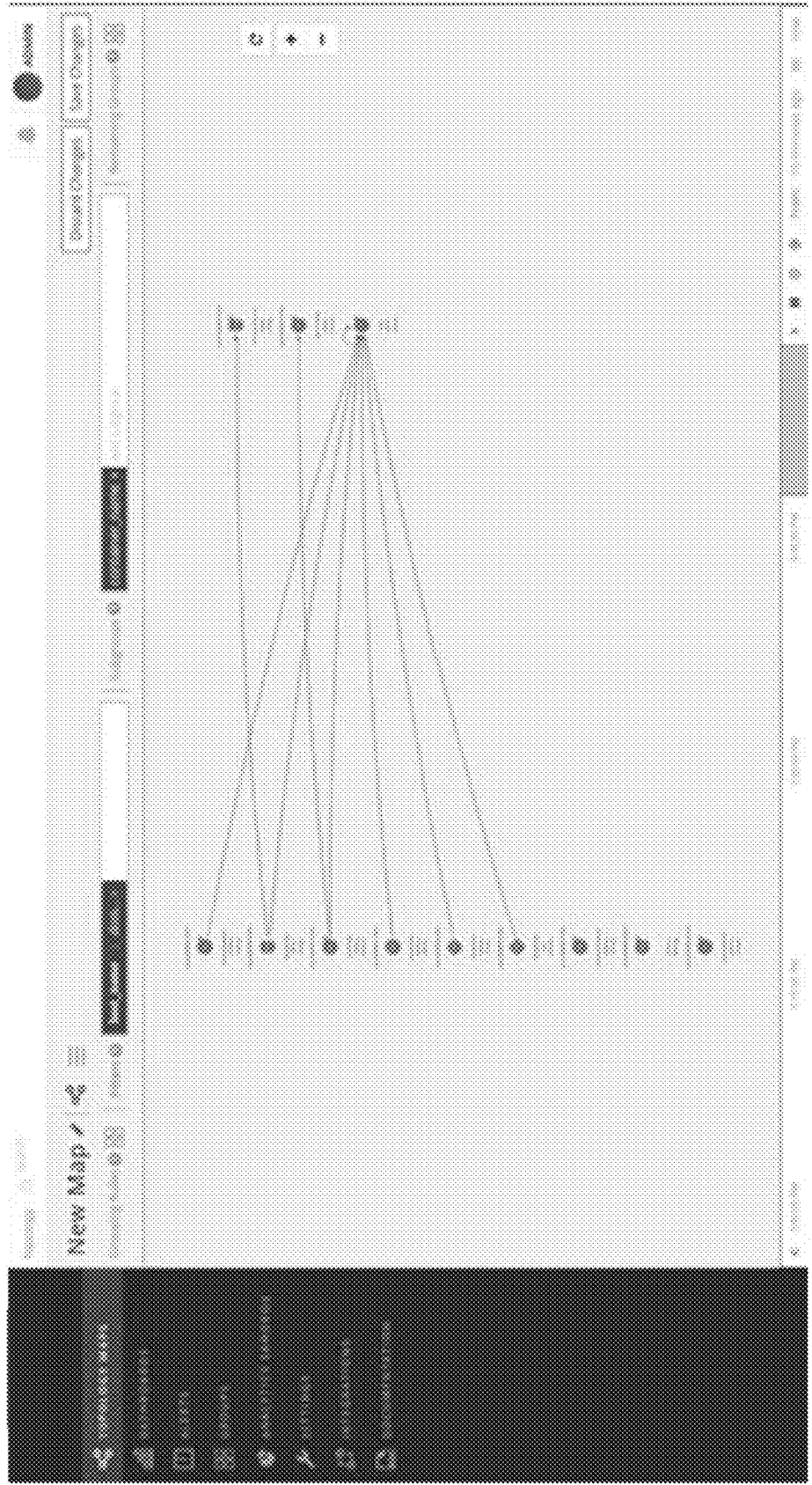
FIG. 18 is an exemplary graphical display for topology map grouping according to an embodiment of the present invention.

Referring to FIG. 18, a method aspect of embodiments of the present invention is described in more detail. By leveraging infrastructure-level tags (for example, and without limitation, host-name, instance type, and container identifier), embodiments of the system in the present invention may advantageously allow dynamic filtering, grouping, and sub-grouping of topology maps. Infrastructure tags may be used to arbitrarily group VM instances and containers. For example, by using tags, a user of the system may customize (1800) topology maps to show services, applications, regions, and so on.

An embodiment of the present invention is a system and associated methods for Visual DevOps using real-time visualizations of various key-performance indicators (KPIs) including service, network, and infrastructure level KPIs, for cloud applications.

Figure 19:
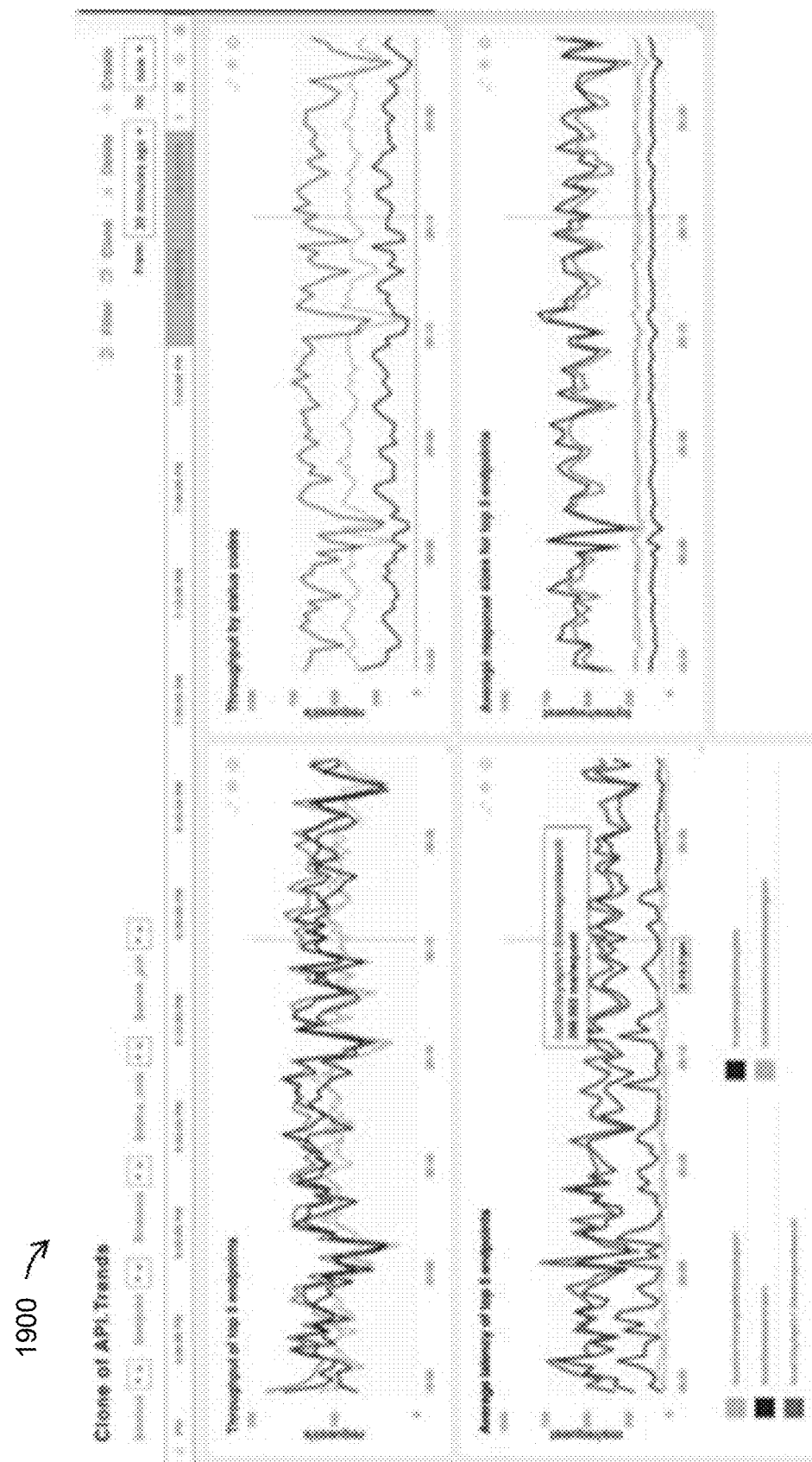
FIG. 19 is an exemplary graphical display for service-level key performance indicator (KPI) tracking according to an embodiment of the present invention.

Referring to FIG. 19, a method aspect of embodiments of the present invention for tracking service-level KPIs in cloud applications is described in more detail. The service-level KPIs tracked may include the golden signals of latency, traffic, and errors. For example, and without limitation, for a HTTP REST API, each signal may be tracked at the granularity of individual REST endpoints, which may be automatically discovered from service interactions. The service-level KPIs may be measured as follows: (a) Latency: The system may monitor latency for each API call by observing requests by clients on individual endpoints and responses sent back by servers. Simply measuring latency at the end-point level may not be as informative, as doing so may lead to misleading conclusions about API health. The system may allow a user to drill down further by distinguishing between latencies across different service response codes. For example, and without limitation, an HTTP 500 error that fails fast may be better than a slow error. Similarly, a delayed HTTP 200 OK response may be considered an error in some cases. Drilling down further into the latency of an HTTP 500 error versus the latency of an HTTP 200OK response may advantageously provide greater visibility into this signal; (b) Traffic: Traffic (or throughput) is measured as the number of requests per second (RPS) served (broken down by REST endpoints, in the example described above). The system may advantageously allow a user to visualize throughput further by status codes, hosts, request types, and even the request/response body content; and (c) Errors: The system may monitor the error rates, or the rate of request failures by explicitly tracking the server response codes. However, sometimes the server response codes alone may not be sufficient to identify failures. In such cases, errors may be identified using other metrics. For example, and without limitation, a malformed request for a search API may return no responses. In a hypothetical scenario, the average response size is 500 KB, but the size of the response to a malformed request is only 2 KB (along with a response code of 200 OK). In such an instance, the error may be identified by monitoring the size of the responses for anomalies.

Figure 20:
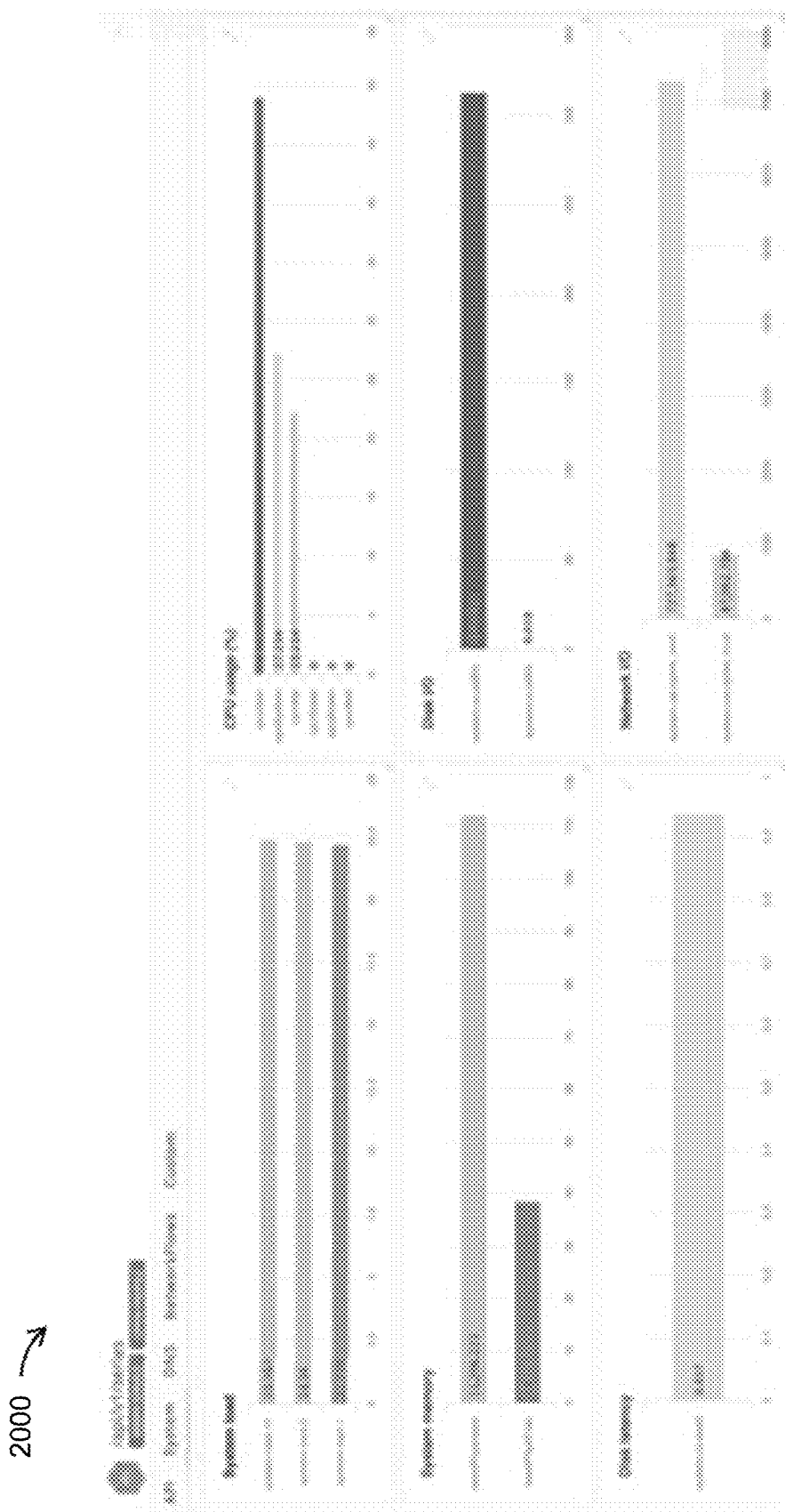
FIG. 20 is an exemplary graphical display for infrastructure-level key KPI tracking according to an embodiment of the present invention.

Referring to FIG. 20, a method aspect of embodiments of the present invention for tracking infrastructure-level KPIs in cloud applications is described in more detail. Many application health issues are rooted in problems related to the underlying network or infrastructure. These instances include issues being experienced by a cloud provider. Saturation is one of the golden signals of monitoring which is related to the underlying infrastructure. Saturation may be measured by looking at infrastructure metrics such as Disk I/O, Network I/O, and System Memory.

Figure 21:
FIG. 21 is an exemplary graphical display for network-level key KPI tracking according to an embodiment of the present invention.

Referring to FIG. 21, a method aspect of embodiments of the present invention for tracking network-level KPIs in cloud applications is described in more detail. Embodiments of the system in the present invention may allow a user to look at network flows including TCP retransmission rates, connection drops, round-trip-times, and out-of-order packet counts. If a cloud provider is having issues (for example, and networking issue in the data center or VMs being overloaded), network packets may start getting dropped. By tracking the average TCP retransmissions per second and TCP out-of-order packets per second, embodiments of the present invention may quickly identify this issue.

Embodiments of the present invention are described herein in the context of a system of computers, servers, and software. Those of ordinary skill in the art will realize that the embodiments of the present invention described above are provided as examples, and are not intended to be limiting in any way. Other embodiments of the present invention will readily suggest themselves to such skilled persons having the benefit of this disclosure.

System Architecture

A skilled artisan will note that one or more of the aspects of embodiments of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 22 illustrates a model computing device in the form of a computer 2210, which is capable of performing one or more computer-implemented steps in practicing the method aspects of embodiments of the present invention. Components of the computer 2210 may include, but are not limited to, a processing unit 2220, a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 2210 may also include a cryptographic unit 2225. Briefly, the cryptographic unit 2225 has a calculation function that may be used to verify digital signatures, calculate hashes, digitally scan hash values, and encrypt or decrypt data. The cryptographic unit 2225 may also have a protected memory for storing keys and other secret data. In other embodiments, the functions of the cryptographic unit may be instantiated in software and run via the operating system.

A computer 2210 typically includes a variety of computer readable media. Computer readable media can be any available media that can be accessed by a computer 2210 and includes both volatile and nonvolatile media and removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage, or other magnetic storage devices, or any other medium which can be used to store the desired information and which can be accessed by a computer 2210. Communication media typically embodies computer readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. Combinations of any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 22 illustrates an operating system (OS) 2234, application programs 2235, other program modules 2236, and program data 2237.

The computer 2210 may also include other removable/non-removable, volatile/nonvolatile computer storage media. By way of example only, FIG. 22 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 22 provide storage of computer readable instructions, data structures, program modules, and other data for the computer 2210. In FIG. 22, for example, hard disk drive 2241 is illustrated as storing an OS 2244, application programs 2245, other program modules 2246, and program data 2247. Note that these components can either be the same as or different from OS 2234, application programs 2235, other program modules 2236, and program data 2237. The OS 2244, application programs 2245, other program modules 2246, and program data 2247 are given different numbers here to illustrate that, at a minimum, they may be different copies.

A user may enter commands and information into the computer 2210 through input devices such as a keyboard 2262 and cursor control device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port, or a universal serial bus (USB). A monitor 2291 or other type of display device is also connected to the system bus 2221 via an interface, such as a graphics controller 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device, or other common network node, and typically includes many or all of the elements described above relative to the computer 2210, although only a memory storage device 2281 has been illustrated in FIG. 22. The logical connections depicted in FIG. 22 include a local area network (LAN) 2271 and a wide area network (WAN) 2273, but may also include other networks 240. Such networking environments are commonplace in offices, enterprise-wide computer networks, intranets, and the internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 22 illustrates remote application programs 2285 as residing on memory device 2281.

The communications connections 2270 and 2272 allow the device to communicate with other devices. The communications connections 2270 and 2272 are an example of communication media. The communication media typically embodies computer readable instructions, data structures, program modules, or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Computer readable media may include both storage media and communication media.

Some of the illustrative aspects of embodiments of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
    collecting, at a service monitoring instance, network traffic comprising multiple packets communicated between multiple services distributed across a distributed cloud environment, at least two of the multiple services corresponding to a single cloud application, wherein the multiple packets from respective services of the multiple services to different respective services of the multiple services are captured by multiple collectors and forwarded to the monitoring service instance;
    determining a network flow of some or all of the network traffic at least by reconstructing a request and a response to the request based at least in part upon the multiple packets;
    generating a topology map based at least in part upon the network flow of the network traffic between the multiple services distributed across the distributed cloud environment at least by:
        querying the network flow;
        receiving query results representing at least multiple instances of code that correspond to a service of the single cloud application; and
        grouping a portion of the query results corresponding to the multiple instances of code that correspond to the service based on a protocol type or a resource type; and
    generating a display output of the topology map comprising at least at least a visual representation of the multiple instances of code comprising the service grouped based on a protocol type or a resource type.

2. The method of claim 1, wherein a collector corresponding to an individual service of the multiple services is deployed external to a kernel of a compute instance on which the individual service executes.

3. The method of claim 2, wherein the collector corresponding to the individual service captures and forwards an additional data packet to the monitoring service instance, the additional data packet being addressed to or from the individual service and from or to a service external to the distributed cloud environment respectively.

4. The method of claim 1, wherein the network traffic corresponds to at least a first and a second node, and the first node corresponds a first service on a first network layer and the second node corresponds to a second service on a second network layer, the topology map generated further based at least in part upon an input comprising at least one of: a filter parameter identifying a first attribute by which the multiple services are to be filtered or an additional group by parameter identifying an additional attribute by which at least some of the multiple services are to be grouped.

5. The method of claim 1, wherein reconstructing a request and a response to the request is further based on metadata extracted from the multiple packets comprising an IP address and determining the network flow of the network traffic further comprises reconstructing a payload pertaining to the request and a header for the request, or detecting an application layer protocol for the network flow of the multiple packets with stateful processing.

6. The method of claim 1, wherein the network flow merges a performance metric of the distributed cloud environment and data in the multiple packets, based at least in part upon stateful processing.

7. The method of claim 1, wherein at least two of the multiple instances of code comprising the service are functionally equivalent instances of code.

8. The method of claim 1, further comprising:
generating, in response to a first request to view an analytic for a service of the multiple services or a link between a pair of services of the multiple services, the analytic based at least in part upon a result of querying the network flow.

9. A system, comprising:
a processor;
a memory for holding a set of instructions, which when executed by the processor causes a set of acts comprising:
collecting, at a service monitoring instance, network traffic comprising multiple packets communicated between multiple services distributed across a distributed cloud environment, at least two of the multiple services corresponding to a single cloud application, wherein the multiple packets from respective services of the multiple services to different respective services of the multiple services are captured by multiple collectors and forwarded to the monitoring service instance;
determining a network flow of some or all of the network traffic at least by reconstructing a request and a response to the request based at least in part upon the multiple packets;
generating a topology map based at least in part upon the network flow of the network traffic between the multiple services distributed across the distributed cloud environment at least by:
querying the network flow;
receiving query results representing at least multiple instances of code that correspond to a service of the single cloud application; and
grouping a portion of the query results corresponding to the multiple instances of code that correspond to the service based on a protocol type or a resource type; and
generating a display output of the topology map comprising at least at least a visual representation of the multiple instances of code comprising the service grouped based on a protocol type or a resource type.

10. The system of claim 9, wherein a collector corresponding to an individual service of the multiple services is deployed external to a kernel of a compute instance on which the individual service executes.

11. The system of claim 10, wherein the collector corresponding to the individual service captures and forwards an additional data packet to the monitoring service instance, the additional data packet being addressed to or from the individual service and from or to a service external to the distributed cloud environment respectively.

12. The system of claim 9, wherein the network traffic corresponds to at least a first and a second node, and the first node corresponds to a first service on a first network layer and the second node corresponds to a second service on a second network layer, the topology map generated further based at least in part upon an input comprising at least one of: a filter parameter identifying a first attribute by which the multiple services are to be filtered or an additional group by parameter identifying an additional attribute by which at least some of the multiple services are to be grouped.

13. The system of claim 9, wherein reconstructing a request and a response to the request is further based on metadata extracted from the multiple packets comprising an IP address and determining the network flow of the network traffic further comprises reconstructing a payload pertaining to the request and a header for the request, or detecting an application layer protocol for the network flow of the multiple packets with stateful processing.

14. The system of claim 9, wherein the network flow merges a performance metric of the distributed cloud environment and data in the multiple packets, based at least in part upon stateful processing.

15. The system of claim 11, wherein at least two of the multiple instances of code comprising the service are functionally equivalent instances of code.

16. The system of claim 9, wherein the set of acts further comprise:
generating, in response to a first request to view an analytic for a service of the multiple services or a link between a pair of services of the multiple services, the analytic based at least in part upon a result of querying the network flow.

17. A computer program product embodied on a non-transitory computer readable medium having stored thereon a sequence of instructions which, when executed by a processor causes a set of acts comprising:
collecting, at a service monitoring instance, network traffic comprising multiple packets communicated between multiple services distributed across a distributed cloud environment, at least two of the multiple services corresponding to a single cloud application, wherein the multiple packets from respective services of the multiple services to different respective services of the multiple services are captured by multiple collectors and forwarded to the monitoring service instance;

determining a network flow of some or all of the network traffic at least by reconstructing a request and a response to the request based at least in part upon the multiple packets;

generating a topology map based at least in part upon the network flow of the network traffic between the multiple services distributed across the distributed cloud environment at least by:

querying the network flow;

receiving query results representing at least multiple instances of code that correspond to a service of the single cloud application; and grouping a portion of the query results corresponding to the multiple instances of code that correspond to the service based on a protocol type or a resource type; and generating a display output of the topology map comprising at least at least a visual representation of the multiple instances of code comprising the service grouped based on a protocol type or a resource type.

18. The computer program product of claim 17, wherein a collector corresponding to an individual service of the multiple services is deployed external to a kernel of a compute instance on which the individual service executes.

19. The computer program product of claim 18, wherein the collector corresponding to the individual service captures and forwards an additional data packet to the monitoring service instance, the additional data packet being addressed to or from the individual service and from or to a service external to the distributed cloud environment respectively.

20. The computer program product of claim 17, wherein the network traffic corresponds to at least a first and a second node, and the first node corresponds to a first service on a first network layer and the second node corresponds to a second service on a second network layer, the topology map generated further based at least in part upon an input comprising at least one of: a filter parameter identifying a first attribute by which the multiple services are to be filtered or an additional group by parameter identifying an additional attribute by which at least some of the multiple services are to be grouped.

21. The computer program product of claim 17, wherein reconstructing a request and a response to the request is further based on metadata extracted from the multiple packets comprising an IP address and determining the network flow of the network traffic further comprises reconstructing a payload pertaining to the request and a header for the request, or detecting an application layer protocol for the network flow of the multiple packets with stateful processing.

22. The computer program product of claim 17, wherein the network flow merges a performance metric of the distributed cloud environment and data in the multiple packets, based at least in part upon stateful processing.

23. The computer program product of claim 17, wherein at least two of the multiple instances of code comprising the service are functionally equivalent instances of code.

24. The computer program product of claim 17, wherein the set of acts further comprise:

generating, in response to a first request to view an analytic for a service of the multiple services or a link between a pair of services of the multiple services, the analytic being based at least in part upon a result of querying the network flow.

* * * * *